US012437153B1

(12) United States Patent
Belfort et al.

(10) Patent No.: US 12,437,153 B1
(45) Date of Patent: Oct. 7, 2025

(54) PERSUASIVE CONVERSATIONAL AGENTS FOR SELECTING WORDS AND TONALITIES

(71) Applicant: Straightline.AI, Inc., Miami, FL (US)

(72) Inventors: Jordan Ross Belfort, Miami Beach, FL (US); Jordan Anthony Metzner, Los Angeles, CA (US); Shervin Kordary Pishevar, Miami, FL (US)

(73) Assignee: Straightline.AI, Inc., Miami, FL (US)

( * ) Notice: Subject to any disclaimer, the term of this patent is extended or adjusted under 35 U.S.C. 154(b) by 0 days.

(21) Appl. No.: 19/017,215

(22) Filed: Jan. 10, 2025

(51) Int. Cl.
*G06F 40/284* (2020.01)
*G06Q 30/02* (2023.01)
*G10L 15/18* (2013.01)

(52) U.S. Cl.
CPC ....... *G06F 40/284* (2020.01); *G06Q 30/0281* (2013.01); *G10L 15/1815* (2013.01)

(58) Field of Classification Search
CPC .............. G06F 40/284; G06Q 30/0281; G10L 15/1815
See application file for complete search history.

(56) References Cited

U.S. PATENT DOCUMENTS

| | | | |
|---|---|---|---|
| 5,832,435 A | 11/1998 | Silverman | |
| 9,872,069 B1 | 1/2018 | Funk et al. | |
| 11,141,669 B2 | 10/2021 | Candelore et al. | |
| 11,431,660 B1 | 8/2022 | Leeds et al. | |
| 2003/0167167 A1* | 9/2003 | Gong | G10L 15/22 704/250 |
| 2006/0018457 A1 | 1/2006 | Unno et al. | |
| 2016/0093289 A1 | 3/2016 | Pollet | |
| 2016/0330529 A1 | 11/2016 | Byers | |
| 2018/0061393 A1 | 3/2018 | Osotio | |
| 2018/0278553 A1* | 9/2018 | Yu | G06Q 30/02 |
| 2018/0293221 A1 | 10/2018 | Finkelstein et al. | |
| 2018/0367229 A1 | 12/2018 | Gibson et al. | |
| 2019/0065610 A1 | 2/2019 | Singh | |
| 2019/0122658 A1* | 4/2019 | Nakagawa | G06F 3/167 |
| 2019/0385600 A1 | 12/2019 | Kim | |
| 2020/0066270 A1* | 2/2020 | Lee | G06N 20/00 |
| 2020/0279553 A1 | 9/2020 | McDuff et al. | |
| 2021/0027770 A1* | 1/2021 | Olabiyi | G06F 40/284 |
| 2021/0056968 A1* | 2/2021 | Shreeshreemal | G06F 3/167 |

(Continued)

OTHER PUBLICATIONS

Belfort, Jordan. Way of the Wolf: Straight Line Selling: Master the Art of Persuasion, Influence, and Success. Simon and Schuster, 2017. Whole Book.

*Primary Examiner* — Eric Yen
(74) *Attorney, Agent, or Firm* — Athorus, PLLC

(57) ABSTRACT

Systems and methods for operating conversational experiences receive comments from personal devices of individuals during the conversational experiences and generate responses to such comments and tonalities by which the responses are to be presented to the individuals. Responses and tonalities are selected to maximize a likelihood that one or more macro goals, or intermediate goals, will be achieved during a conversational experience in furtherance of a macro goal, or an ultimate goal, of the conversational experience. Models are trained based on turns of prior conversational experiences including both comments received from individuals and responses to such comments, as well as tonalities by which such responses are to be presented.

20 Claims, 28 Drawing Sheets

(56) References Cited

U.S. PATENT DOCUMENTS

| | | |
|---|---|---|
| 2021/0118426 A1 | 4/2021 | Li et al. |
| 2021/0217413 A1 | 7/2021 | Tushinskiy et al. |
| 2021/0366462 A1 | 11/2021 | Yang et al. |
| 2022/0159377 A1 | 5/2022 | Wilberding et al. |
| 2023/0245651 A1* | 8/2023 | Wang .................. G06N 5/022 704/275 |
| 2024/0153488 A1* | 5/2024 | Tabuchi ................ G10L 15/22 |
| 2024/0354514 A1* | 10/2024 | Valstar .................. A61B 5/024 |
| 2025/0005523 A1* | 1/2025 | Katta ...................... G06F 21/31 |
| 2025/0181996 A1* | 6/2025 | Montecalvo ........... G06Q 10/02 |
| 2025/0240256 A1* | 7/2025 | Fox ......................... H04L 51/02 |

* cited by examiner

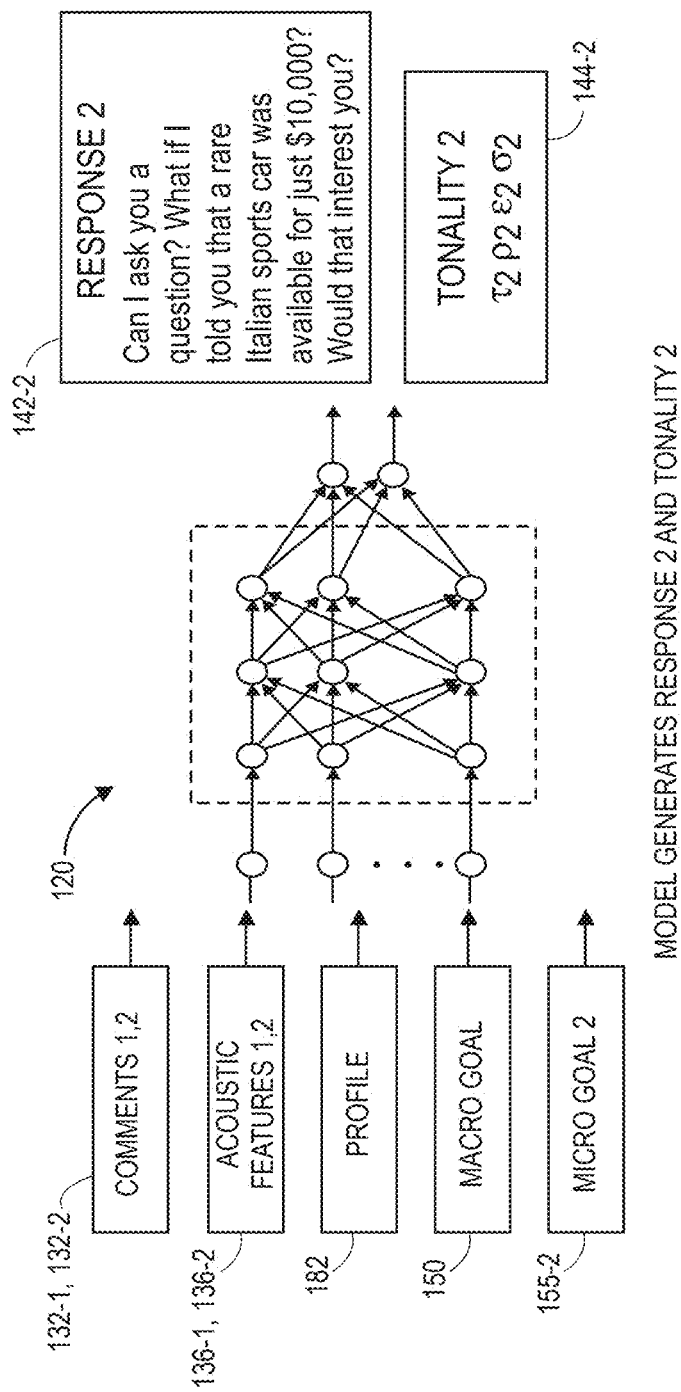

PERSUASIVE CONVERSATIONAL AGENTS FOR SELECTING WORDS AND TONALITIES

BACKGROUND

Conversational agents are computer-based dialogue systems that are programmed or configured to converse in language that may be understood by humans. Relying on natural language understanding models or similar techniques, conversational agents enable computer-based systems to communicate with humans using any number of input/output devices, e.g., by displaying written words or causing spoken words to be uttered to humans, by displaying images to humans, or by providing haptic feedback to humans in response to one or more queries received from such humans.

Some conversational agents are configured to receive audio data representing inputs in the form of spoken text, to interpret the audio data in order to identify the inputs, to generate outputs including appropriate replies to the spoken text based on such inputs, and to generate audio data representing the outputs in the form of spoken text. For example, where a language model has identified a set of text including an appropriate reply to be returned to an individual who provided audio data including a spoken comment via a device, the set of text may be normalized and tokenized, before being converted to phonemes or other units of sound and translated into acoustic features defining characteristics of the sounds, such as pitch (or frequency), duration, or intensity (or loudness). The translated acoustic features are then converted to waveforms that may be stored as audio data or transmitted back to the device operated by the individual and played aloud for that individual.

Currently, conversational agents are typically limited to selecting sets of texts constituting replies to sets of text received from individuals. Conversational agents rely on natural language processing or other techniques to determine words spoken by an individual and an intent of the individual, to select an action based on the words spoken and the intent, to identify a response based on such words and intent, and to generate audio data representing the response. Conversational agents do not, however, select actions or identify responses that are to be returned to individuals with an objective of achieving one or more preestablished or previously selected goals of persuasion, such as to influence a decision of an individual, to change a belief of the individual on a given subject or issue, to promote an action or behavior by the individual, to build or enhance a relationship with the individual, to resolve a disagreement with the individual, or to encourage critical thinking by the individual, among others. Nor do conversational agents select acoustic features by which such responses are to be presented to the individuals to increase a likelihood of achieving such goals of persuasion.

BRIEF DESCRIPTION OF THE DRAWINGS

FIGS. 1A through 1J are views of aspects of one system in accordance with embodiments of the present disclosure.

DETAILED DESCRIPTION

The systems and methods of the present disclosure are directed to persuasive conversational agents. More specifically, the systems and methods of the present disclosure are directed to conversational agents that select responses to comments received from users that include both sets of text and also tonalities by which the sets of text are to be presented to such users with an objective of accomplishing one or more goals of persuasion. Such goals may include "macro goals," or any ultimate objectives, intentions or measurable accomplishments of persuasion that constitute an overall purpose or reason for a conversational experience, viz., to persuade a target individual, as well as "micro goals," or intermediate objectives, intentions or measurable accomplishments that are desired while a conversational experience is in progress and which are determined or believed to be beneficial to accomplishing a macro goal.

Accordingly, systems and methods of the present disclosure may be directed to selecting text-based responses to be presented to users, as well as tonalities by which the text-based responses are to be presented, in order to accomplish a selected micro goal or, ultimately, a macro goal of a conversational experience. Sets of text of responses and tonalities may be identified using one or more machine learning models (or algorithms, systems or techniques). For example, a tonality may be represented as a tone of speech, an intensity, a speech rate, a pattern of intonation or a rhythm, and may be defined or selected with respect to one or more quantitative values. Alternatively, a tonality may be represented as one or more qualitative attributes, e.g., a label or identifier with reference or a mood, a motif, or a theme that is intended to be established while attempting to accomplish a micro goal or, ultimately, a macro goal.

Comments may be received from users and interpreted to determine whether a micro goal or a macro goal have been accomplished based on such comments in accordance with implementations of the present disclosure. In the event that a macro goal is accomplished during a conversational experience, and a target individual has been persuaded on a given decision, topic, belief, or action that is the subject of the macro goal, one or more indications of the accomplishment of the macro goal may be stored in association with the target individual, and any actions associated with the macro goal may be undertaken accordingly. In the event that a macro goal is not accomplished but a micro goal is accomplished during a conversational experience, then another micro goal may be established, and responses to comments received from users may be selected in order to accomplish that micro goal, in furtherance of the macro goal. In the event that a micro goal is not accomplished, one or more remedial actions may be taken.

Figure 1A:
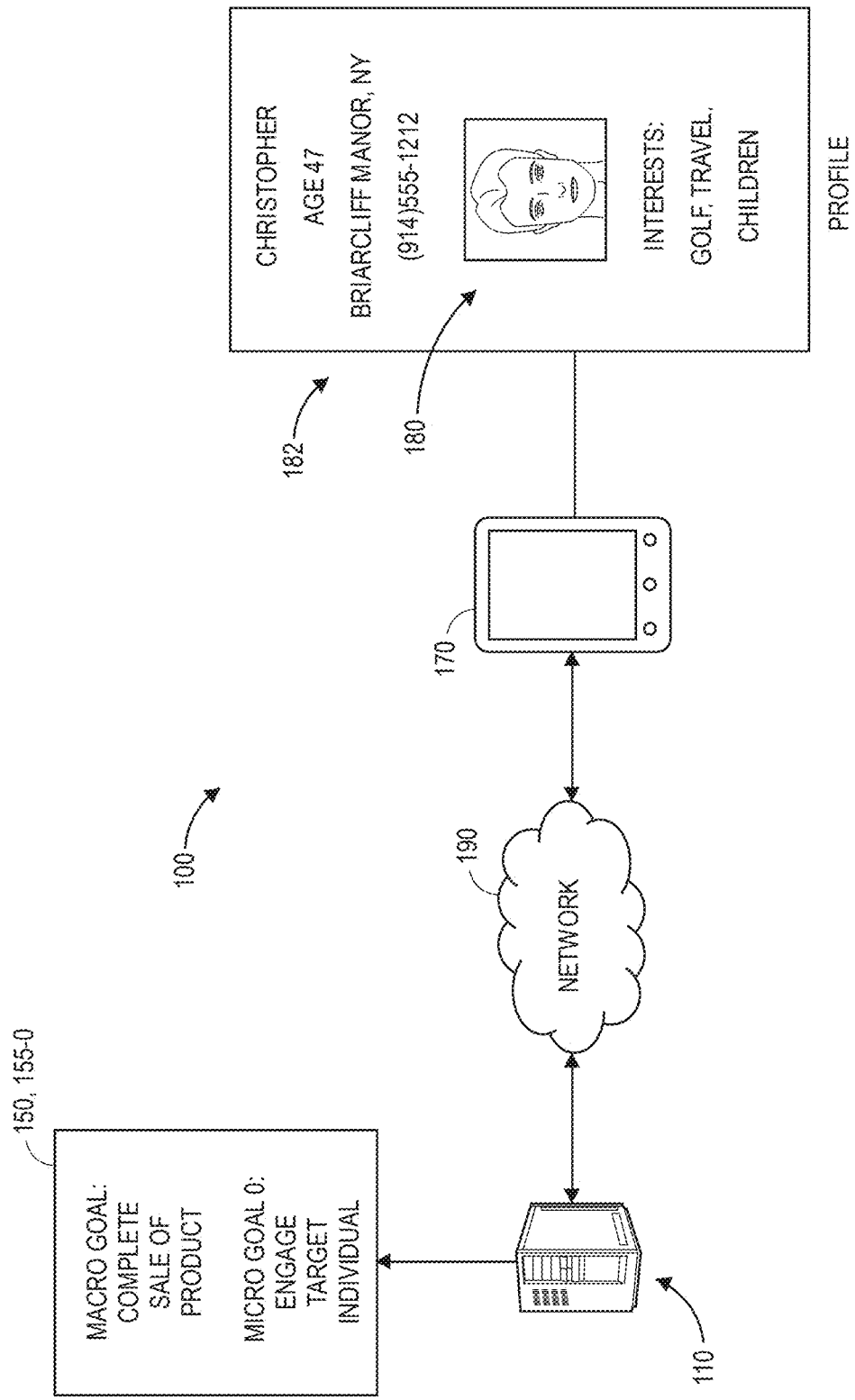

Referring to FIGS. 1A through 1J, views of aspects of one system in accordance with embodiments of the present disclosure are shown. As is shown in FIG. 1A, a system 100 includes a communication system 110 (e.g., a source system, a conversational system, or any other system) that is configured for communication with a personal device 170 (e.g., a target system, or any other system) of an individual 180 (e.g., a target individual) over a network 190 (or one or more networks), which may include the Internet in whole or in part. The communication system 110 may include one or more servers, data stores, transceivers or other computer components that are programmed or configured to operate one or more conversational agents and to engage in communication with devices associated with one or more humans, e.g., the personal device 170 of the individual 180, over the network 190.

The network 190 may be any wired network, wireless network, or combination thereof, and may comprise the Internet in whole or in part. For example, the network 190 may include one or more of a personal area network, a local area network, a wide area network, a cable network, a satellite network, a cellular telephone network, or any combination thereof. The network 190 may also be a publicly accessible network of linked networks, possibly operated by various distinct parties, such as the Internet. The network 190 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and need not be described in more detail herein.

The network 190 may include any number of systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols. Any combination of networks or communications protocols may be utilized in the network 190 in accordance with the systems and methods of the present disclosure.

The communication system 110 may have access to any information or data regarding the individual 180, or any number of other individuals, which may be stored in a profile 182 of the individual 180. The profile 182 may include personal information or data regarding the individual 180, such as a name of the individual 180, an age of the individual 180, an image of the individual 180, a telephone number of the individual 180 (or an electronic mail address, social network name or account, or other contact information of the individual 180), an identifier of a location of the individual 180 (e.g., an address, an area code, a ZIP code, or other identifiers), a preference that the individual 180 is known or believed to have, a financial status or condition of the individual 180, or any other information or data, which may be stored in a data store of the communication system 110, or otherwise accessed or obtained by the communication system 110 from any source.

As is shown in FIG. 1A, the communication system 110 may be configured to identify or select a macro goal 150, viz., to complete a sale of a product to the individual 180, or to receive a designation or selection of the macro goal 150, that is intended to be accomplished during a conversational experience with the individual 180. The macro goal 150 may be identified, designated or selected in any manner and on any basis. In some implementations, the macro goal 150 may be automatically established or selected for a target individual at random, e.g., by randomly selecting the macro goal 150 for the individual 180, or by randomly selecting the individual 180 for the macro goal 150. Alternatively, the macro goal 150 may be manually established by one or more users of the communication system 110, who may execute one or more interactions with a user interface rendered on one or more displays by the communication system 110, utter one or more audible instructions or other signals, or execute any other interactions with any other input/output device associated with the communication system 110 to identify or designate the macro goal 150. Moreover, the macro goal 150 may also be identified or selected for a target individual in accordance with a predetermined schedule, e.g., at a periodic interval, or at any other time.

Additionally, an initial micro goal 155-0, viz., to engage the individual 180, may be identified or selected on any basis. For example, the initial micro goal 155-0 may be a standard micro goal that is associated with the initiation of any number of conversational experiences. Alternatively, the initial micro goal 155-0 may be selected from a predetermined template or script that may have been generated for the conversational experience based on the macro goal 150.

Figure 1B:
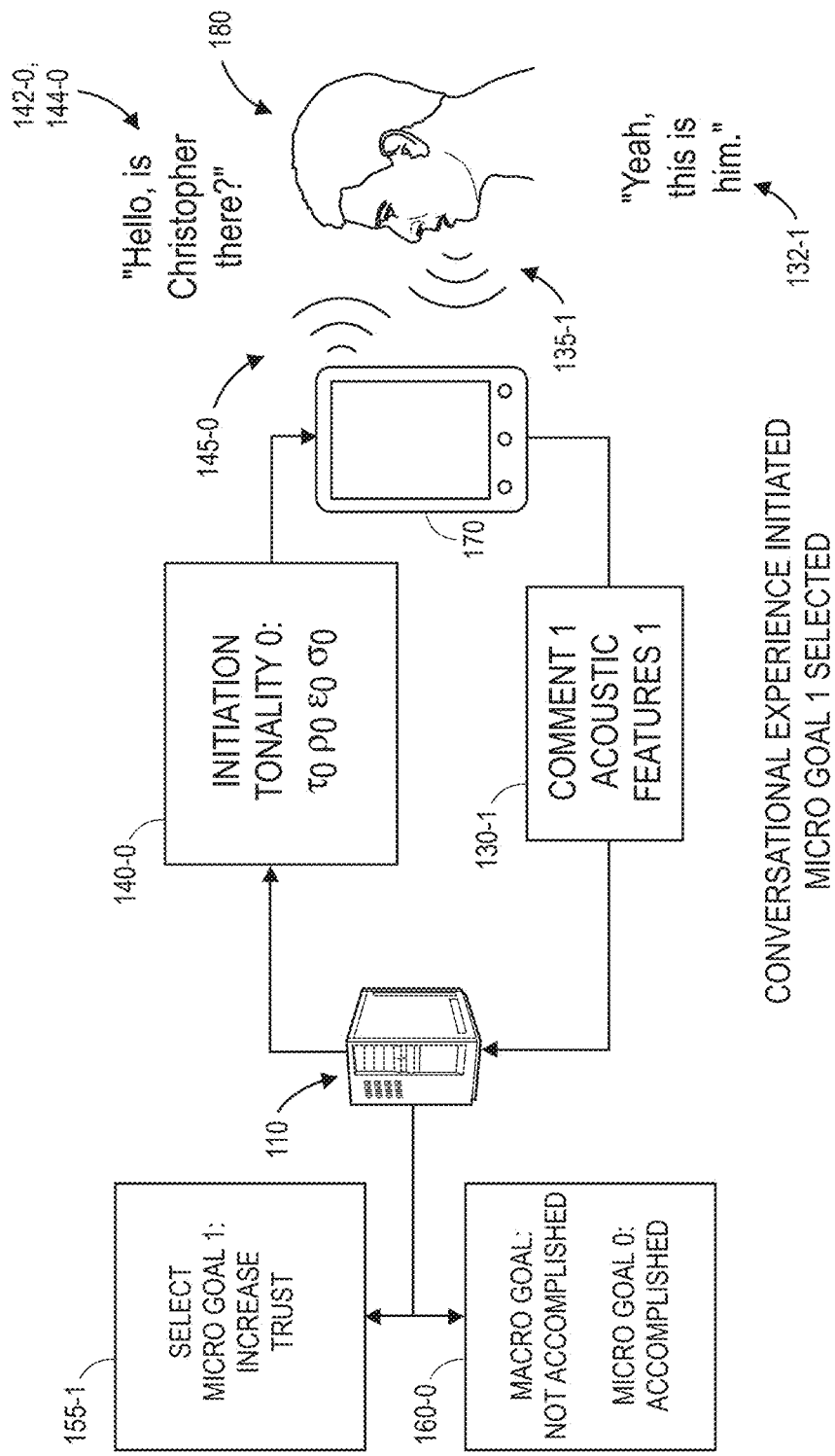

As is shown in FIG. 1B, upon identifying the macro goal 150 for a conversational experience with the individual 180, or receiving a selection of the macro goal 150 for the individual 180, the communication system 110 may initiate the conversational experience with the individual 180, e.g., by transmitting data 140-0 representing an initiation 142-0 including a set of words (or text) to be presented to the individual 180, as well as a tonality 144-0 by which the initiation 142-0 is to be presented to the individual 180, to the personal device 170. For example, the initiation 142-0 includes the words, "Hello, is Christopher there?" which may have been identified or selected from a predetermined template or script that may have been generated for the conversational experience based on the macro goal 150, or generated or selected based on the micro goal 155-0 or any known information or data regarding the individual 180. Alternatively, a set of words of the initiation 142-0 may be identified in any other manner, or based on any other information or data. The communication system 110 may transmit the data 140-0 to the personal device 170 in accordance with a telephonic communication system, such as an automated outbound calling system, or in any other manner.

The tonality 144-0 may be defined with respect to one or more qualitative or quantitative factors regarding a manner in which utterances of words are to be presented to participants during a conversational experience, e.g., a tone $\tau_0$, a pace $\rho_0$, an emphasis pattern go and a sentiment $\sigma_0$, which may be selected in association with a mood, an emotion or another feeling. In some implementations, the tonality 144-0 may be selected in accordance with a predetermined template or script, at random, or by one or more machine learning models (or algorithms, systems or techniques) that are trained to select a manner in which a set of words is presented to a target individual. For example, the tone $\tau_0$ may be selected to indicate a desired or selected tone (e.g., pitch) in accordance with the initiation 142-0, while the pace $\rho_0$, e.g., a speech rate, such as a number of words or syllables per unit time, may be selected to indicate any desired mood, emotion or feeling. Additionally, the emphasis pattern so may include changes in pitch or intensity throughout the initiation 142-0, may be selected in accordance with the tonality 144-0, such as to indicate whether the initiation 142-0 includes a question, a statement or a specific point of emphasis, which may be consistent with or varied compared to a standard or accepted pronunciation of a word, and the sentiment $\sigma_0$ may include, but need not be limited to, joy or despair, anger or happiness, or any other sentiments that are to be conveyed as the initiation 142-0 is presented. Alternatively, or additionally, the tonality 144-0 may be defined with respect to an intensity (or a loudness) or variations thereof, a rhythm, e.g., a timing or frequency of pauses, or any other quantitative or qualitative factors. In some implementations, the tonality 144-0 may be one of a plurality of tonalities having selected quantitative values that are assigned qualitative labels, e.g., "caring," "uptone," such as presenting a declarative in the form of a question, "intrigue," "scarcity," "certainty," "sincerity," "reason," "hypothetical," or theoretical, "obviousness," "empathy," or others, and the tonality 144-0 may be selected for the initiation 142-0 based on such qualitative labels.

The communication system 110 may initiate and maintain the conversational experience with the personal device 170 according to any number of communication protocols in accordance with implementations of the present disclosure, e.g., a Session Initiation Protocol (or "SIP") or another client-server architecture that operates in tandem with one or more other protocols, which may initiate the conversation experience via one or more Internet telephone (e.g., Voice over Internet Protocol, or "VoIP"), or video conference platforms or services.

As is also shown in FIG. 1B, the personal device 170 may interpret the set of data 140-0 received from the communication system 110 to generate audible sounds 145-0 representing the set of words of the initiation 142-0 in accordance with the tonality 144-0, and to play such sounds 145-0 to the individual 180 by one or more speakers or other acoustic emitters. Upon hearing the audible sounds 145-0, the individual 180 elects to utter a comment 132-1, viz., "Yeah, this is him." Sounds 135-1 including the comment 132-1 are captured by one or more microphones or other acoustic sensors of the personal device 170, which generates a set of data 130-1 representing the comment 132-1 and acoustic features representing characteristics of the sounds 135-1, such as pitch (or frequency), duration, or intensity (or loudness), and transmits the set of data 130-1 to the communication system 170.

Alternatively, the conversational experience may be initiated by the individual 180. For example, the personal device 170 may be configured to initiate a transmission of information or data to the communication system 110, e.g., via one or more Internet telephone (e.g., Voice over Internet Protocol, or "VoIP"), or video conference platforms or services, or in any other manner. The individual 180 may contact the communication system 110 using the personal device 170, such as by entering or selecting a telephone number associated with the communication system 110 by one or more interactions with the personal device 170, and may utter the sounds 135-1 including the comment 132-1 upon confirming a connection with the communication system 110. Upon capturing the sounds 135-1 using one or more microphones or other acoustic sensors, the personal device 170 may generate the set of data 130-1 representing the comment 132-1 and acoustic features including characteristics of the sounds 135-1, and transmit the set of data 130-1 to the communication system 110.

As is further shown in FIG. 1B, upon receiving the data 130-1, the communication system 110 makes a determination 160-0 that the macro goal 150 was not accomplished but also that the micro goal 155-0, viz., to engage the individual 180, was accomplished based on the comment 132-2. The communication system 110 thus selects a micro goal 155-1, viz., to increase a level of trust of the individual 180 in one or more aspects of the conversational experience, based on the data 130-1 in furtherance of the macro goal 150. For example, the micro goal 155-1 may be selected manually, e.g., by one or more users of the communication system 110, or automatically, such as in accordance with a predetermined template or script, as a part of a language pattern, or on any other basis.

Figure 1C:
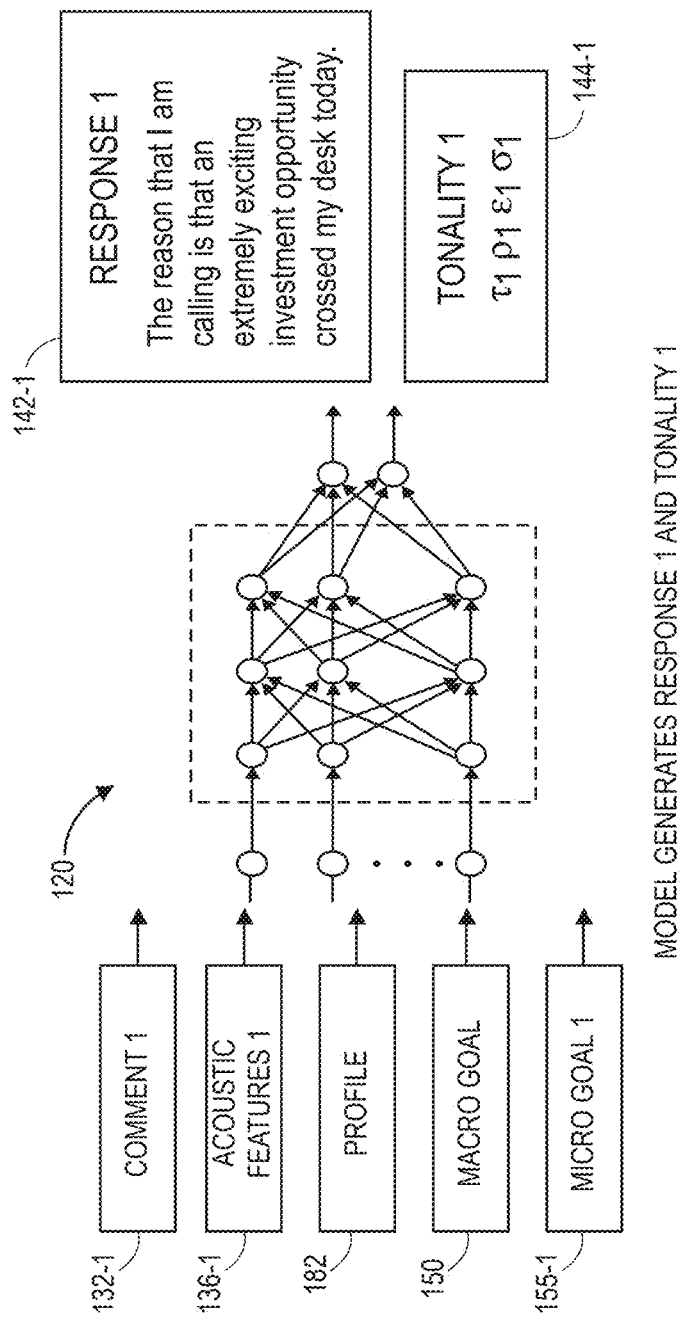

In accordance with implementations of the present disclosure, a response to a comment received from a target individual during a conversational experience and a tonality by which the response is to be presented to the target individual may be selected to maximize a likelihood that a micro goal will be accomplished in furtherance of a macro goal for the conversational experience. As is shown in FIG. 1C, a plurality of inputs including the set of words of the comment 132-1, as well as acoustic features 136-1 of sounds received from the individual 180, viz., one or more pitches (or frequencies), a duration, or one or more intensities (or loudnesses), information or data from the profile 182 of the individual 180, identifiers of the macro goal 150 and the micro goal 155-1 selected in response to the comment 132-1 are provided to one or more models 120. A set of words of a response 142-1 to the comment 132-1 and a tonality 144-1 by which the response 142-1 is to be presented to the individual 180 may be identified based on a plurality of outputs received from the models 120 in response to the plurality of inputs.

For example, as is shown in FIG. 1C, the response 142-1 includes the set of words, "The reason that I am calling is that an extremely exciting investment opportunity crossed my desk today," which may be selected based on one or more of the outputs. Additionally, the tonality 144-1 is defined with respect to qualitative or quantitative factors by which the response 142-1 is to be presented to the individual 180, e.g., a tone $\tau_1$, a pace $\rho_1$, an emphasis pattern si and a sentiment ai, which also may be identified directly based on the outputs received from the models 120, or selected based on such outputs. For example, in some implementations, where outputs from the models 120 identify one or more factors such as a tone, a pace, an emphasis pattern or a sentiment, the tonality 144-1 may be one of a plurality of preestablished tonalities having factors that are nearest, closest or most similar to the factors identified in the outputs that is selected accordingly.

Figure 1D:
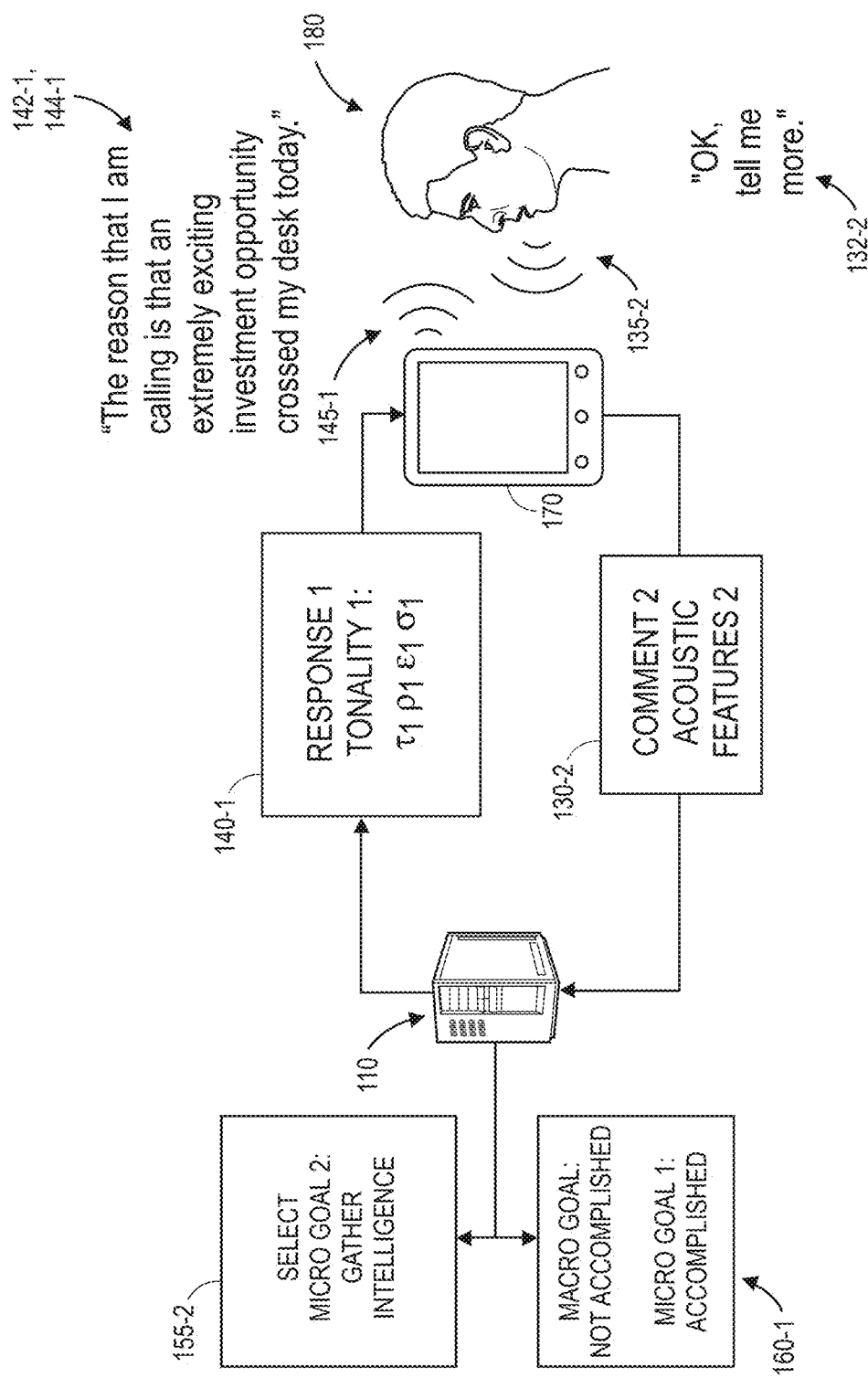

As is shown in FIG. 1D, upon identifying the response 142-1 to the comment 132-1 and the tonality 144-1 by which the response 142-1 is to be presented to the individual 180, the communication system 110 may continue the conversational experience with the individual 180, e.g., by transmitting a set of data 140-1 representing the response 142-1 and the tonality 144-1 by which the response 142-1 is to be presented to the individual 180 to the personal device 170.

As is also shown in FIG. 1D, the personal device 170 may interpret the set of data 140-1 received from the communication system 110 to generate audible sounds 145-1 representing the set of words of the response 142-1 in accordance with the tonality 144-1, and to cause such sounds 145-1 to be played to the individual 180 by one or more speakers or other acoustic emitters of the personal device 170. Upon hearing the audible sounds 145-1, the individual 180 elects to utter a comment 132-2, viz., "OK, tell me more." Sounds 135-2 including the comment 132-2 are captured by one or more microphones or other acoustic sensors of the personal device 170, which generates a set of data 130-2 representing the comment 132-2 and acoustic features of such sounds 135-2, and transmits the set of data 130-2 to the communication system 110.

As is further shown in FIG. 1D, the communication system 110 selects a new micro goal 155-2, viz., to gather intelligence from the individual 180, in furtherance of the macro goal 150. For example, the communication system 110 may interpret the set of data 130-2 to identify the comment 132-2, and make a determination 160-1 that the macro goal 150 has not yet been accomplished but also that the micro goal 155-1 was accomplished based on the comment 132-2. The micro goal 155-2 may be selected in accordance with a predetermined template or script, as a part of a language pattern, or in any other manner and on any other basis.

As is shown in FIG. 1E, a plurality of inputs including the sets of words of the comments 132-1, 132-2, as well as acoustic features 136-1, 136-2 of sounds represented in the data 130-1, 130-2, information or data from the profile 182 of the individual 180, identifiers of the macro goal 150 and the micro goal 155-2 selected in response to the comment 132-2 are provided to the one or more models 120, and a set of words of a response 142-2 to the comment 132-2 and a tonality 144-2 by which the response 142-2 is to be presented to the individual 180 may be identified based on a plurality of outputs received from the models 120 in response to the plurality of inputs. For example, as is shown in FIG. 1E, the response 142-2 includes the set of words, "Can I ask you a question? What if I told you that a rare Italian sports car was available for just $10,000? Would that interest you?" which may be selected based on one or more of the outputs. Additionally, the tonality 144-2 is defined with respect to qualitative or quantitative factors by which the response 142-2 is to be presented to the individual 180, e.g., a tone $\tau_2$, a pace $\rho_2$, an emphasis pattern $\varepsilon_2$ and a sentiment $\sigma_2$, which also may be identified directly based on the outputs received from the models 120, or selected based on such outputs.

Figure 1F:
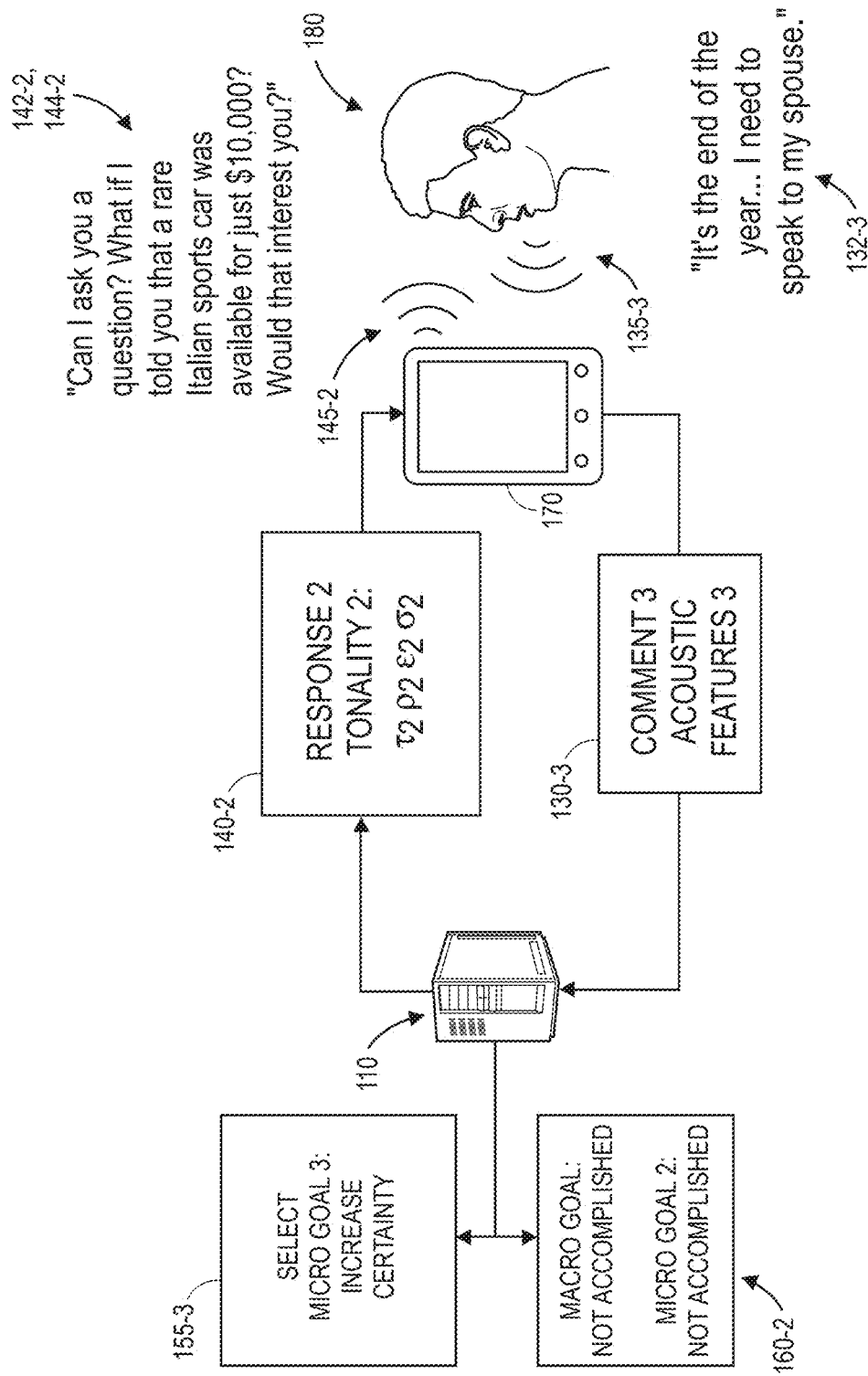

As is shown in FIG. 1F, upon identifying the response 142-2 to the comment 132-2 and the tonality 144-2 by which the response 142-2 is to be presented to the individual 180, the communication system 110 may continue the conversational experience with the individual 180, e.g., by transmitting a set of data 140-2 representing the response 142-2 and the tonality 144-2 by which the response 142-2 is to be presented to the individual 180 to the personal device 170.

As is also shown in FIG. 1F, the personal device 170 may interpret the set of data 140-2 received from the communication system 110 to generate audible sounds 145-2 representing the set of words of the response 142-2 in accordance with the tonality 144-2, and to play such sounds 145-2 to the individual 180 by one or more speakers or other acoustic emitters. Upon hearing the audible sounds 145-2, the individual 180 elects to utter a comment 132-3, viz., "It's the end of the year . . . I need to speak to my spouse." Sounds 135-3 including the comment 132-3 are captured by one or more microphones or other acoustic sensors of the personal device 170, which generates a set of data 130-3 representing the comment 132-3 and acoustic features of such sounds 135-3, and transmits the set of data 130-3 to the communication system 110.

As is further shown in FIG. 1F, the communication system 110 selects a new micro goal 155-3, viz., to increase a level of certainty, in furtherance of the macro goal 150. For example, the communication system 110 may interpret the set of data 130-3 to identify the comment 132-3, and make a determination 160-2 that the macro goal 150 has not yet been accomplished but also that the micro goal 155-2 was not accomplished based on the comment 132-3. The micro goal 155-3 may be selected in accordance with a predetermined template or script, as a part of a language pattern, or in any other manner and on any other basis.

Figure 1G:
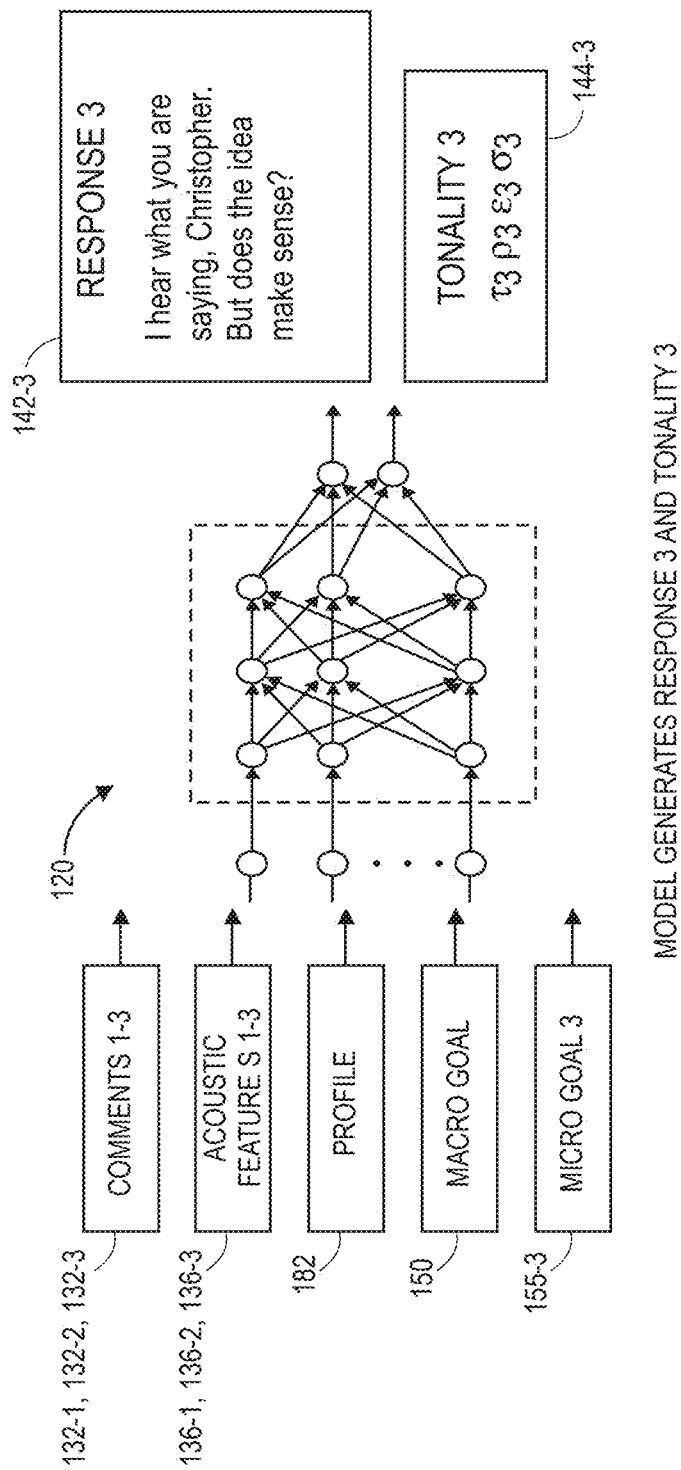

As is shown in FIG. 1G, a plurality of inputs including the set of words of the comment 132-1, 132-2, 132-3, as well as acoustic features 136-1, 136-2, 136-3 of sounds represented in the data 130-1, 130-2, 130-3, information or data from the profile 182 of the individual 180, identifiers of the macro goal 150 and the micro goal 155-3 selected in response to the comment 132-3 are provided to the one or more models 120, and a set of words of a response 142-3 to the comment 132-3 and a tonality 144-3 by which the response 142-3 is to be presented to the individual 180 may be identified based on a plurality of outputs received from the models 120 in response to the plurality of inputs. For example, as is shown in FIG. 1G, the response 142-3 includes the set of words, "I hear what you are saying, Christopher. But does the idea make sense?" which may be selected based on one or more of the outputs. Additionally, the tonality 144-3 is defined with respect to qualitative or quantitative factors by which the response 142-3 is to be presented to the individual 180, e.g., a tone $\tau_3$, a pace $\rho_3$, an emphasis pattern $\varepsilon_3$ and a sentiment $\sigma_3$, which also may be identified directly based on the outputs received from the models 120, or selected based on such outputs.

Figure 1H:
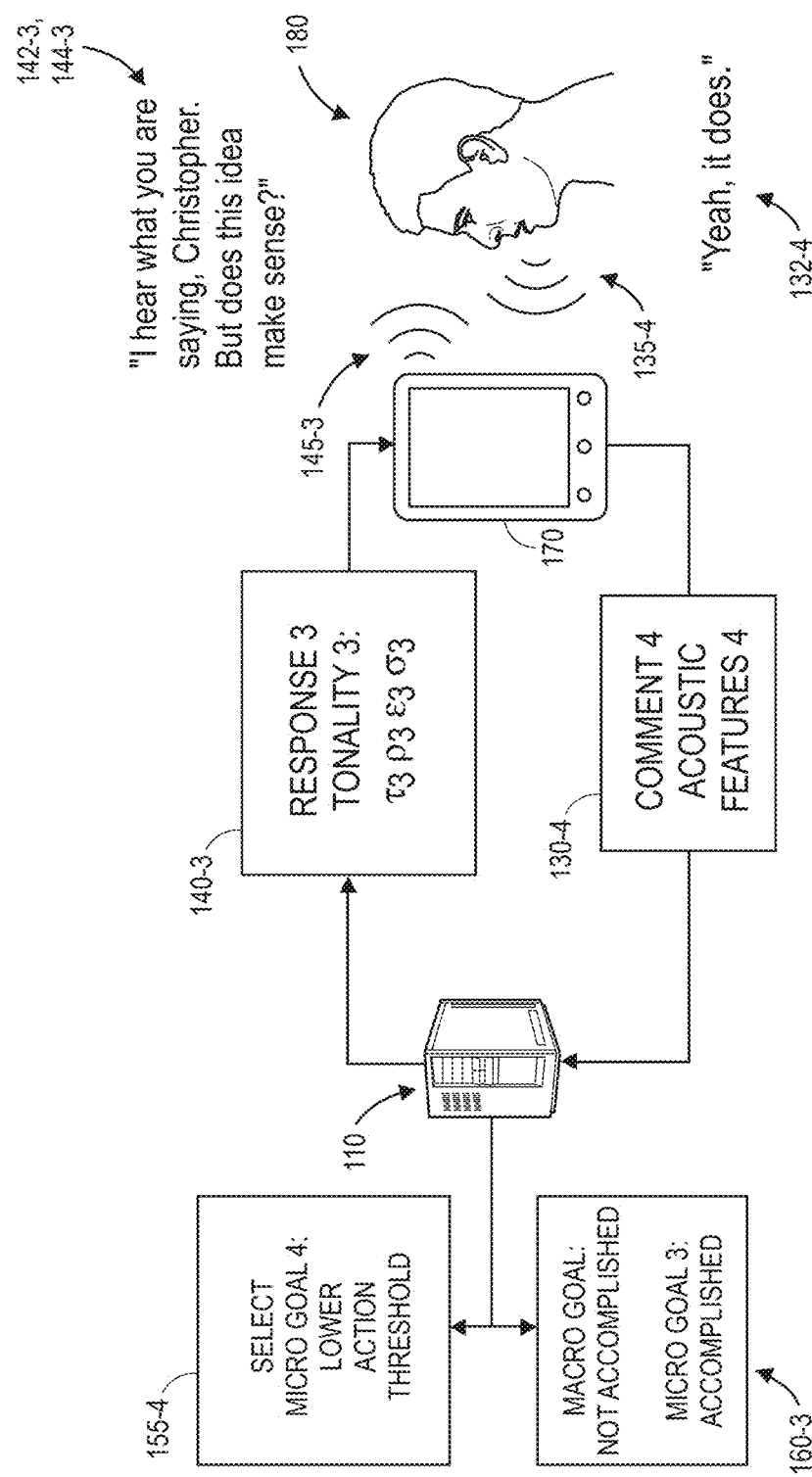

As is shown in FIG. 1H, upon identifying the response 142-3 to the comment 132-3 and the tonality 144-3 by which the response 142-3 is to be presented to the individual 180, the communication system 110 may continue the conversational experience with the individual 180, e.g., by transmitting a set of data 140-3 representing the response 142-3 and the tonality 144-3 by which the response 142-3 is to be presented to the individual 180 to the personal device 170.

As is also shown in FIG. 1H, the personal device 170 may interpret the set of data 140-3 received from the communication system 110 to generate audible sounds 145-3 representing the set of words of the response 142-3 in accordance with the tonality 144-3, and to play such sounds 145-3 to the individual 180 by one or more speakers or other acoustic emitters. Upon hearing the audible sounds 145-3, the individual 180 elects to utter a comment 132-4, viz., "Yeah, it does." Sounds 135-4 including the comment 132-4 are captured by one or more microphones or other acoustic sensors of the personal device 170, which generates a set of data 130-4 representing the comment 132-4 and transmits the set of data 130-4 to the communication system 110.

As is further shown in FIG. 1H, the communication system 110 selects a new micro goal 155-4, viz., to lower an action threshold of the individual 180, in furtherance of the macro goal 150. For example, the communication system 110 may interpret the set of data 130-4 to identify the comment 132-4, and make a determination 160-3 that the macro goal 150 has not yet been accomplished but also that the micro goal 155-3 was accomplished based on the comment 132-4. The micro goal 155-4 may be selected in accordance with a predetermined template or script, as a part of a language pattern, or in any other manner and on any other basis.

Figure 1I:
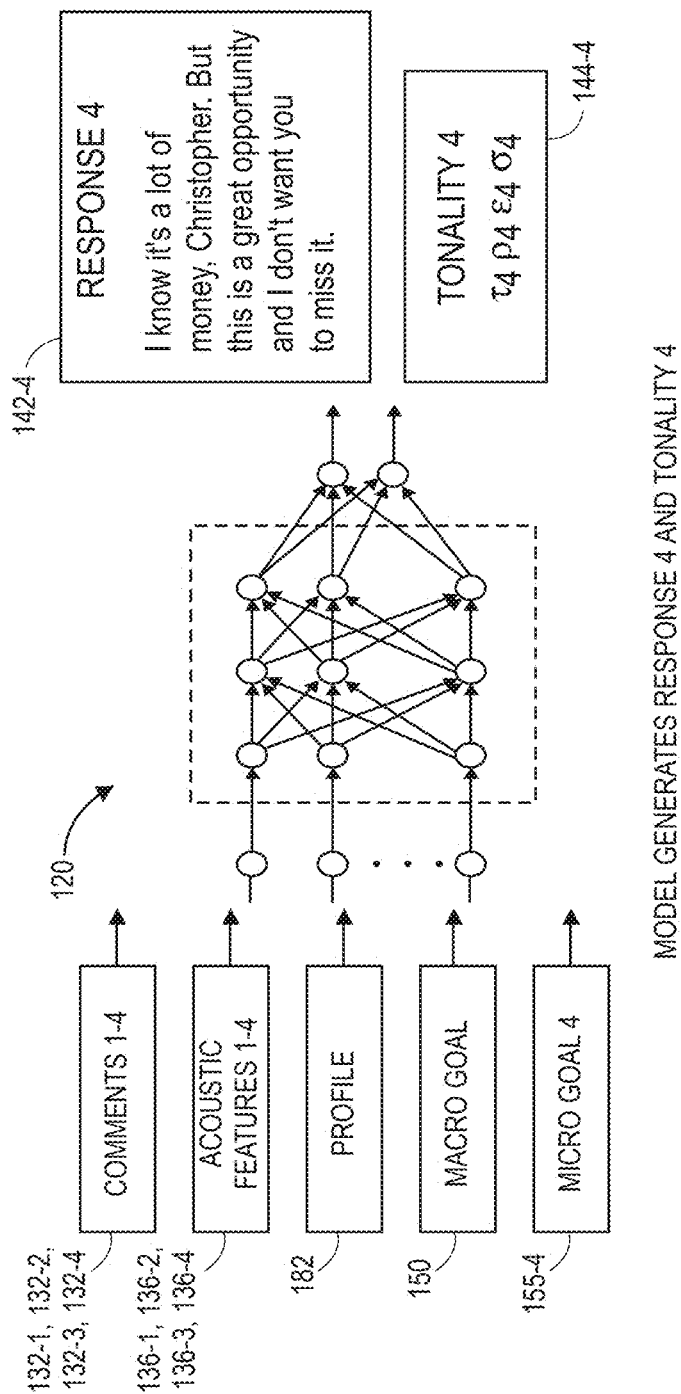

As is shown in FIG. 1I, a plurality of inputs including the set of words of the comment 132-1, 132-2, 132-3, 132-4, as well as acoustic features 136-1, 136-2, 136-3, 136-4 of sounds represented in the data 130-1, 130-2, 130-3, 130-4, information or data from the profile 182 of the individual 180, identifiers of the macro goal 150 and the micro goal 155-4 selected in response to the comment 132-4 are provided to the one or more models 120, and a set of words of a response 142-4 to the comment 132-4 and a tonality 144-4 by which the response 142-4 is to be presented to the individual 180 may be identified based on a plurality of outputs received from the models 120 in response to the plurality of inputs. For example, as is shown in FIG. 1I, the response 142-4 includes the set of words, "I know it's a lot of money, Christopher. But this is a great opportunity and I don't want you to miss it," which may be selected based on one or more of the outputs. Additionally, the tonality 144-4 is defined with respect to qualitative or quantitative factors by which the response 142-4 is to be presented to the individual 180, e.g., a tone $\tau_4$, a pace $\rho_4$, an emphasis pattern 64 and a sentiment $\sigma_4$, which also may be identified directly based on the outputs received from the models 120, or selected based on such outputs.

Figure 1J:
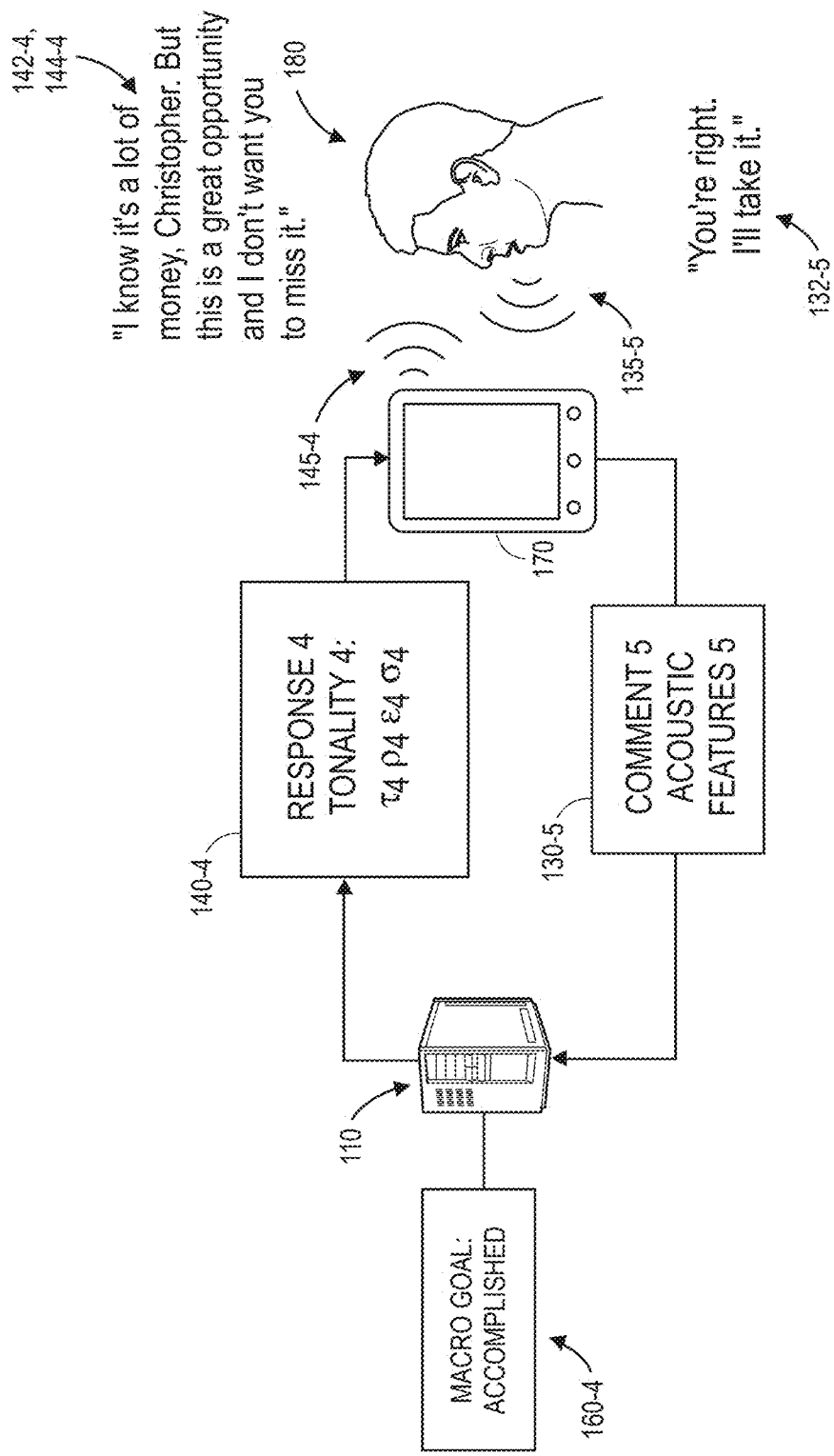

As is shown in FIG. 1J, upon identifying the response 142-4 to the comment 132-4 and the tonality 144-4 by which the response 142-4 is to be presented to the individual 180, the communication system 110 may continue the conversational experience with the individual 180, e.g., by transmitting a set of data 140-4 representing the response 142-4 and the tonality 144-4 by which the response 142-4 is to be presented to the individual 180 to the personal device 170.

As is also shown in FIG. 1J, the personal device 170 may interpret the set of data 140-4 received from the communication system 110 to generate audible sounds 145-4 representing the set of words of the response 142-4 in accordance with the tonality 144-4, and to play such sounds 145-4 to the individual 180 by one or more speakers or other acoustic emitters. Upon hearing the audible sounds 145-4, the individual 180 elects to utter a comment 132-5, viz., "You're right. I'll take it." Sounds 135-5 including the comment 132-5 are captured by one or more microphones or other acoustic sensors of the personal device 170, which generates a set of data 130-5 representing the comment 132-5 and transmits the set of data 130-5 to the communication system 110.

As is further shown in FIG. 1J, the communication system 110 interprets the set of data 130-5 to identify the comment 132-5, and makes a determination 160-4 that the macro goal 150 has been accomplished. Accordingly, the communication system 110 may determine that the comment 132-5 includes an instruction to complete the sale of the good (or the item or the product) that is the subject of the macro goal 150. Subsequently, an indication of an accomplishment of the macro goal 150, along with any evidence, proof or record of the accomplishment of the macro goal 150, may be stored in one or more data stores, and any actions required in order to confirm, memorialize or execute the accomplishment of the macro goal 150 may be undertaken either immediately or at a later date or time. Additionally, in some implementations, information or data regarding the conversational experience and pairs of comments received from the target individual and the various responses or tonalities generated in reply to such comments, e.g., a pair of the response 142-1 and the tonality 144-1 generated by the communication system 110 in reply to the comment 132-1 and the comment 132-2 received from the individual 180 following the presentation of the response 142-1 in the tonality 144-1, as well as a pair of the response 142-2 and the tonality 144-2 generated by the communication system 110 in reply to the comment 132-2 and the comment 132-3 received from the individual 180 following the presentation of the response 142-2 in the tonality 144-2, a pair of the response 142-3 and the tonality 144-3 generated by the communication system 110 in reply to the comment 132-3 and the comment 132-4 received from the individual 180 following the presentation of the response 142-3 in the tonality 144-3, and a pair of the response 142-4 and the tonality 144-4 generated by the communication system 110 in reply to the comment 132-4 and the comment 132-5 received from the individual 180 following the presentation of the response 142-4 in the tonality 144-4, may be stored in one or more data stores. The conversational experience or any of such pairs may be labeled as successful, or labeled with an extent or a degree of success, and the communication system 110 may use information or data regarding the conversational experience and labels to train the models 120 by which the responses and tonalities were selected.

Alternatively, had the macro goal 150 or any of the micro goals 155-0, 155-1, 155-2, 155-3, 155-4 not been accomplished, the conversational experience or any of such pairs may have been labeled as unsuccessful, or labeled with an extent or a degree of success, and the communication system 110 may use information or data regarding the conversational experience and the labels to train the models 120 by which the responses and tonalities were selected.

Accordingly, the systems and methods of the present disclosure may be used to provide conversational agents that select text-based responses to be presented to individuals, as well as tonalities by which the text-based responses are to be presented, in order to accomplish a selected micro goal or, ultimately, a macro goal of persuasion during a conversational experience. Sets of text of responses and tonalities may be identified using one or more machine learning models (or algorithms, systems or techniques). For example, a tonality may be represented as a tone of speech, an intensity, a speech rate, a pattern of intonation or a rhythm, and may be defined or selected with respect to one or more quantitative values. Alternatively, a tonality may be represented as one or more qualitative attributes, e.g., a label or identifier with reference or a mood, a motif, or a theme that is intended to be established while attempting to accomplish a micro goal or, ultimately, a macro goal.

One or more of the machine learning models (or algorithms, systems or techniques) of the present disclosure may include artificial neural networks (or "neural networks"), or artificial neural network architectures, which are parallel distributed computing processor systems comprised of individual units that may collectively learn and store experimental knowledge, which may be utilized in connection with one or more applications. Such networks may simulate the non-linear mental performance of the many neurons of the human brain in multiple layers by acquiring knowledge from environments through one or more flexible learning processes, determining strengths of respective connections between such neurons, and utilizing such strengths when storing acquired knowledge. Like a human brain, an artificial neural network may use any number of neurons in any number of layers, including an input layer, an output layer, and one or more intervening hidden layers.

Artificial neural networks may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within an artificial neural network may receive an input and generate an output in accordance with an activation or energy function, with parameters corresponding to the various strengths or synaptic weights. For example, in a heterogeneous neural network, each of the neurons within the network may be understood to have different activation or energy functions. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Artificial neural networks may be trained according to any number of techniques, which may be typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize errors in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

In some implementations, a machine learning model, such as an artificial neural network, may be trained to recommend actions upon an environment, and may be trained based on rewards or penalties resulting from such actions taken to change a state of the environment. Where a conversational experience with a target individual in pursuit of a macro goal is in progress, a neural network may be trained to recommend an action based on a representation of a state of an environment, e.g., the conversational experience, and feedback received from the target individual indicating an extent of success of the action (e.g., a reward or a penalty associated with the action) is determined. For example, a recommended action may identify not only a set of words to be included in a response to a comment received from a target individual but also a tonality by which the set of words is to be presented to the target individual. Subsequently, a representation of the state of the environment is updated following the action, e.g., based on a response received from the target individual in reply to the comment in the tonality, and the model may be further trained or fine-tuned based on the feedback, before another action is recommended based on the updated state.

Once a neural network has been trained to recognize dominant characteristics of an input of a training set, e.g., to associate an input with a label to within an acceptable tolerance, any input may be provided to the trained network, and a label may be identified based on an output thereof received in response to the input.

The systems and methods of the present disclosure may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 2A:
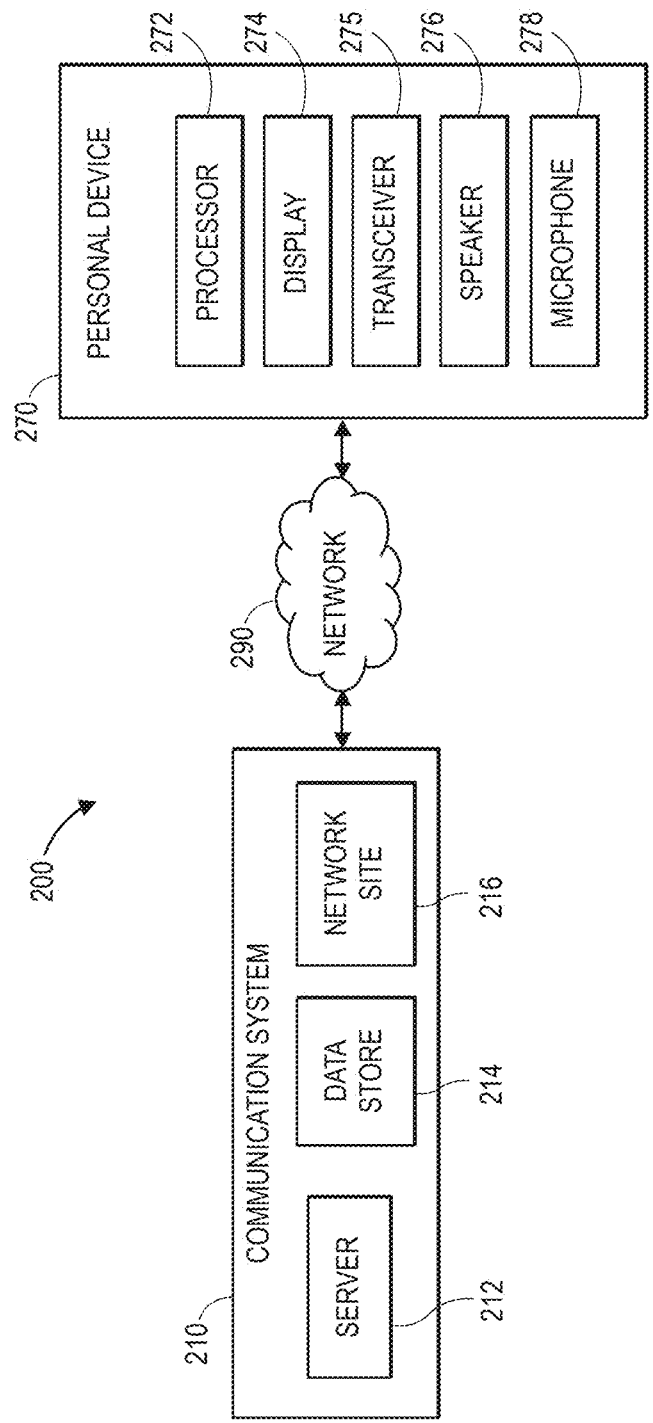
FIGS. 2A and 2B are views of aspects of one system in accordance with embodiments of the present disclosure.
Figure 2B:
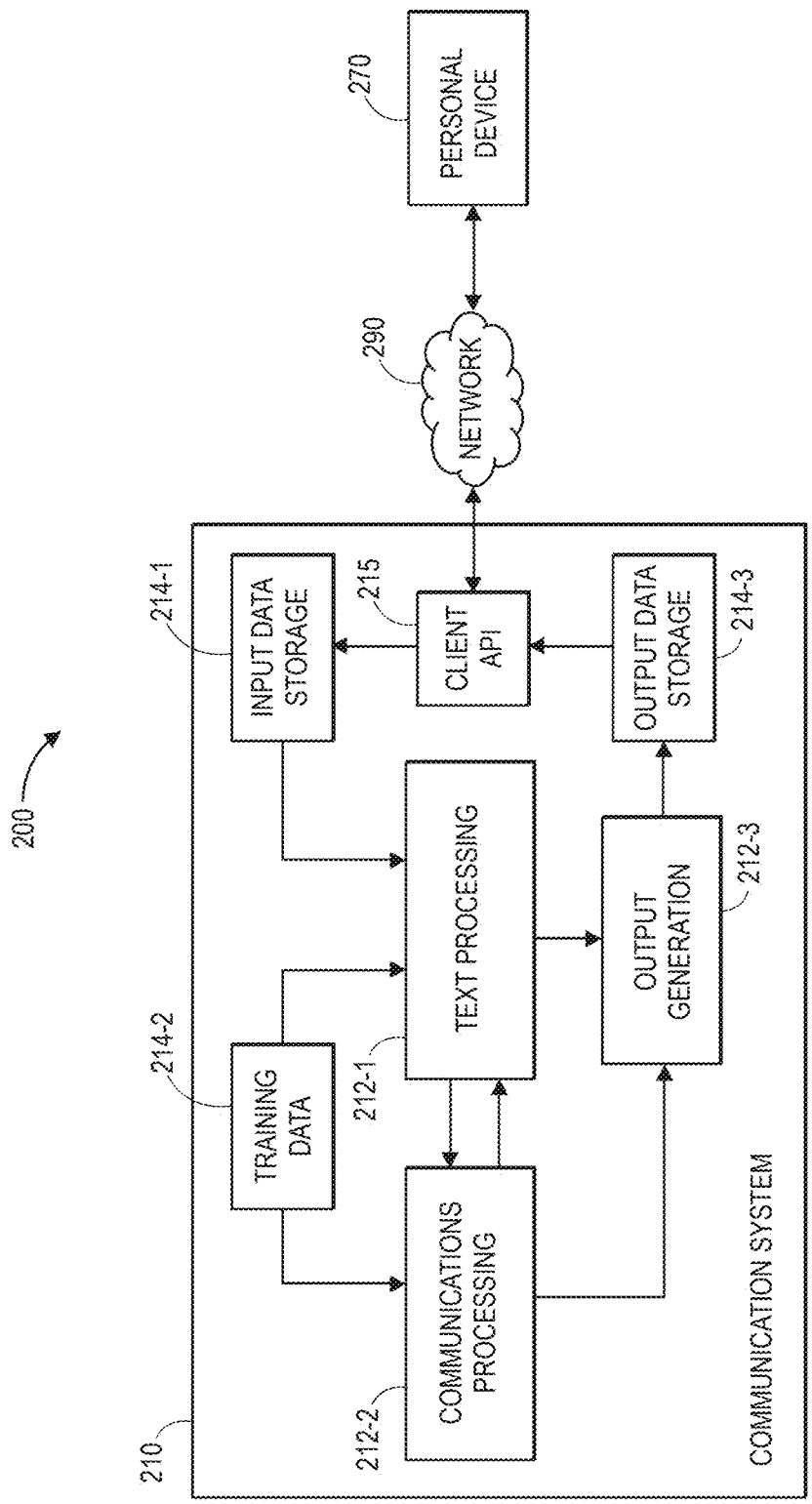

Referring to FIGS. 2A and 2B, a view of aspects of one system in accordance with embodiments of the present disclosure is shown. As is shown in FIG. 2A, a system 200 includes a communication system 210 (e.g., a source system, or a conversational system) and a personal device 270 (e.g., a target system) that are connected to one another over one or more networks 290, which may include the Internet in whole or in part.

The communication system 210 may include any number of devices, components or systems for receiving and distributing digital media, e.g., sounds or other audio content, still or moving images or other video content, or other media, by way of a networked computer infrastructure including one or more physical computer servers 212 and data stores 214 (e.g., databases) for hosting a network site 216 (or network sites). For example, the communication system 210 may be any individual or entity associated with the operation of one or more conversational agents for engaging in communication with devices associated with one or more humans, e.g., the personal device 270, over the networks 290.

The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the communication system 210, including but not limited to engaging with any number of personal devices 270. The servers 212 and/or the computer processors may connect to or otherwise communicate with the networks 290, through the sending and receiving of digital data.

In some implementations, the communication system 210 may be a cloud-based system or network including a pool of network-accessible computing resources (e.g., compute resources, storage resources or networking resources, which may be configured or provided to execute any number of applications or services) that may be accessed by the one or more target systems, or applications operating thereon. Where the communication system 210 is a cloud-based source system, the communication system 210 may access any of a shared pool of configurable computing resources, which may be programmatically provisioned and released in response to commands, or dynamically reconfigured as necessary during a conversational experience. Additionally, and also where the communication system 210 is a cloud-based source system, the communication system 210 may include not only one or more applications for initiating or maintaining a conversational experience with an individual, or receiving a request or an initiation of a conversational experience from an individual, but also connections to one or more networks, which may include the Internet in whole or in part.

The personal device 270 may be any peripheral output device capable of receiving and playing aloud or otherwise outputting any content, or capturing and transmitting any content. The personal device 270 may be associated with any user (e.g., an individual or entity), and may be a general purpose or a special purpose device for receiving and playing content, or for capturing and transmitting any content, or otherwise communicating with other computer devices over the networks 290. For example, the personal device 270 may be a standard telephone, a mobile device of any type or form (e.g., a smartphone, a tablet computer, a wearable computer device such as a pair of augmented reality glasses or a wristwatch), or any other type or form of networked computer device (e.g., a personal digital assistant, a digital media player, a desktop computer, a laptop computer) or any other like machine that may operate or access one or more hardware components or software applications, or communicate with the communication system 210 or other computer systems.

The personal device 270 may include a processor 272, a display (or screen) 274, a transceiver 275, a speaker 276 and a microphone 278.

The processor 272 may be configured to perform any type or form of computing function associated with the operation of the personal device 270, including but not limited to the execution of one or more machine learning tools, algorithms or techniques. The processor 272 may also be configured to execute any other algorithms or techniques (e.g., object detection or recognition algorithms or techniques) associated with one or more applications, purposes or functions, and may communicate with the communication system 210, or any other external computing devices or machines over the network, through the sending and receiving of digital data.

The processor 272 may be a uniprocessor system including one processor, or a multiprocessor system including several processors (e.g., two, four, eight, or another suitable number), and may be capable of executing instructions. For example, in some implementations, the processor 272 may be a general-purpose or embedded processor unit such as a CPU or a GPU having any number of instruction set architectures (ISAs), such as the x86, PowerPC, SPARC, or MIPS ISAs, or any other suitable ISA. Where the processor 272 is a multiprocessor system, each of the processors within the multiprocessor system may operate the same ISA, or different ISAs. The processors 272 may be configured to operate one or more software applications, e.g., a browser, a viewing application operating one or more codecs, a shopping application, and render content to the display 274 via one or more user interfaces. The processor 272 may execute one or more computer-based instructions that may be stored on one or more data stores (e.g., memory or storage components) for storing any type of information or data, e.g., content received over the one or more networks 290, or any associated information, data or metadata, such as one or more sets of operating programs or instructions.

The display 274 may be a screen, a monitor or any other like component for viewing rendered video content. For example, the display 274 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 274 may be configured to receive content from any number of sources via one or more wired or wireless connections, including but not limited to the communication system 210, over the one or more networks 290.

The personal device 270 also includes one or more transceivers 275, which may be configured to enable the personal device 270 to communicate through one or more wired or wireless means, e.g., standard wireless protocols such as Bluetooth® or any Wireless Fidelity (or "Wi-Fi") protocol, or standard wired technologies such as Universal Serial Bus (or "USB") or fiber optic cable, over the one or more networks 290 or directly.

The transceivers 275 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceivers 275 may further include or be in communication with one or more input/output (or "I/O") interfaces, network interfaces and/or input/output devices, and may be configured to allow information or data to be exchanged between one or more of the components of the personal device 270, or to one or more other computer devices or systems (e.g., other aerial vehicles, not shown) via the one or more networks 290. For example, in some implementations, the transceivers 275 may be configured to coordinate I/O traffic between the personal device 270 and one or more external computer devices or components, and may perform any necessary protocol, timing or other data transformations in order to convert data signals from a first format suitable for use by one component into a second format suitable for use by another component. In some implementations, the transceivers 275 may include support for devices attached through various types of peripheral buses, e.g., variants of the Peripheral Component Interconnect (PCI) bus standard or the Universal Serial Bus (USB) standard. In some other implementations, functions of the transceivers 275 may be split into two or more separate components, or integrated with the processor 272.

The speaker 276 may be any type or form of transducer for converting electrical signals into sound energy. The speaker 276 may have any degree of technical complexity, and may be, for example, an electrodynamic speaker, an electrostatic speaker, a flat-diaphragm speaker, a magnetostatic speaker, a magnetostrictive speaker, a ribbon-driven speaker, a planar speaker, a plasma arc speaker, or any other type or form of speaker. Alternatively, the speaker 276 may be basic or primitive, such as an audio speaker having a limited bit range or capacity. Additionally, the speaker 276 may be a single speaker adapted to emit sounds over a wide range of frequency, or may include one or more components (e.g., tweeters, mid-ranges, and woofers) for emitting sounds over wide ranges of frequencies. In some embodiments, the speaker 276 may be a sound emitter having an expanding or contracting crystal that vibrates in air or another medium in order to produce sounds. In some embodiments, the speaker 276 may be any type or form of device configured to cause one or more elements of the personal device 270 to vibrate at a predetermined resonance frequency.

The microphone 278 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 278 may also be provided as a discrete component, e.g., separate from but in communication with the personal device 270, or in combination with one or more other components, such as an imaging device. Furthermore, the microphone 278 may be configured to detect and record acoustic energy from any and all directions.

Those of ordinary skill in the pertinent arts will recognize that the personal device 270 may include any number of other hardware components or execute any number of software applications for receiving and rendering content received from the communication system 210 or other sources.

Moreover, those of ordinary skill in the pertinent arts will further recognize that, alternatively, in some implementations, the personal device 270 need not be associated with a given individual. For example, the personal device 270 may be provided in a public place, beyond the control of any one user, in any location where any individuals may view and/or interact with the communication system 210.

The communication system 210 may be configured to execute any number of software modules, applications or machine learning models (or algorithms, systems or techniques) in accordance with implementations of the present disclosure. As is shown in FIG. 2B, the communication system 210 may be configured to execute a plurality of machine learning models (or algorithms, systems or techniques), including a text processing module 212-1, communications processing modules 212-2, and an output generation module 212-3. The communication system 210 further includes a plurality of data stores, e.g., an input data store 214-1, a training data store 214-2, and an output data store 214-3. Additionally, the communication system 210 also includes a client application programming interface 215 (or another client interface) that enables the personal device 270 to interact with the communication system 210 over the one or more networks 290.

The text processing module 212-1 may process data received from the personal device 270, which may be stored in the input data store 214-1, according to any number of machine learning models (or algorithms, systems or techniques). In some implementations, the text processing module 212-1 may execute one or more language models, e.g., large language models, that are trained based on textual data to generate coherent and contextually relevant text-based replies or responses, including sets of words that mimic language that might otherwise be generated by a human, such as responses to comments received from target individuals by way of the personal device 270. The text processing module 212-1 may include an artificial neural network architecture, such as a transformer-based architecture, having any number of layers that are configured to encode sets of words or decode data into sets of words, or take any other action with respect to input data or responses generated from the input data. The text processing module 212-1 may also include one or more self-attention layers or mechanisms to determine levels of importance or significance of one or more encoded sets of words with respect to other encoded sets of words, in view of a context of the any of the sets of words or any prior turns in a conversational experience. The text processing module 212-1 may thus determine any nuanced meanings or relationships set forth or embedded in the sets of words, or update meanings or relationships determined from words in comments received from the target individual prior to the comment i, or one or more comments generated in response to such comments, and may update a context identified from such sets of words.

The text processing module 212-1 may further include any number of speech-to-text (or "STT") modules based on data received from the personal device 270 or stored in the input data store 214-1. Such modules may be trained to convert data representing spoken or sung words into written text, such as by filtering noise from the data, segmenting words expressed in the data, and extracting acoustic features such as frequency or pitch from the data, e.g., by a melfrequency cepstral coefficients technique, or in any other manner. Such modules may further map acoustic features to words by the use of deep neural networks, convolutional neural networks, Gaussian Mixture Models, Hidden Markov Models, or other models, and may predict word sequences or other patterns of words. Such models may further execute one or more natural language processing (or "NLP") or natural language understanding (or "NLU" techniques) to understand data representing spoken or sung words and transform the data into sets of text.

The communications processing modules 212-2 may include any modules or features for selecting features of tonalities by which sets of words are to be presented to individuals in accordance with such tonalities. For example, the communications processing modules 212-2 may include a voice tonality module for identifying or selecting tonalities based on quantitative or qualitative factors, or for generating data representing words in such tonalities. The communications processing modules 212-2 may further include a tone module for identifying or selecting a tone of speech (or a pitch, or a fundamental frequency) for a set of words in accordance with a tonality, as well as a pacing module for identifying or selecting a pace of speech (or a speech rate) for a set of words in accordance with a tonality, an emphasis module for identifying or selecting points of emphases within a set of words in accordance with a tonality, and a sentiment module for identifying or selecting a sentiment by which a set of words is to be presented in accordance with a tonality.

The output generation module 212-3 may include any modules or features for generating data representing sets of words generated by a text processing module 212-1 in a tonality selected or generated by a communications processing module 212-2. For example, the output generation module 212-3 may execute one or more text-to-speech engines to analyze the sets of words generated by the text processing module 212-1 and features of any tonalities identified or generated by the communications processing module 212-2 to determine how words should be pronounced in accordance with such tonalities. In some implementations, the output generation module 212-3 may identify any phonemes represented in the sets of words and apply one or more rules or other techniques to represent such phonemes in accordance with a tone, a pace, an emphasis pattern or a sentiment of a tonality, or in accordance with any other features of the tonality (e.g., stresses, intonations, rhythms or others). The output generation module 212-3 may further generate one or more acoustic waveforms for presenting such words in such tonalites to an individual, e.g., by concatenative synthesis techniques, parametric synthesis techniques, or any other synthesis techniques. For example, in some implementations, acoustic waveforms may be generated in accordance with one or more sets of rules, according to one or more statistical models, or by one or more machine learning models (or algorithms, systems or techniques).

Outputs generated by the output generation module 212-3 may be stored in the output data store 214-3 and collated as necessary before being transmitted to the personal device 270 over the one or more networks 290.

Alternatively, or additionally, the text processing module 212-1, the communications processing module 212-2, and the output generation module 212-3 may operate based on data maintained in the training data store 214-2. The data maintained in the training data store 212-2 may include, but need not be limited to, information or data regarding one or more prior conversational experiences, including but not limited to words or tonalities by which conversational experiences were generated, comments received in response to such words expressed in such tonalities, or any responses and tonalities generated in reply to such comments, as well as macro goals or micro goals established or selected during such conversational experiences. The data may also include labels indicating whether pairs of turns in conversational experiences were successful or unsuccessful in accomplishing micro goals, as well as labels indicating whether the conversational experiences were successful or unsuccessful in accomplishing macro goals. The data may further include identities of individuals participating in such conversational experiences, as well as any personal information regarding such individuals, e.g., profiles of such individuals.

The communication system 210 may further include the client application programming interface 215, or another client interface, for providing communication between the personal device 270 and the communication system 210 over the one or more networks 290. For example, where the personal device 270 provides data to the communication system 210 via the client application programming interface 215, e.g., in a predefined format, the personal device 270 may anticipate or request a response from the communication system 210 in the same format, or initiate one or more defined actions accordingly. The client application programming interface 215 may enable the personal device to receive sets of data from the communication system 210, or provide information or data to the communication system 210, and to structure or provide such sets of data in any manner or in any format.

Although the system 200 shown in FIG. 2A shows boxes for one communication system 210, one personal device 270, and one network 290, those of ordinary skill in the pertinent arts will recognize that any number of communication systems 210, personal devices 270, or networks 290 may be considered in accordance with the present disclosure. For example, multiple users may access, view and interact with content provided by multiple communication system systems 210, via multiple personal devices 270. Moreover, the personal devices 270 with which users interact to access, view and interact with content may include all or fewer of the components shown in FIG. 2A or perform all or fewer of the functions described herein. For example, a user may receive content on one personal device 270, and respond to that content or otherwise execute interactions relating to that content on another personal device 270 or another. Similarly, although the system 200 shown in FIG. 2B shows boxes corresponding to one text processing module 212-1, one communications processing module 212-2, one output generation module 212-3, one input data store 214-1, one training data store 214-2, one output data store 214-3, and one client application programming interface 215, those of ordinary skill in the pertinent arts will recognize that any number of modules 212-1, 212-2, 212-3, data stores 214-1, 214-2, 214-3, or client application programming interfaces 215 may be considered in accordance with the present disclosure.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the communication system 210 to the personal device 270 over multiple networks 290. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure. For example, in some implementations, a user may interact with a hardware system or a software application by one or more form-based selections, such as by selecting one or more options from a drop-down menu or another list, by selecting one or more radio buttons or check boxes, or by entering text into one or more fields, or by contact with one or more links or carousels. A user may make selections via tab entries, menu bars, hamburger menus or other navigation-based selectors, or by operating one or more controls such as sliders, toggle switches, spinners or other features. A user may further make any number of swiping gestures, tapping or holding gestures, or dragging-and-dropping gestures to interact with one or more images, map locations or colors in a palette or spectrum. A user may also make one or more voice-based commands, utterances or instructions, or biometric inputs such as fingerprints, facial recognition or other biometric techniques. Alternatively, a user may interact with a hardware system or a software application in any other manner or by any other technique.

The server 212 and the personal device 270, and associated components, may use any web-enabled or Internet applications or features, or any other client-server applications or features, to connect to the networks 290, or to communicate with one another, such as through short or multimedia messaging service (SMS or MMS) text messages. For example, the server 212 and the personal device 270 may be configured to transmit information or data in the form of synchronous or asynchronous messages to one another in real time or in near-real time, or in one or more offline processes, via the networks 290. Those of ordinary skill in the pertinent art would recognize that the server 212 or the personal device 270 may include or operate any of a number of computing components that are capable of communicating over the networks 290. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the server 212, the processor 272, or to any other computers or control systems utilized by the communication system 210 or the personal device 270, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3A:
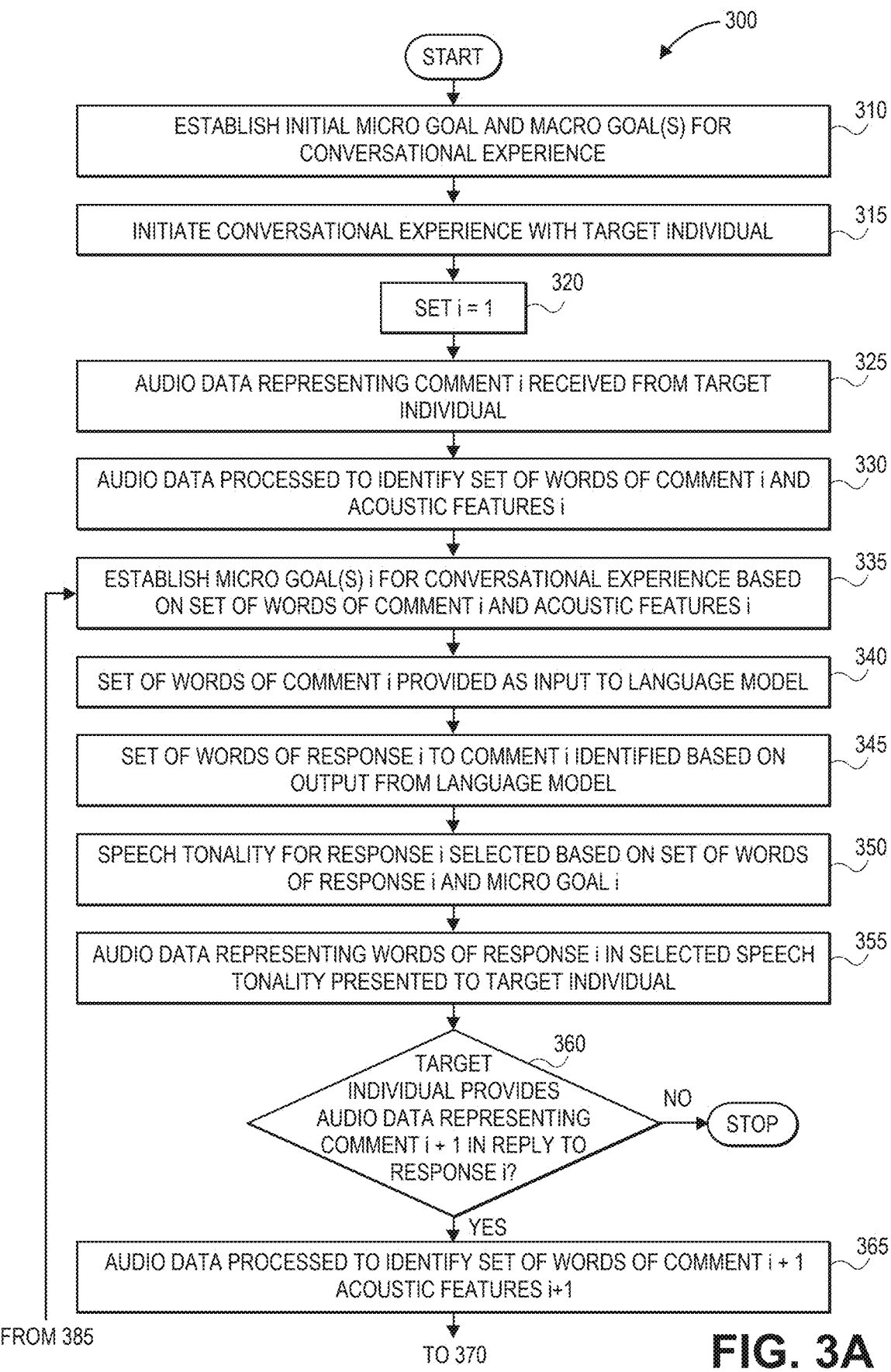
FIGS. 3A and 3B are a flow chart of one process in accordance with embodiments of the present disclosure.
Figure 3B:
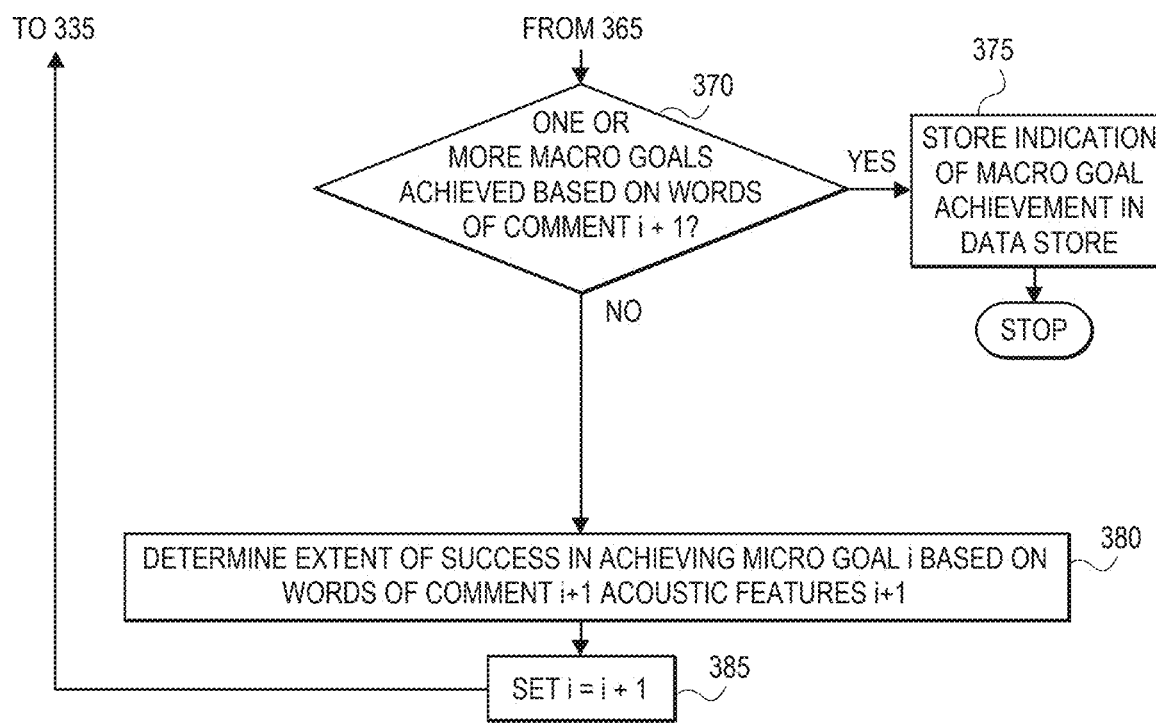

Referring to FIGS. 3A and 3B, a flow chart 300 of one process in accordance with implementations of the present disclosure is shown. At box 310, one or more macro goals and an initial micro goal are established for a conversational experience. The macro goals may relate to the performance of a specific task involving a target individual participating in the conversational experience, or a target audience having one or more individual members, any of whom may be selected for participation in the conversational experience.

A "macro goal" may be any ultimate objective, intention or measurable accomplishment or achievement of persuasion that is intended or desired following the completion of a conversational experience in accordance with implementations of the present disclosure. One macro goal may be to complete a sale of a good or a service to a target individual, or a member of a target audience. For example, a macro goal of a conversational experience may be to persuade a target individual who is participating in the conversational experience to execute a purchase or sale of one or more commodities, currencies, equities, fixed income assets, real estate, or any other goods or services. Alternatively, another macro goal may be to optimize a level of engagement of a target individual, such as to encourage or successfully convince the target individual to take one or more actions. Yet another macro goal may be to maintain a relationship with a target individual, e.g., to avoid attrition or a loss of the target individual to a competitor, rather than to sell a good or service to the individual, and thereby increase a likelihood that the target individual will purchase one or more other goods or services or increase his or her level of engagement in the future. Another macro goal may be to reach an agreement with a target individual, such as an agreement to meet on a future date or at a future time, or an agreement on terms of a contract.

A "micro goal" may be any intermediate objective, intention or measurable achievement that is intended or desired while the conversational experience is in progress, and is determined or believed to be beneficial to accomplishing one or more macro goals. For example, an initial micro goal may be selected during a conversational experience in order to increase a probability or a likelihood that macro goals will be accomplished prior to a conclusion of the conversational experience, such as to engage the target individual in further communication during the conversational experience, or to avoid having the target individual terminate the conversational experience. Any other type or form of circumstance, event or other thing that might be accomplished during a conversational experience may be identified or designated as a "macro goal" in accordance with implementations of the present disclosure, and an initial "micro goal" may be any other goal that is selected for purpose of increasing a probability or a likelihood of accomplishing a macro goal.

Macro goals and micro goals may be established in any manner. For example, in some implementations, one or more macro goals or micro goals may be manually established by one or more users of a system, e.g., a source system of the conversational experience. Such users may manually identify or designate macro goals or micro goals for one or more target individuals by one or more interactions with a user interface rendered on one or more displays by a source system, with another input/output device, or in any other manner, such as by one or more audible instructions or other signals to identify or designate a macro goal that are captured by a microphone or another acoustic sensor of a source system, or by any other interactions with any other input/output device. Alternatively, a macro goal or a micro goal may be automatically established or selected for a target individual in any manner or on any basis, such as by selecting a macro goal or a micro goal for a given target individual, or by selecting a target individual for a given macro goal or a given micro goal. For example, in some implementations, a macro goal or a micro goal may be selected based on any information or data that may be known regarding a target individual. Such information or data may include, but need not be limited to, personal information or data regarding a target individual such as a name of the target individual, an age of the target individual, an image of the target individual, a telephone number (or other contact information, such as an electronic mail address, or a social network name or handle) of the target individual, an identifier of a location of the target individual, a preference that the target individual is known or believed to have, a financial status or condition of the target individual, or any other information or data. Such information or data may be stored in a profile of the target individual or otherwise identified in any manner or obtained from any source.

In some implementations, a macro goal or a micro goal may be automatically established or selected for a target individual at random, e.g., by randomly selecting a macro goal or a micro goal for a given target individual, or by randomly selecting a target individual for a given macro goal or for a given micro goal. A macro goal or a micro goal may also be established or selected for a target individual in accordance with a predetermined schedule, e.g., at a periodic interval, or at any other time.

A conversational experience may be any communication including audible sounds between two or more systems, e.g., by way of one or more two-way (or bidirectional) communication channels between a source system and a target system. In some implementations, the conversational experience may include the transfer or exchange of data representing audible signals only, e.g., between a source system and a target system. For example, a target system (or a personal device) may be configured to capture audible sounds spoken or sung by a target individual, e.g., using one or more microphones or other acoustic sensors, and convert such audible sounds to data that may be transferred to a source system (or a conversational system, or a communication system) for processing and interpretation. Likewise, a source system may be configured to generate data representing audible sounds including selected words in selected tonalities, and to transfer such signals to a target system, which may process such data and present the audible sounds including the selected words spoken or sung in the selected tonalities to a target individual, e.g., by one or more speakers or other acoustic emitters.

In some implementations, the conversational experience may include the transfer or exchange of data representing audible signals, e.g., between a source system and a target system, as is described above. Additionally, during the conversational experience, an application or user interface operating on the target system may display one or more images representative of the conversational experience, any of which may include an image of a human, an avatar, or any other selected image, which may be updated or varied during a conversational experience, or may change from conversational experience to conversational experience.

At box 315, a conversational experience is initiated with the target individual. For example, in some implementations, the conversational experience may be initiated and maintained between two or more processor-enabled devices or systems, including a source system (e.g., an initiating system) of the conversational experience and one or more target systems (e.g., a system that receives a call, an inquiry or a request to participate in the conversational experience from the initiating system). The source system may be the same system by which a user establishes the one or more macro goals or the initial micro goal, or another such system.

The conversational experience may be initiated or maintained according to any number of communication protocols in accordance with implementations of the present disclosure. In some implementations, a source system may open a communications channel with one or more target systems according to a Session Initiation Protocol (or "SIP") or another client-server architecture that operates in tandem with one or more other protocols, and may initiate or control the operation of the conversational experience. For example, an SIP session may operate in concert with any number of real-time communication protocols, such as a Dynamic Adaptive Streaming protocol, an HTTP Live Streaming (or "HLS") protocol, a Real-Time Messaging Protocol (or "RTMP"), a Real-Time Streaming Protocol (or "RTSP"), or a Real-Time Transport Protocol (or "RTTP"). An SIP session may initiate the conversation experience via one or more Internet telephone (e.g., Voice over Internet Protocol, or "VoIP"), or video conference platforms or services. Alternatively, in some implementations, a target individual may operate a target system to initiate a conversational experience with a source system, e.g., by opening a communications channel with a source system according to a SIP session, such as by calling a selected telephone number associated with the source system, or by operating one or more applications operating on the target system, which may cause the communications channel to be opened.

The conversational experience may also be subject to any number of security protocols, e.g., Advanced Encryption Standard (or "AES") protocols, to ensure that only a source system and an intended target individual participates in the conversational experience, and that any private information shared during the conversational experience remains secure.

In some implementations, a source system may be a single computer system connected to a target system associated with a target individual over one or more networks. Alternatively, or additionally, in some implementations, a source system may be a cloud-based system or network including a pool of network-accessible computing resources (e.g., compute resources, storage resources or networking resources, which may be configured or provided to execute any number of applications or services) that may be accessed by the one or more target systems, or applications operating thereon. A cloud-based source system may access any of a shared pool of configurable computing resources, which may be programmatically provisioned and released in response to commands, or dynamically reconfigured as necessary during a conversational experience. A cloud-based source system may include not only one or more applications for initiating or maintaining the conversational experience but also connections to one or more networks, which may include the Internet in whole or in part.

A conversational experience may be initiated by the transfer of a set of audio data from a source system to a target system, or from a target system to a source system. The set of audio data may represent a selected set of words to be presented to a target individual operating the target system, as well as a selected tonality by which the set of words are to be presented. Alternatively, a set of audio data may represent a set of words spoken by the target individual, as well as any acoustic features, such as pitch (or frequency), duration, intensity (or loudness), or others.

In some implementations, where a conversational experience is initiated by a source system, a selected set of words and a selected tonality may be listed or identified in a predetermined template or script associated with the macro goal, or as a part of one or more language patterns. Alternatively, or additionally, the set of words may be selected or modified based on any known information or data regarding the target individual with whom the conversational experience is initiated, e.g., a profile of information or data regarding a target individual including a name of the target individual, an age of the target individual, a location of the target individual, a preference that the target individual is known or believed to have, or any other information or data, which may be identified in any manner or from any source. In some implementations, where a conversational experience is initiated by a target system, selected sets of words or selected tonalities for responding to anticipated comments received from a target individual operating the target system during the conversational experience may be listed or identified in a predetermined template or script associated with the macro goal, or as a part of one or more language patterns.

At box 320, a value of a step variable i is set equal to one, or i=1.

At box 325, a set of audio data representing a comment i including one or more spoken or sung words is received from a target individual, or an individual who may be associated with one or more of the macro goals of the conversational experience identified at box 310.

In some implementations, the comment i may be a reply to a set of words included in an initial turn of the conversational experience, in any tonality and in furtherance of any micro goal or macro goal, e.g., upon an initiation of the conversational experience at box 315, which may be represented in a set of audio data generated and transferred by the source system to one or more applications operating on the target system over one or more networks.

Alternatively, where the conversational experience is initiated by a target system, the comment i may be an initial comment or turn in the conversational experience upon a connection of a two-way (or bidirectional) communication channel between a source system and the target system. For example, the set of audio data representing the comment i may be captured by a microphone or another acoustic sensor of the target system, and subsequently transferred by one or more applications operating on the target system to the source system over one or more networks.

The set of audio data representing the comment i may be of any duration and the comment i may include any number of words. For example, where the set of audio data represents an initial comment or turn by the target individual in the conversational experience, the set of audio data may be brief, and the comment i may include a single word, or another substantially small number of words, viz., "hello?" "yes," "this is Bob Jones," or "how may I help you?" Alternatively, the set of audio data may have any other duration. The set of audio data may be transmitted by a target system to a source system in any manner and in any format, and in an original, uncompressed form, e.g., in a .WAV format, or following compression by the target system into one or more packets in a smaller form, e.g., in an MPEG Audio Layer III (or ".MP3") or Advanced Audio Coding (or ".AAC"), and at any bitrate.

At box 330, the audio data is processed to identify a set of words of the comment i and any acoustic features i represented in the audio data. The audio data received at box 325 may be processed by a source system that receives the audio data in a continuous manner, according to any automatic speech recognition (or "ASR") algorithms, systems or techniques, which may transform the audio data into sets of text represented therein. In some implementations, the audio data may be processed as necessary to reduce noise, to normalize the signals, or to otherwise enhance a level of quality of the audio data.

In some implementations, the audio data may be divided into segments (or frames) and transformed into a sequence of vectors (or sets of data in other formats) that represent acoustic features of the audio data. For example, in some implementations, an automatic speech recognition algorithm may amplify portions of the audio data, e.g., by applying one or more high-pass filters to the audio data, and split the audio data into overlapping frames of any duration. In some implementations, the audio data may be split into frames of approximately twenty to thirty milliseconds each, and such frames may overlap by approximately ten milliseconds. Alternatively, frames may have any length or duration, and may overlap by any other extent. Each of such frames may be further subjected to windowing processes, e.g., by a Hamming window, to ease transitions between adjacent frames.

Acoustic features of each of such frames may be extracted from the audio data according to one or more processes or techniques. For example, each of such frames may be converted from a time-domain signal into a frequency domain, e.g., by a Fast Fourier Transform (or "FFT"), representing a distribution or spectrum of power in frequency components for each of the frames. Additionally, such power spectrums may be scaled as necessary, e.g., according to a Mel scale, or compressed in range, and further transformed to obtain spectrum coefficients for each of the frames. As a result, each of the frames may be represented by a vector of acoustic features.

Further, in some implementations, a sequence of acoustic features derived from frames of the audio data may be mapped to one or more phonemes, or units of sound in a language. The features may be mapped to phonemes using one or more models such as deep neural networks, convolutional neural networks, Gaussian Mixture Models, Hidden Markov Models, or others, or in any other manner.

In some implementations, one or more models may predict a probability of a sequence of words represented in the audio data, or a most likely sequence of words, based on any number of phonemes recognized based on the sequence of features derived from the audio data. Such models may include, but need not be limited to, a recurrent neural network, a transformer-based model (e.g., a bidirectional encoder representations from transformers model), a generative pre-trained transformer model, or others.

In some implementations, the source system may execute one or more machine learning algorithms, systems or techniques on the audio data to generate any number of hypotheses as to contents of the audio data, including text data, token data, confidence scores or other information, data or metadata. For example, each of such hypotheses may include or identify a set of text (or tokens representative thereof) identified from the audio data, as well as a level of confidence (e.g., a score) that the set of text is represented in the audio data. In some implementations, the source system may identify a predetermined number of such hypotheses having the highest confidence scores.

At box 335, one or more micro goals i for the conversational experience are established based on the set of words of the comment i and the acoustic features i identified at box 330. A "micro goal" may be any intermediate objective, intention or measurable achievement that is intended or desired while the conversational experience is in progress, and is determined or believed to be beneficial to accomplishing one or more of the macro goals established at box 310. For example, one micro goal may be selected during a conversational experience in order to increase a probability or a likelihood that, prior to a conclusion of the conversational experience, one or more of the macro goals established at box 310 will be accomplished.

In some implementations, one or more of the micro goals i may be to receive a subsequent comment, e.g., a comment i+1, from a target individual. For example, one micro goal may be to maintain a conversational experience with the target individual in an active and ongoing status, and to avoid having the target individual terminate the conversational experience, such as by "hanging up" on the source system.

In some implementations, one or more of the micro goals i may be to increase a level of certainty of a target individual regarding the one or more macro goals i. For example, where one or more of the macro goals i is to complete a sale of a good or a service to the target individual, one or more of the micro goals i may be to enhance a level of knowledge of the target individual in one or more selected attributes or features of the good or the service.

In some implementations, one or more of the micro goals i may be to increase a level of trust of a target individual in a good or a service, a level of trust in the source system, or a level of trust in an entity associated with the source system, such as an individual or a business or another organization that owns, operates or manages the source system, or is otherwise associated with one or more of the macro goals i.

In some implementations, one or more of the micro goals i may be to gather intelligence from a target individual participating in the conversational experience. For example, in some implementations, one or more of the micro goals i may be to identify a need or a problem of the target individual, e.g., a primary need or problem plaguing the target individual, or an issue that the target individual is interested in solving, or a secondary need, problem or issue of the target individual. One or more of the micro goals i may be to identify a core belief or value of the target individual, or goals, things or principles that are important to the target individual. One or more of the micro goals i may be to learn more about any past experiences that the target individual may have had with a given good or service, or a category of goods or services. Alternatively, one or more of the micro goals i may be to learn more about any past experiences that the target individual may have had in previously purchasing the good or service, or one in the category of goods or services. One or more of the micro goals i may be to identify any standards of the target individual, including any boundaries, constraints, limits or thresholds on what the target individual may be interested in doing with his or her time, energy or resources.

Once a micro goal has been established, whether the micro goal has been accomplished may be tracked or determined with respect to one or more quantitative or qualitative metrics. For example, where a micro goal is to maintain a conversational experience with the target individual in an active and ongoing status, or to avoid having the target individual terminate the conversational experience, a score indicating a probability or a likelihood that the target individual will remain in the conversational experience or will not terminate the conversational experience may be calculated in any manner or on any basis, such as by processing the audio data received from the target individual at box 325 or one or more of the words represented in the audio data identified at box 330. In some implementations, a score or an index may be established or calculated with respect to a micro goal, and may indicate a probability that the micro goal will be accomplished, or a proximity of the target individual or the conversational experience to accomplishing the micro goal based on the comment i.

Micro goals may be established in the same manner as the macro goals or the initial micro goal at box 310, or in any other manner, such as manually by one or more users of a system, e.g., a source system of the conversational experience, who may manually identify or designate micro goals by one or more interactions with a user interface rendered on one or more displays by the source system. For example, micro goals may be established by one or more interactions with another input/output device, or in any other manner, such as by one or more audible instructions or other signals that are captured by a microphone or another acoustic sensor of a source system, or by any other interactions with any other input/output device, to identify or designate a micro goal. Alternatively, a micro goal may be selected automatically by the source system, such as in accordance with a predetermined template or script, as a part of a language pattern, or on any other basis. For example, the source system may process the set of words of the comment i that were identified at box 330, as well as sets of words of any comments previously received from the target individual, or any sets of words of any responses previously presented to the target individual in one or more tonalites, using one or more machine learning models (or algorithms, systems or techniques) to select a micro goal for the conversational experience.

At box 340, the set of words of the comment i is provided as an input to a language model (or another machine learning model, algorithm, system or technique) that is trained to generate conversational responses to comments received from individuals during conversational experiences. The language model may be trained in any manner, such as by supervised learning or unsupervised learning, by reinforcement learning, or in any other manner.

A language model, or "LM," typically refers to a type of artificial intelligence model that is trained on textual data to generate coherent and contextually relevant text-based replies or responses, including sets of text that mimic language that might otherwise be generated by a human. A "large" language model, or "LLM," typically refers to a language model that has been trained on an extensive dataset and includes a large number of parameters, thereby enabling the model to capture complex language features and perform a wider range of tasks, such as text completion, translation, summarization, and even conversation. While no specific parameter count is required for a language model to be considered a "large" language model, parameter counts of large language models may vary depending on context and technological advancements. Traditionally, however, large language models feature millions or even billions of parameters, and may include an artificial neural network architecture, such as a transformer architecture, having any number of layers that are configured to encode sets of text or decode data into sets of text, or take any other action with respect to input data or responses generated from the input data.

In some implementations, the language model may be configured to divide the set of words of the comment i into a set of tokens, e.g., words or sub-words, according to a tokenization strategy, and to convert each of the tokens to an embedding or another vector representation. For example, the language model (or other machine learning model) may include an embedding layer that is trained or configured to transform each of such tokens into one of such embeddings or other vectors, which may include or represent semantic information or data regarding each of the respective tokens, as well as a relationship between each of such tokens to one or more of the other tokens.

In some implementations, the language model may include one or more self-attention layers or mechanisms to determine levels of importance or significance of each of the tokens with respect to the other tokens, in view of a context of the entire set of words of the comment i or any prior turns in the conversational experience, such as one or more comments received from the target individual prior to the comment i, or one or more comments generated in response to such comments. By calculating self-attention of the sets of words of the comment i, the language model may determine any nuanced meanings or relationships set forth or embedded in the sets of words, or update meanings or relationships determined from words in comments received from the target individual prior to the comment i, or one or more comments generated in response to such comments, and may update a context identified from such sets of words.

At box 345, a set of words of a response i to the comment i is identified based on an output received from the language model in response to an input including the comment i. For example, upon converting the sets of words of the comment i to tokens, and generating embeddings representing such tokens, and also determining a context of the comment i, the language model may predict a sequence of tokens corresponding to a response to the comment i. For example, in some implementations, the language model may be trained to generate a probability distribution for one or more positions in an output sequence of tokens, and select tokens to be included in the output sequence based on such probabilities. The probability distribution may be calculated on any basis, such as based on a window or set of previous words, e.g., by an N-gram model.

In some implementations, a token may be selected for inclusion in an output sequence based on a highest probability, or in a random or stochastic manner, by sampling from the probability distribution.

Once tokens have been selected for inclusion in an output sequence, the tokens may be decoded into sets of words in order to generate a relevant, coherent response based on a context of the conversational experience. In some implementations, a beam search algorithm, or another algorithm for selecting a predetermined number (e.g., N-best) of the highest-ranking tokens, may be executed to improve a diversity or a quality of a set of words to be included in an output sequence, and the set of words may be further processed for correctness or fluency, or compliance with any desired constraints, requirements or guidelines.

In some implementations, inputs to the language model may further include information or data regarding the macro goal or the micro goal i, as well as any information or data regarding the target individual.

At box 350, a speech tonality for the response i is selected based on the set of words of the response i identified at box 345 and the one or more micro goals i established at box 335. A speech tonality (or a "tonality") may be defined with respect to one or more qualitative or quantitative factors regarding a manner in which utterances of words are to be presented to participants during a conversational experience, e.g., by a source system to target system, and such factors may be selected in association with a mood, an emotion or another feeling. Qualitative or quantitative factors of a speech tonality may relate to a prosody of speech, such as one or more of a tone of speech, a rate (or a pace) of speech, emphases in speech, or a sentiment in speech, or any other factors regarding speech.

In some implementations, the speech tonality for the response i may be selected by one or more machine learning models (or algorithms, systems or techniques) that are trained to select a manner in which a set of words is presented to a target individual, based on a context defined at least from audio data or words received from the target individual, in an effort to maximize a probability that the target individual will respond with words approving or associated with a predetermined action or event. Inputs to the one or more machine learning models may further include information or data regarding the macro goal or the micro goal i, as well as any information or data regarding the target individual. In some implementations, the set of words of the response i to the comment i and the speech tonality for the response i may be selected by a single machine learning model (or algorithm, system or technique) that is trained to select not only words of a response but also a manner in which the words are presented to the target individual in an effort to maximize a probability that a target individual will respond with words approving or associated with a predetermined action or event.

With regard to a tone of speech, a pitch, or a fundamental frequency, may be selected to indicate a desired or selected tone in accordance with a speech tonality for the response i.

For example, an increase in a mean pitch, a range of pitch, or a variation in pitch may be selected to indicate enthusiasm, excitement or delight, or any other mood, emotion or feeling, while a decrease in a mean pitch, a range of a pitch or a variation in pitch may be selected to indicate gravity, seriousness or urgency, or any other mood, emotion or feeling.

Likewise, an intensity, or a loudness, may be selected in accordance with a speech tonality for the response i. For example, an increase in a mean intensity, a range of intensities, or variations in intensity may be selected to indicate anger, annoyance or frustration, or any other mood, emotion or feeling, while a decrease in a mean intensity, a range of intensities, or variations in intensity may be selected to indicate calmness, composure or serenity, or any other mood, emotion or feeling.

Additionally, a speech rate (e.g., a number of words or syllables per unit time, such as words per minute) may also be selected in accordance with a speech tonality for the response i. For example, an increase in a rate of speech may be selected to indicate animation, exhilaration, zeal, or any other mood, emotion or feeling, while a decrease in a rate of speech may be selected to indicate gloom, relaxation or sadness, or any other mood, emotion or feeling.

Emphases in speech, such as patterns of intonation, which may include changes in pitch or intensity throughout a set of words, may be selected in accordance with a speech tonality for the response i, such as to indicate that the set of words includes a question, a statement or a point of emphasis. In some implementations, an emphasis in speech may be selected or varied in accordance with a speech tonality for the response i, as compared to a standard or accepted pronunciation of a word, consistent with a dialect or otherwise. Selected emphases may be applied or supplied to individual words of the response i, or to individual syllables of words of the response i.

A rhythm of speech, such as timing or frequency of pauses, may also be selected in accordance with a speech tonality for the response i, such that longer or more frequent pauses within or between words of the response i may be selected to imply attention or hesitation, and shorter or less frequent pauses within or between words of the response i may be selected to imply certainty or precision.

Sentiments may be selected in accordance with a speech tonality for the response i. Such sentiments may include, but need not be limited to, joy or despair, anger or happiness, or any other sentiments.

A speech tonality may be defined or selected in any manner, such as with one or more quantitative values or qualitative attributes. For example, in some implementations, a speech tonality may be defined with values corresponding to selected pitches (e.g., frequencies, in units of Hertz, or Hz), intensities (e.g., in units of decibels, or dB), speech rates (e.g., numbers of words or syllables per unit time, such as words per minute), or changes in such values, which may be selected to define or correspond to emphases, rhythms, sentiments, or other attributes of speech. Alternatively, or additionally, in some implementations, a speech tonality may be defined with labels or characteristics. In some implementations, speech tonalities having selected quantitative values (e.g., pitches, intensities, speech rates, or changes in such values) may be assigned qualitative labels, and one of such speech tonalities may be selected for the comment i based on such qualitative labels. For example, in some implementations, where it is desired to express a caring mood, emotion or other feeling, a speech tonality that has been labeled or associated with caring and includes selected quantitative values for presenting speech with a caring mood, emotion or other feeling may be selected. Such speech tonalities may include labels such as "caring," "uptone," such as presenting a declarative in the form of a question, "intrigue," "scarcity," "certainty," "sincerity," "reason," "hypothetical," or theoretical, "obviousness," "empathy," or others, as well as selected quantitative values for presenting speech in moods, emotions, or other feelings, e.g., pitches, intensities, speech rates, or changes in such values.

At box 355, audio data representing the words of the response i identified at box 345 in the speech tonality selected at box 350 is generated and presented to the user. In some implementations, the words of the response i may be converted to sequences of phonemes or other units of sound, which may be identified based on the speech tonality selected at box 350. One or more mathematical or statistical models, e.g., an artificial neural network utilizing deep learning techniques or a Hidden Markov Model (or "HMM"), may be programmed or configured to generate data representing acoustic waves corresponding to the words of the response i, as defined by the phonemes, and in a manner consistent with the speech tonality selected at box 345. The acoustic waves may be converted into one or more audio signals by one or more digital signal processing techniques, and such audio signals may be processed accordingly, e.g., by noise reduction, equalization, dynamic range compression, or other techniques. Following generation and processing, the audio signals may be synthesized or otherwise converted into one or more waveforms that may be recorded and stored as data, or ultimately transmitted to and played by one or more speakers or other acoustic emitters of a target system.

At box 360, whether the target individual has provided any audio data representing a comment i+1 in reply to the response i is determined. The target individual may provide the comment i+1 including one or more words in reply to the response i. The audio data may include any number of words representing a subsequent comment or turn in the conversational experience, and may be of any duration or format.

If the target individual has not provided any audio data representing a comment i+1 in reply to the response i, then the process ends. For example, a bidirectional communications channel may be monitored for a predetermined period of time to determine whether the target individual has responded to the comment. In some implementations, audio data representing a predetermined set of interrogatory words, such as "are you still there?" or "Dan, did I lose you?" may be presented to the target individual on a periodic basis until audio data representing the comment i+1 is received from the user or, alternatively, until the target individual has terminated the conversational experience, or until a predetermined period of time has elapsed.

If the target individual has provided any audio data representing a comment i+1 in reply to the response i, then the process advances to box 365, where the audio data is processed to identify a set of words of the comment i+1 and any acoustic features i+1 represented in the audio data. The audio data may be processed to identify the set of words or the acoustic features represented therein in the same manner as the audio data that was received at box 325, or in any other manner.

At box 370, whether one or more macro goals established at box 310 are achieved is determined based on the set of words of the comment i+1 identified at box 365. For example, the set of words of the comment i+1 identified at box 365 may be provided to a language model that is trained to process or pre-process the set of words of the comment i+1, e.g., by removing any ancillary or duplicative terms, or reducing individual words to infinitives or other base or root forms. The language model may further process the set of words of the comment i+1 according to one or more natural language processing (or "NLP") or natural language understanding (or "NLU") techniques to determine an intent of the target individual, or to extract entities or other information or data from the set of words as may be required in order to determine whether one or more of the macro goals have been met. For example, where a macro goal is to complete a sale of a good or a service to the target individual, whether the set of words of the comment i+1 includes an instruction to purchase the good or the service, or an indication that the target individual does not intend to purchase the good or the service, may be determined. Where a macro goal is to increase a level of engagement of the target individual, or to encourage or convince the target individual to take an action, whether the set of words of the comment i+1 includes an indication that the target individual will increase his or her level of engagement or take the action may be determined. Where a macro goal is to maintain a relationship with the target individual, or to avoid attrition or loss of the target individual to a competitor, the set of words of the comment i+1 may be processed to assess a level of risk that the relationship with the target individual is threatened, or that the target individual may initiate a relationship with a competitor. Where a macro goal is to schedule a meeting with the target individual, or to reach an agreement with the target individual, whether the set of words of the comment i+1 indicates a date of the meeting or an intent to enter into the agreement may be determined.

Alternatively, whether the set of words of the comment i+1 indicates that one of the macro goals of the conversational experience determined at box 310 has been achieved, or has not been achieved, may be determined in any other manner. For example, in some implementations, one or more confidence scores, probabilities or other metrics indicating whether a macro goal has been achieved may be calculated. Whether the macro goal has been achieved may be determined based on such scores, probabilities or other metrics, such as whether one or more of the scores, probabilities or metrics exceeds a predetermined threshold.

If one or more macro goals are determined to have been achieved based on the set of words of the comment i+1, then the process advances to box 375, where an indication of an achievement of a macro goal is stored in one or more data stores, and the process ends.

The indication may include any information or data regarding the comment i+1 or the macro goal, as well as any evidence, proof or record of the achievement of the one or more macro goals. In some implementations, the information or data may identify one or more subsequent actions required in order to confirm, memorialize or execute the achievement of the one or more macro goals, e.g., at a later date, or an authorization to perform such actions. Additionally, in some implementations, the conversational experience and pairs of comments received from the target individual and the various responses or tonalities generated in reply to such comments may be labeled as successful, and information or data regarding the conversational experience and a label of successful may be used to train the models by which the responses and tonalities were selected, such as by supervised learning, unsupervised learning, reinforcement learning, or in any other manner.

If no macro goal is determined to have been achieved based on the set of words of the comment i+1, then the process advances to box 380, where an extent of success in achieving one or more of the micro goals i established at box 335 is determined based on the set of words of the comment i+1 and the acoustic features i+1 identified at box 365. The extent of success in achieving one or more of the micro goals i may be determined or represented in a binary manner, e.g., as "successful" or "unsuccessful," or may indicate a grade or a level of success, such as "very successful," "mildly successful," "absolutely unsuccessful," or others. Alternatively, or additionally, a quantitative extent of success such as a percent, a score or a level of success may be calculated or determined in any manner. Whether one or more of the micro goals established at box 335 has been achieved may be determined in the same manner that whether one or more of the macro goals established at box 310 was achieved was determined at box 370, or in any other manner.

If one or more micro goals are determined to have been achieved based on the set of words of the comment i+1 and the acoustic features i+1, then the process advances to box 385, where a value of the step variable i is incremented by one, or set equal to i+1, before returning to box 335, where one or more micro goals i for the conversational experience are established based on the set of words of the comment i and the acoustic features i identified at box 365.

Alternatively, or additionally, information or data regarding an extent of success in achieving the macro goal or one or more micro goals may be stored in association with information or data regarding the target individual in one or more data stores. Additionally, in some implementations, information or data regarding the conversational experience and pairs of comments received from the target individual as well as the various responses or tonalities generated in reply to such comments, as well as labels of the extent of success of such responses or tonalities in accomplishing micro goals or the macro goal, may be used to train the models by which responses and tonalities are selected.

Figure 4A:
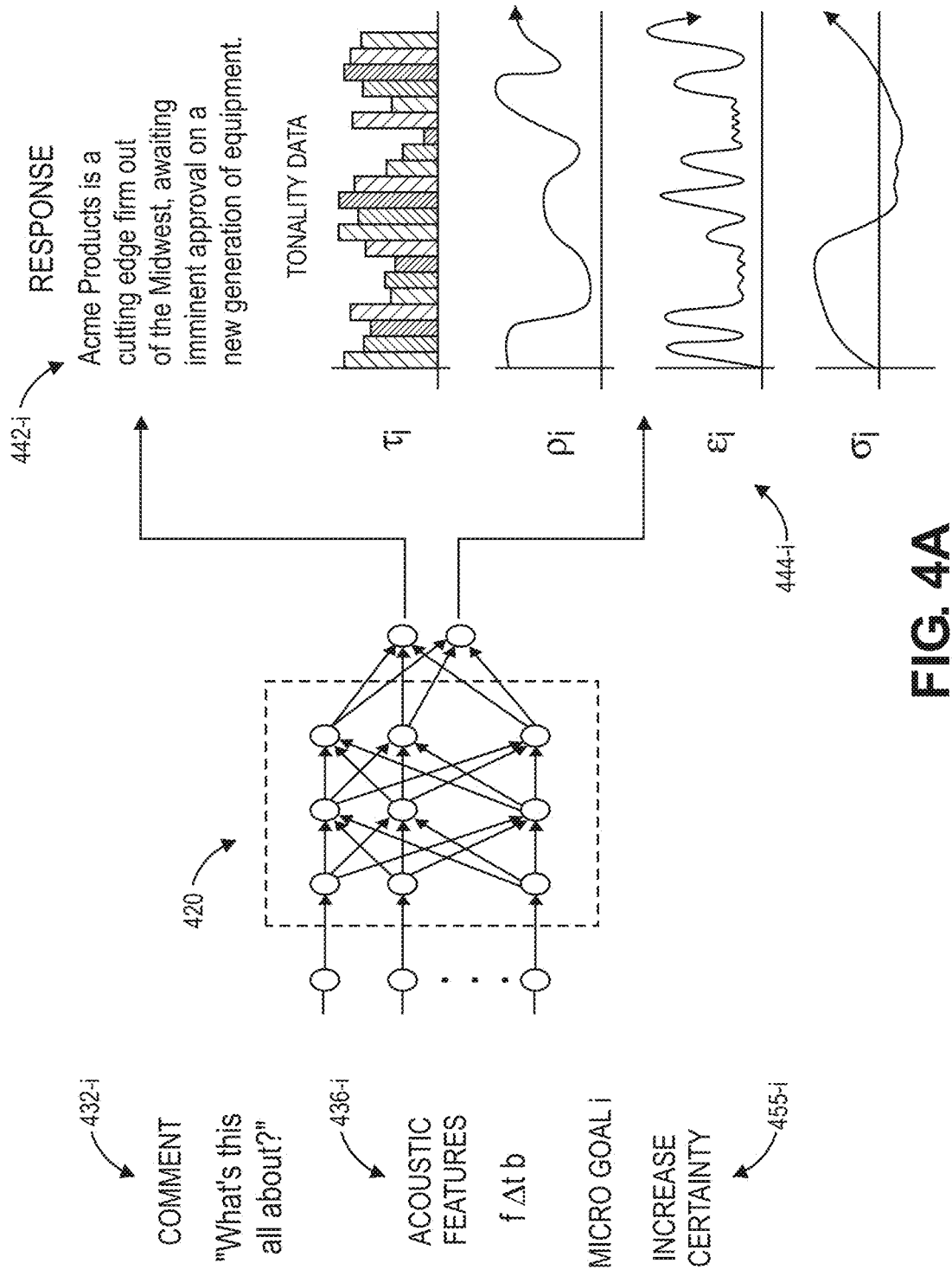
FIGS. 4A through 4C are views of aspects of one system in accordance with embodiments of the present disclosure.
Figure 4B:
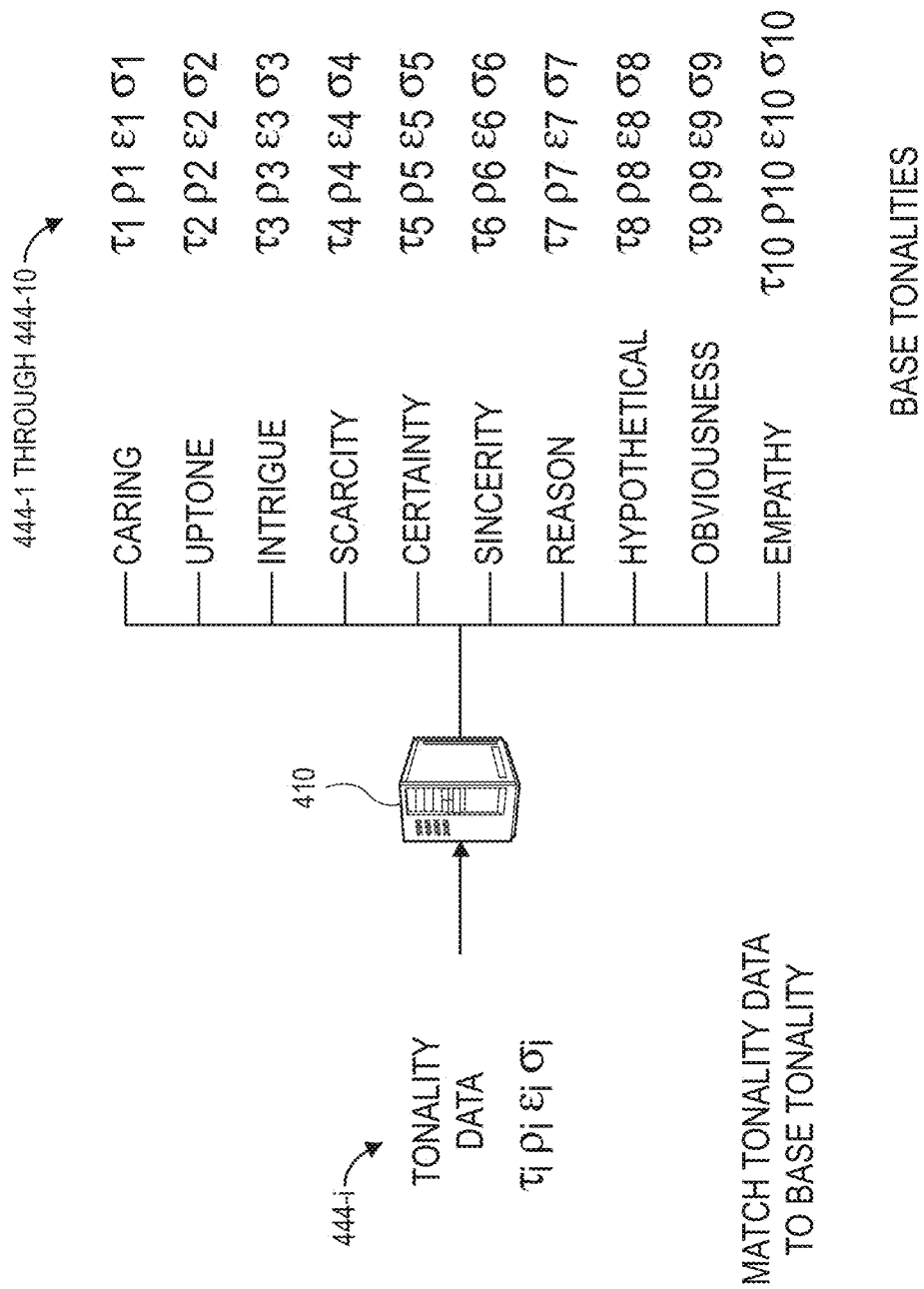
Figure 4C:
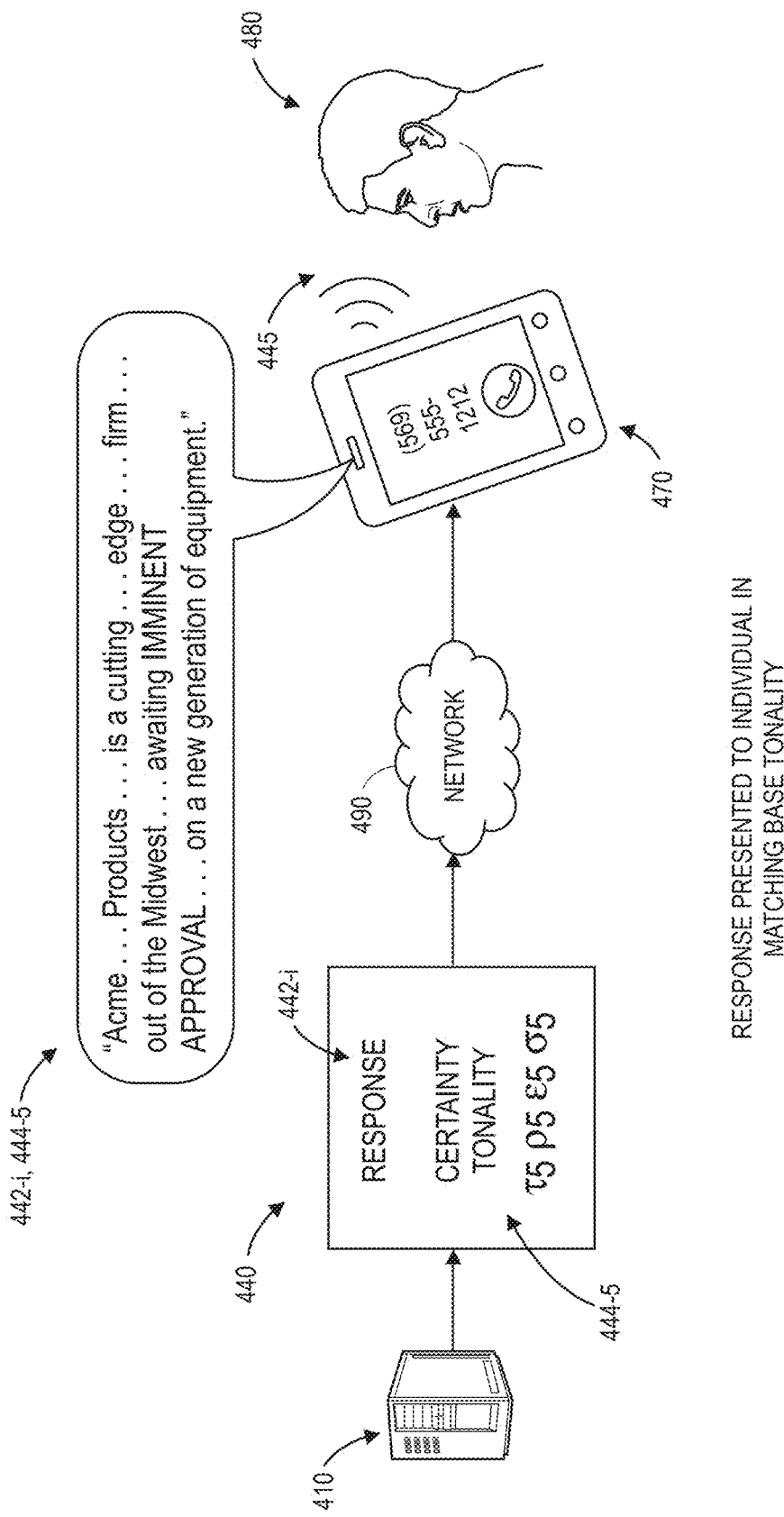

As is discussed above, in accordance with implementations of the present disclosure, one or more models may be trained to select not only a set of words to be included in a response to a comment received from an individual during a conversational experience but also a tonality by which the response is to be presented to the individual. The response and the tonality may be selected in order to increase a likelihood that a micro goal is accomplished in furtherance of a macro goal. Referring to FIGS. 4A through 4C, views of aspects of one system in accordance with implementations of the present disclosure are shown. As is shown in FIG. 4A, a machine learning model (or algorithm, system or technique) 420 is configured to receive a set of inputs including a set of words of a comment 432-$i$ represented in data received from a target individual during a conversational experience, or, "What's this all about?" as well as a set of acoustic features 436-$i$ of the data, and a micro goal 455-$i$ that is selected or established on any basis, namely, to increase a level of certainty of the target individual. The model 420 may be trained to generate a set of words in response to a set of words, and may take any form, such as a recurrent neural network, a transformer-based model (e.g., a bidirectional encoder representations from transformers model), a generative pre-trained transformer model, or others. Data representing the comment 432-$i$ may include audio data received from a personal device of the target individual, or a set of words identified in or extracted from the audio data. Data representing the acoustic features 436-$i$ may include a pitch (or frequency), a duration, or an intensity (or loudness) of sounds representing the comment 432-$i$, or other features. Additionally, the micro goal 455-$i$ may be selected or established in furtherance of a macro goal on any basis, such as any number of comments previously received from the target individual, or any number of responses and tonalities previously presented to the target individual during the conversational experience.

As is also shown in FIG. 4A, the model 420 is further configured to generate a set of outputs based on the set of inputs, including a set of words of a response 442-$i$ to be presented to the target individual in reply to the comment 432-$i$, or, "Acme Products is a cutting edge firm out of the Midwest, awaiting imminent approval on a new generation of equipment," such as by a personal device of the target individual, and data regarding a tonality 444-$i$ by which the response 442-$i$ is to be presented to the target individual. For example, as is shown in FIG. 4A, one or more acoustic features of the data regarding the tonality 444-$i$ may be identified based on such outputs, including one or more tones $\tau_i$, by which the response 442-$i$ is to be presented to the target individual, a pace $\rho_i$ by which the set of words of the response 442-$i$ is to be presented, a pattern of emphasis $\varepsilon_i$ on one or more of the individual words of the response 442-$i$, as well as a sentiment $\sigma_i$ that is to be conveyed to the target individual as the response 442-$i$ is presented. The tones $\tau_i$ may be represented in a spectrogram or any other representation of frequencies and intensities over time, while the pace $\rho_i$ may identify or reference rates (e.g., numbers of words or syllables per unit time, such as words per minute) at which the words of the response 442-$i$ are to be presented, the pattern of emphasis $\varepsilon_i$ may identify words, syllables or times at which a pitch or an intensity should change as such words or syllables are presented or at such times of the conversational experience, and the sentiment ai may include quantitative values (or, alternatively, qualitative labels) or other indicators representing moods, emotions or feelings to be conveyed, such as positive, negative or neutral. Alternatively, any other acoustic features may be identified based at least in part on outputs received from the models 420, including but not limited to intensities or rhythms (or changes thereof), or any other features.

In some implementations, data representing the response 442-$i$ to the comment 432-$i$ and the data regarding the tonality 444-$i$ may be transmitted to a personal device, which may interpret the data and play sounds representing the response 442-$i$ in the tonality 444-$i$ based on the data. Alternatively, the data regarding the tonality 444-$i$ may be processed to select a predetermined one of a plurality of preestablished tonalities having factors that are nearest, closest or most similar to the factors identified in the data regarding the tonality 444-$i$. For example, as is shown in FIG. 4B, the data regarding the tonality 444-$i$, e.g., the tones "Li, the pace pi, the pattern of emphasis Ei, and the sentiment ai, or any other data, may be compared to corresponding data of each of a plurality of base tonalities 444-1 through 444-10, which may be referenced by one or more qualitative labels or any quantitative factors, such as tones, paces, emphasis patterns or sentiments, or other factors. For example, the base tonality 444-1 may have a qualitative label of "caring" and associated quantitative factors, e.g., tones, paces, emphasis patterns or sentiments, or other factors, while the base tonality 444-2 may have a qualitative label of "uptone," such as presenting a declarative in the form of a question, and associated quantitative factors, the base tonality 444-3 may have a qualitative label of "intrigue" and associated quantitative factors, the base tonality 444-4 may have a qualitative label of "scarcity" and associated quantitative factors, the base tonality 444-5 may have a qualitative label of "certainty" and associated quantitative factors, the base tonality 444-6 may have a qualitative label of "sincerity" and associated quantitative factors, the base tonality 444-7 may have a qualitative label of "reason" and associated quantitative factors, the base tonality 444-8 may have a qualitative label of "hypothetical," or theoretical, and associated quantitative factors, the base tonality 444-9 may have a qualitative label of "obviousness" and associated quantitative factors, and the base tonality 444-10 may have a qualitative label of "empathy" and associated quantitative factors. Alternatively, information or data regarding any number of other base tonalities having any number of qualitative labels and associated qualitative factors may be identified and compared to the data regarding the tonality 444-$i$ in accordance with implementations of the present disclosure.

As is shown in FIG. 4C, when one of the base tonalities 444-1 through 444-10 is identified and selected as nearest, closest or most similar to the factors identified in the data regarding the tonality 444-$i$, viz., the base tonality 444-5 having a qualitative label of "certainty" and quantitative factors including tones $\tau_5$, a pace $\rho_5$, a pattern of emphasis ss, and a sentiment as, a communication system 410 (e.g., a source system, or a conversational system) generates and transmits data 440 representing the response 442-$i$ and the base tonality 444-5 to a personal device 470 of a target individual 480. The personal device 470 then processes the data 440 to generate sounds 445 representing the words of the response 442-$i$, or "Acme . . . Products . . . is a cutting . . . edge . . . firm . . . out of the Midwest . . . awaiting IMMINENT APPROVAL . . . on a new generation of equipment," spoken in the base tonality 444-5, e.g., with tones, pace, emphases or sentiments that indicate certainty, and plays the sounds 445 to the target individual 480. Subsequently, the target individual 480 may utter one or more sets of words, and sounds representing such sets of words may be captured by the personal device 470 and transmitted to the communication system 410, which may interpret such words to determine whether the response 442-$i$ and the tonality 444-5 were successful in accomplishing a micro goal or a macro goal for the conversational experience.

Figure 5A:
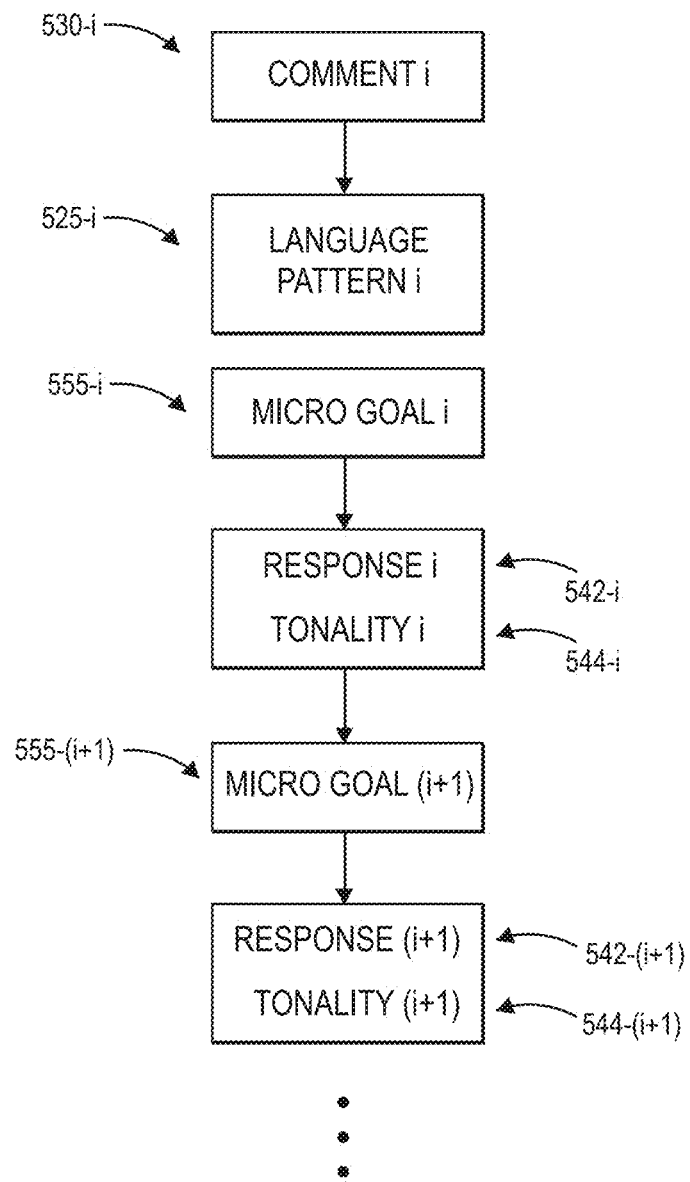
FIGS. 5A and 5B are views of aspects of one system in accordance with embodiments of the present disclosure.
Figure 5B:
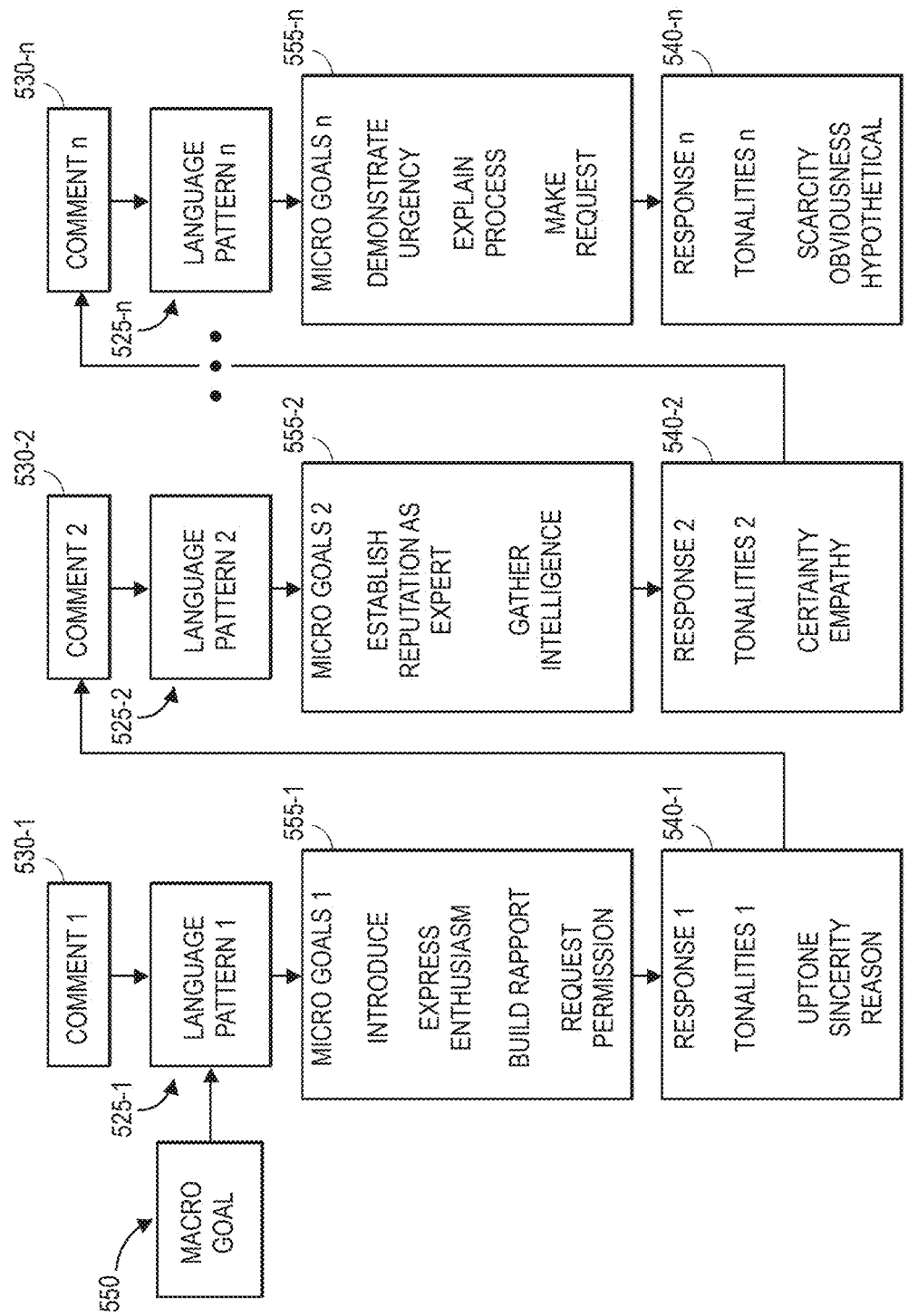

In some implementations of the present disclosure, one or more machine learning models (or algorithms, systems or techniques) may generate language patterns including selected sets of words in selected tonalities that are intended to accomplish one or more micro goals during a conversational experience, in furtherance of a macro goal of the conversational experience. Referring to FIGS. 5A and 5B, views of aspects of one system in accordance with embodiments of the present disclosure are shown.

As is shown in FIG. 5A, a representative language pattern 525-$i$ for responding to a comment 530-$i$ received from a target individual may include any number of sets of words in the form of responses 542-$i$, 542-($i$+1), and so on and so forth, that are to be presented to a target individual in any number of tonalities 544-$i$, 544-($i$+1), and so on and so forth. The responses 542-$i$, 542-($i$+1) and the tonalities 544-$i$, 544-($i$+1) may be selected in order to maximize a likelihood that one or more micro goals 555-$i$, 555-($i$+1), and so on and so forth, will be accomplished during a conversational experience, in furtherance of a macro goal of the conversational experience. The language pattern 525-$i$ may include any number of sets of words that may be selected by one or more machine learning models (or algorithms, systems or techniques) based on inputs that may include, but need not be limited to, words of any comments previously received from the target individual, acoustic features of such comments, profile data or other information regarding the target individual, or identifiers of the macro goal or any micro goals. Likewise, the tonalities 544-$i$, 544-($i$+1) may be one or more machine learning models (or algorithms, systems or techniques) based on the same inputs, or any other inputs.

Once the responses and tonalities of the language patterns are selected, the language patterns may be presented to the target individual in reply to comments received from the target individual. As is shown in FIG. 5B, when a macro goal 550 of a conversational experience is selected or otherwise established, and a comment 530-1 is received from a personal device of a target individual during the conversational experience, a language pattern 525-1 for accomplishing a set of micro goals 555-1 may be selected, e.g., by one or more machine learning models (or algorithms, systems or techniques). The language pattern 525-1 may be represented in data 540-1 including a set of responses to the comment 530-1 and tonalities by which the set of responses is to be presented. For example, where the set of micro goals 555-1 include an introduction to the target individual, an expression of enthusiasm to the target individual, a building of rapport with the target individual and a request for permission from the target individual, the set of responses of the language pattern 525-1 may include words intended to accomplish each of the set of micro goals 555-1, and the tonalities by which the words are to be presented may have qualitative labels of "uptone," such as presenting a declarative in the form of a question, as well as "sincerity" and "reason." The data 540-1 may include such words and any quantitative factors regarding such tonalities, and may be presented to a personal device of the target individual accordingly.

Subsequently, as is also shown in FIG. 5B, when a comment 530-2 is received from the personal device of the target individual in reply to the language pattern 525-1 during the conversational experience, a language pattern 525-2 for accomplishing a newly selected or established set of micro goals 555-2 may be selected. The language pattern 525-2 may be represented in data 540-2 including a set of responses to the comment 530-2 and tonalities by which the set of responses is to be presented. For example, where the set of micro goals 555-2 include establishing a reputation as an expert, e.g., in a relevant field, and gathering intelligence, the set of responses of the language pattern 525-2 may include words intended to accomplish each of the set of micro goals 555-2, and the tonalities by which the words are to be presented may have qualitative labels of "certainty," or "empathy." The data 540-2 may include such words and any quantitative factors regarding such tonalities, and may be presented to the personal device of the target individual accordingly.

As is further shown in FIG. 5B, the generation of language patterns in reply to comments received from the personal device of the target individual may continue as long as is necessary in order to accomplish any micro goals that are selected or established during the conversational experience, or to accomplish the macro goal of the conversational experience. For example, as is shown in FIG. 5B, in reply to a language pattern presented to the target individual during the conversational experience, a comment 530-$n$ may be received from the personal device of the target individual, and a language pattern 525-$n$ for accomplishing a final set of micro goals 555-$n$, or the macro goal 550, may be selected. The language pattern 525-$n$ may be represented in data 540-$n$ including a set of responses to the comment 530-$n$ and tonalities by which the set of responses is to be presented. For example, where the set of micro goals 555-$n$ include demonstrating urgency of the macro goal 550, explaining a process associated with the macro goal 550, or making a request to accomplish the macro goal 550, the set of responses of the language pattern 525-$n$ may include words intended to accomplish each of the set of micro goals 555-$n$ and ultimately the macro goal 550, and the tonalities by which the words are to be presented may have qualitative labels of "scarcity," "obviousness," or "hypothetical." The data 540-$n$ may include such words and any quantitative factors regarding such tonalities, and may be presented to the personal device of the target individual accordingly.

If each of the micro goals 555-$n$ or the macro goal 550 are accomplished following the language pattern 525-$n$, one or more indications that such micro goals 555-$n$ or the macro goal 550 have been accomplished may be stored in one or more data stores, in association with the target individual. Alternatively, if one of the micro goals 555-$n$ is not accomplished, one or more remedial actions may be taken. If each of the micro goals 555-$n$ is accomplished, but the macro goal 550 is not accomplished, one or more additional micro goals may be established or selected, and a language pattern may be generated accordingly. In some implementations, the macro goal 550, the comments 530-1, 530-2 . . . 530-$n$ received from the target individual and the language patterns 525-1, 525-2 . . . 525-$n$, including but not limited to the micro goals 555-1, 555-2 . . . 555-$n$ or the data 540-1, 540-2 . . . 540-$n$ representing the responses and the tonalities presented to the target individual in reply to the comments 530-1, 530-2 . . . 530-$n$ may be used to train one or more models for generating responses and tonalities, or language patterns including such responses and tonalities.

As is discussed above, machine learning models (or algorithms, systems or techniques) for generating responses and identifying or selecting tonalities may be trained based on pairs of turns of prior conversational experiences that include responses to comments received from target individuals and tonalities by which the responses are presented, as well as comments received in reply to such responses, as well as any macro goals or micro goals of the conversational experiences, profiles of the target individuals, or any other relevant information or data. Alternatively, the models may be trained based on conversational experiences in their entireties, including each of such turns of comments and responses presented in tonalities, as well as information or data regarding macro goals, micro goals, and profiles of target individuals involved in such conversational experiences, among other information or data.

Figures 6A, 6B:
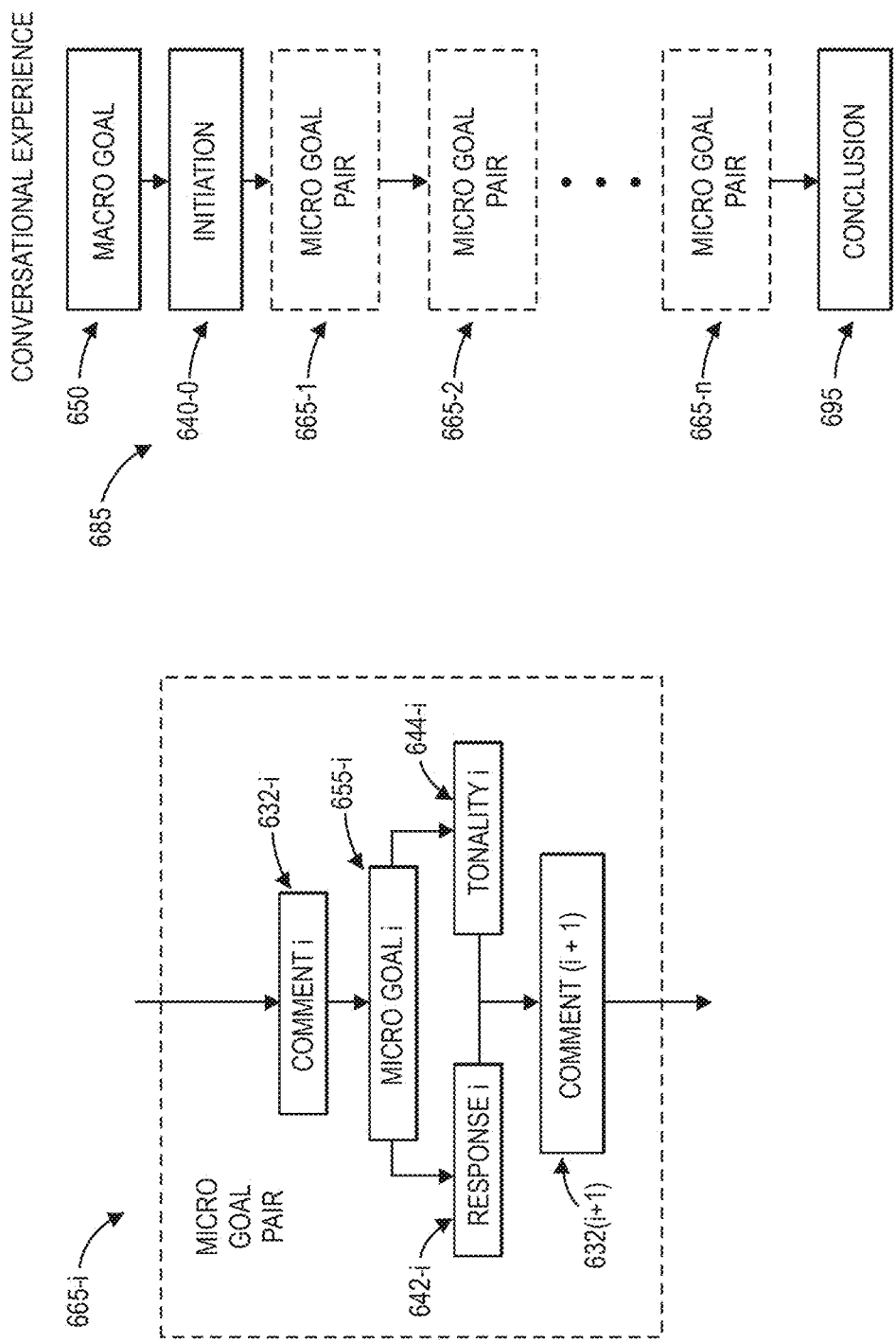
FIGS. 6A through 6C are views of aspects of one system in accordance with embodiments of the present disclosure.
Figure 6C:
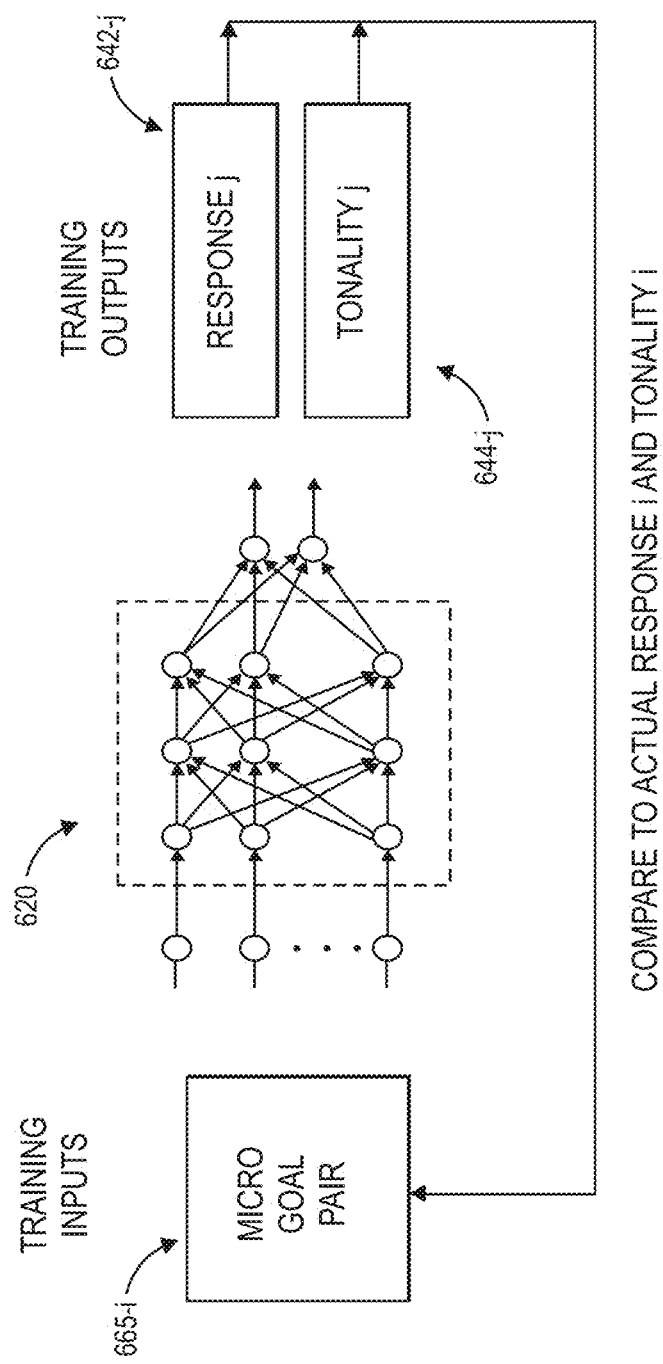

Referring to FIGS. 6A through 6C, views of aspects of one system in accordance with embodiments of the present disclosure are shown. As is shown in FIG. 6A, a representative micro goal pair 665-$i$ of turns of a conversational experience includes a comment 632-$i$ received from a target individual, a micro goal 655-$i$ selected based at least in part on the comment 632-$i$, and both a response 642-$i$ to the comment 632-$i$ and a tonality 644-$i$ by which the response 642-$i$ is to be presented to the target individual, as well as a comment 632-($i$+1) received from the target individual in reply to the response 642-$i$ in the tonality 644-$i$.

As is shown in FIG. 6B, a conversational experience 685 includes a macro goal 650, as well as data regarding an initiation 640-0 of the conversational experience 685, e.g., a set of words and a tonality by which the set of words are presented to a target individual, any number of micro goal pairs 665-1, 665-2 . . . 665-$n$, and a conclusion 695. The micro goal pairs 665-1, 665-2 . . . 665-$n$ may have the same content or format of the representative micro goal pair 665-$i$ of FIG. 6A, or any other content. Alternatively, the conversational experience 685 may have been initiated by the target individual, e.g., by an initial comment, and a micro goal, a comment and a tonality of a micro goal pair 665-$i$ may be selected based at least in part on the initial comment received from the target individual.

Information or data regarding any micro goal pair 665-$i$ of turns may be stored in one or more data stores in association with any information or data regarding a conversational experience in which the micro goal pair 665-$i$ was included, such as an indication as to whether the response 642-$i$ and the tonality 644-$i$ were successful or unsuccessful in accomplishing the micro goal 655-$i$. Such information or data may be used to train one or more machine learning models (or algorithms, systems or techniques) to select responses and tonalities based on comments and micro goals, among other information or data. Likewise, information or data regarding any conversational experience 685 in its entirety may be stored in one or more data stores, and may be used to train one or more machine learning models (or algorithms, systems or techniques) to select responses and tonalities based on comments and micro goals for a conversational experience, or to select templates or scripts for the conversational experience, among other information or data.

As is shown in FIG. 6C, one or more machine learning models (or algorithms, systems or techniques) 620 may be trained based on micro goal pairs 665-$i$. For example, any number of the micro goal pairs 665-$i$ may be provided as training inputs to the models 620, and training outputs received from the models 620, such as a response 642-$j$ and a tonality 644-$j$ selected by the models 620 in response to the training inputs, may be compared to actual responses 642-$i$ and tonalities 644-$i$ of the micro goal pairs 665-$i$, to determine whether the models 620 are appropriately trained to select or identify responses or tonalities by which such responses are to be presented to target individuals based on comments received from the target individuals and any micro goals that are selected or established during a conversational experience in furtherance of a macro goal of the conversational experience. Any number of synaptic weights or other parameters of the models 620 may be modified or adjusted during a training process. Alternatively, or additionally, information or data regarding a conversational experience in its entirety, e.g., one or more of the conversational experiences 685 of FIG. 6B, may be provided as training inputs to the models 620, and training outputs received from the models 620 may be compared to conclusions of such conversational experiences to determine whether the models 620 are appropriately trained to select or identify responses or tonalities and to accomplish macro goals of a conversational experience, or to select or identify templates or scripts for the conversational experience.

Figure 7:
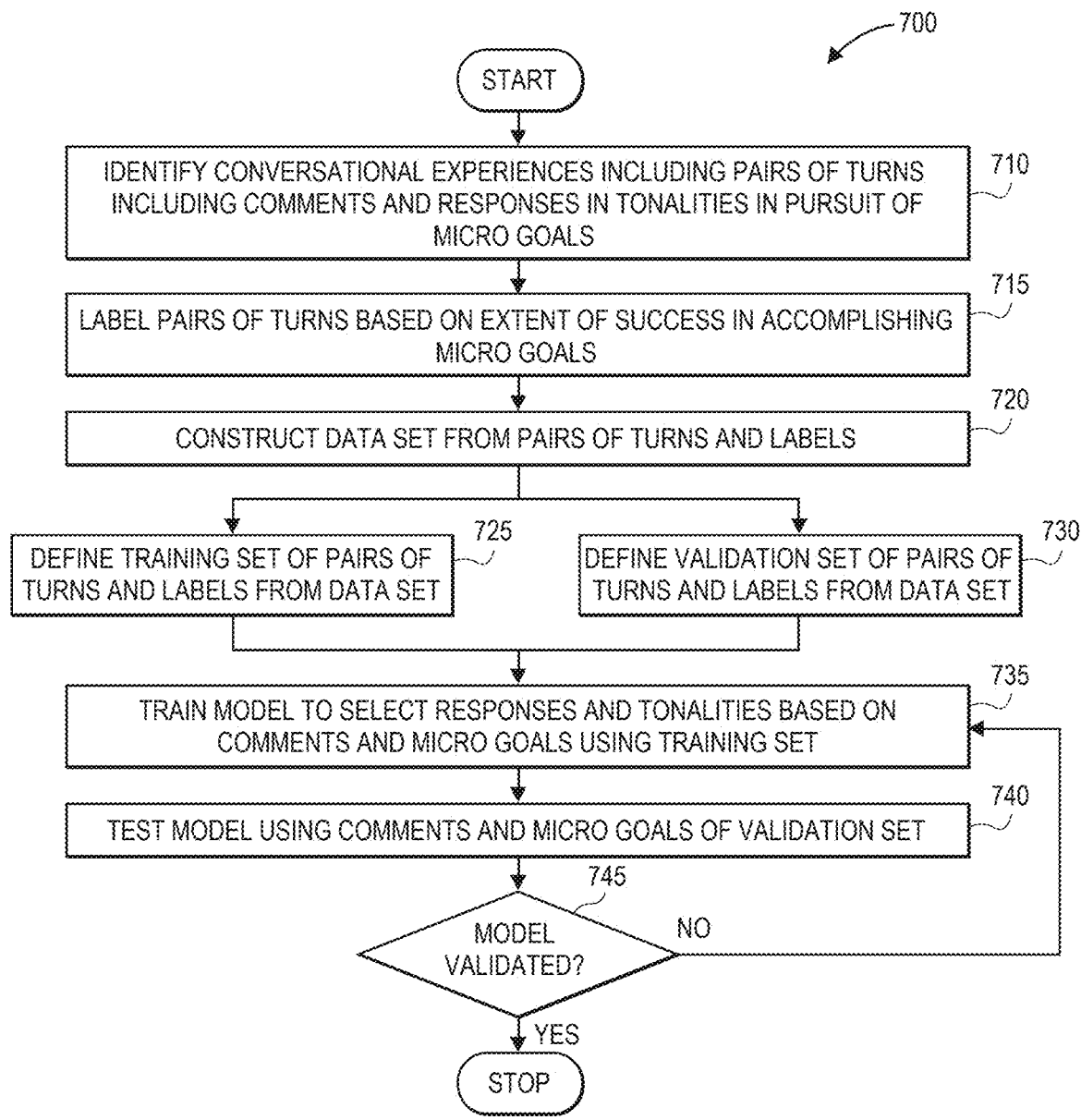
FIG. 7 is a flow chart of one process in accordance with embodiments of the present disclosure.

Referring to FIG. 7, a flow chart 700 of one process in accordance with embodiments of the present disclosure is shown. At box 710, conversational experiences including pairs of turns between comments and responses in tonalities in pursuit of micro goals are identified. For example, following the completion of one or more conversational experiences, such as according to the process shown in the flow chart 300 of FIGS. 3A and 3B or otherwise, information or data regarding such conversational experiences may be stored in one or more data stores. Such information or data may identify words or sets of text included in comments received from target individuals during the conversational experiences, as well as words or sets of text included in responses to such comments generated in accordance with implementations of the present disclosure, as well as attributes of tonalities in which the responses were presented to the target individuals. Such information or data may further identify macro goals of the conversational experiences, as well as micro goals selected with a goal of achieving the macro goals, and indications as to whether any of the macro goals or the micro goals were achieved during the conversational experiences.

At box 715, pairs of turns of the conversational experiences identified at box 710 are labeled based on an extent of success of the respective turns in accomplishing their corresponding micro goals. For example, a pair of turns may be labeled based on an extent of success of a response to a comment received from an individual and a tonality in accomplishing a micro goal or a macro goal. Where the response, when presented in the tonality, is followed by a comment received from the individual, the comment and any acoustic features of the comment may be processed to determine whether the response in the tonality successfully accomplished either a corresponding micro goal or, alternatively, a macro goal, or an extent to which the micro goal or the macro goal was accomplished. Conversely, a pair of turns may be labeled as unsuccessful where the response is followed by a comment received from the individual indicating that neither the corresponding micro goal nor the macro goal was accomplished, or where the response is not followed by any comment from the individual.

At box 720, a data set is constructed from the pairs of turns of the conversational experiences identified at box 710 and the labels applied to such pairs of turns at box 715. The data set may include comments that were received from individuals, e.g., sets of words that were included in the comments, and acoustic features associated with such comments. The data set may also include responses generated in reply to such comments, e.g., sets of words generated by language models or other models based on such comments. The data set may further include information or data regarding tonalities by which the responses were presented to the individuals, including but not limited to quantitative data such as tones, paces, emphases or sentiments, or qualitative data such as names, titles or descriptors of such tonalities, e.g., "caring," "uptone," such as presenting a declarative in the form of a question, "intrigue," "scarcity," "certainty," "sincerity," "reason," "hypothetical," or theoretical, "obviousness," "empathy," or others. The data set may also include information or data regarding comments received in reply to the responses presented in such tonalities, e.g., sets of words that were received in reply to the responses, as well as acoustic features associated with such sets of words. The data set may further include identifiers of the micro goals of such pairs of turns, or macro goals of the conversational experiences that includes such pairs of turns.

Alternatively, or additionally, the data set may include any other information or data regarding the conversational experiences. In some implementations, the data set may include profile information regarding individuals from which the comments were received, including but not limited to names, ages or locations of such individuals, as well as preferences that the users are known or believed to have.

Moreover, in some implementations, the data set may include conversational experiences in their entireties, including sets of words presented to individuals to initiate the conversational experiences with such individuals, each of the comments received from the individuals during the conversational experiences, each of the acoustic features of such comments, each of the micro goals or macro goals selected for such individuals, and each of the responses and tonalities identified based on such comments.

At box 725, a training set of pairs of turns and corresponding labels of such pairs is defined from the data set constructed at box 720. For example, the training set may comprise a substantially large portion of the pairs of turns and corresponding labels of the data set. In some embodiments, the training set may comprise approximately eighty-five percent (85%), or more, of the pairs of turns and labels of the data set.

In parallel, at box 730, a validation set of pairs of turns and corresponding labels of such pairs is defined from the data set constructed at box 720. For example, the validation set may include a balance of the data set constructed at box 720 that is not included in the training set defined at box 725.

At box 735, a model is trained to select responses and tonalities based on comments and micro goals using the training set defined at box 725. For example, the pairs of turns may be provided to a machine learning model (or algorithm, system or technique) as one or more inputs, and outputs received from the machine learning model may be compared to the labels corresponding to the pairs of turns. In some embodiments, each of the outputs received from the machine learning model may represent a probability (e.g., a number between 0 and 1, or a number according to any scale), indicative of whether one of the pairs of turns is successful or unsuccessful in accomplishing a micro goal. The outputs may thus be compared to the labels corresponding to the pairs of turns to determine whether the machine learning model is sufficiently trained to select responses and tonalities based on comments and micro goals.

At box 740, the model is tested using the validation set defined at box 730. For example, to determine an extent to which the machine learning model has been properly trained, a pair of turns of the validation set may be provided to the machine learning model as an input, and a label corresponding to the pair of turns of the validation set may be compared to an output received from the classifier in response to the input. The testing of the machine learning model may occur at various times or intervals with respect to the number of pairs of turns and labels provided to the machine learning model, e.g., after every ten, one hundred or any other number of pairs of turns of the training set have been provided to train the machine learning model as inputs and outputs received from the machine learning model have been compared to labels of such pairs of turns.

At box 745, whether the model has been validated is determined. For example, whether outputs received from the machine learning model in response to inputs from the validation set are sufficiently close to the labels, e.g., where the outputs are numerical values that are within a predetermined threshold of a value deemed satisfactory for each of the labels, or where the outputs are binary values that corresponds to such labels, may be determined. If the model is not satisfactorily trained, then the process returns to box 735, where the model is again trained to generate responses and select tonalities in response to comments and based on micro goals. Any number of iterations may be required in order to properly train the model using the pairs of turns and labels of the training set. If the training of the classifier is validated, however, then the process ends.

As is discussed above, machine learning models (or algorithms, systems or techniques) of the present disclosure for generating responses and identifying or selecting tonalities may be trained by reinforcement learning, based on pairs of turns of prior conversational experiences, or based on conversational experiences in their entireties, including each of such turns of comments and responses presented in tonalities, as well as information or data regarding macro goals, micro goals, and profiles of target individuals involved in such conversational experiences, among other information or data.

Figure 8:
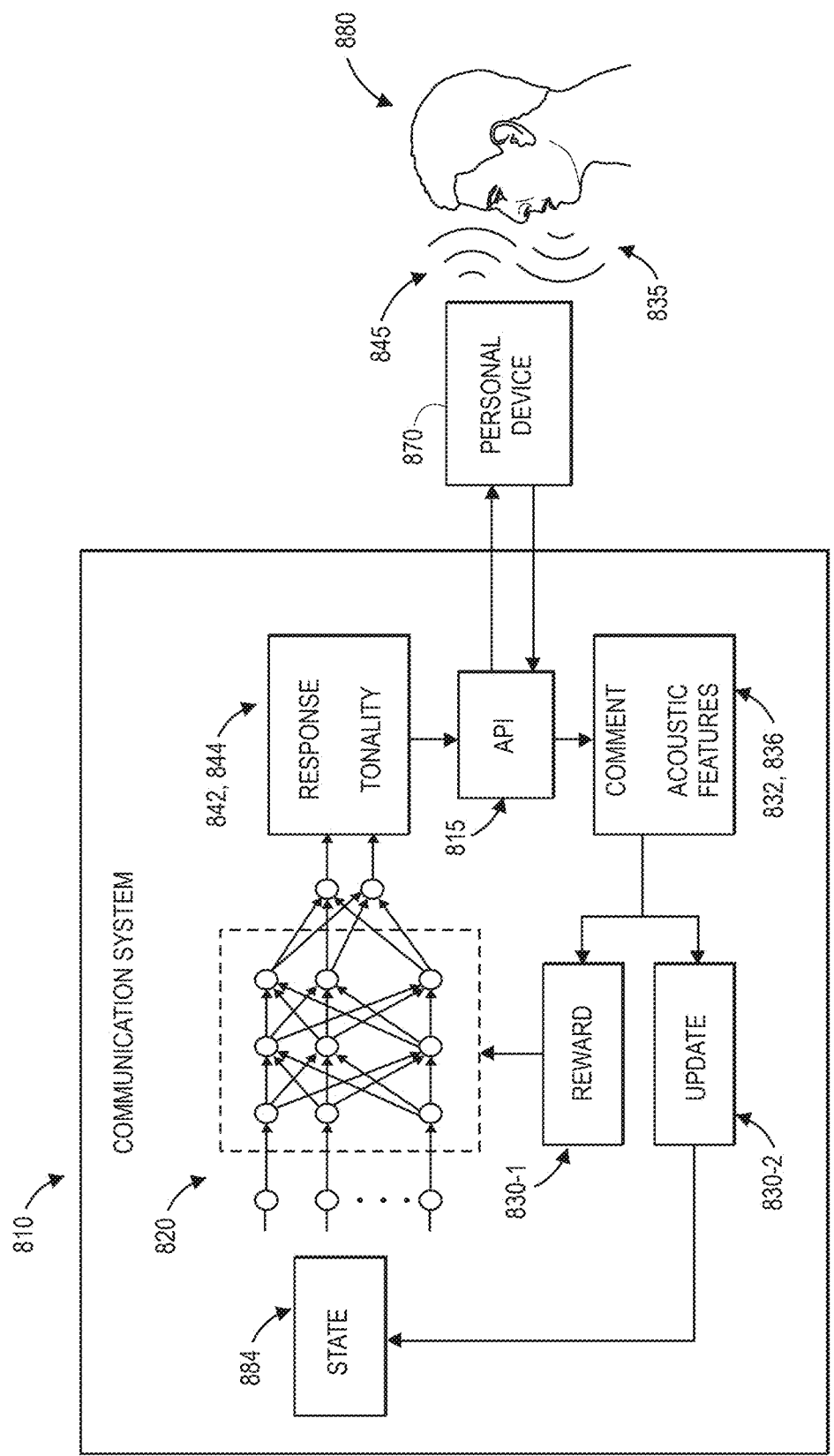
FIG. 8 is a view of aspects of one system in accordance with embodiments of the present disclosure.

Referring to FIG. 8, a view of aspects of one system in accordance with embodiments of the present disclosure are shown. As is shown in FIG. 8, a communication system 810 (e.g., a source system, or a conversational system) executes a model 820 (or an agent) that is configured to receive inputs representative of a state 884 of a conversational experience with a target individual 880 at a given time and to generate outputs in the form of recommended actions, viz., a response 842 and a tonality 844 by which the response 842 is to be presented to the target individual 880, based on the state 884. The communication system 810 is also configured to transmit data representing the response 842 and the tonality 844 to a personal device 870 of the target individual 880, which may be interpreted to present sounds 845 including the response 842 in the tonality 844 to the target individual 880, and to receive data representing effects of the response 842 and the tonality 844 on the conversational experience, e.g., data representing sounds 835 captured by the personal device 870 following the response 842 and the tonality 844. The communication system 810 is further configured to process the data representing the sounds 835 to identify a set of words of a comment 832 by the target individual 880 represented therein, as well as any acoustic features 836 associated with the comment 832.

The communication system 810 may also determine or predict a reward 830-1 (or a penalty) resulting from the response 842 and the tonality 844, as well as an update 830-2 to the state 884 of the conversational experience represented in the sounds 835. For example, the data representing the sounds 835 may be processed to identify a comment including a set of words represented in the data representing the sounds 835, e.g., by a source system that receives the data representing the sounds 835 in a continuous manner, according to any ASR algorithms, systems or techniques, and transforms the data representing the sounds 835 into the sets of words represented therein. In some implementations, the data representing the sounds 835 may be divided into segments (or frames) and transformed into a sequence of vectors (or sets of data in other formats) that represent acoustic features of the data, which may be extracted according to one or more processes or techniques and mapped to one or more phonemes, or units of sound in a language. The communication system 810 may further generate any number of hypotheses as to contents of the data representing the sounds 835, including text data, token data, confidence scores or other information, data or metadata, to determine words of the comment represented therein and identify the reward 830-1 based on one or more of such words. Likewise, the data representing the sounds 835, or sets of words of the comment or acoustic features identified therefrom, may be further processed to determine the updates 830-2 (or changes) to the state 884 of the conversational experience following the presentation of the response 842 in the tonality 844 to the target individual 880 and the receipt of the data 835 representing one or more comments and acoustic features, and the updated state 884 of the conversational experience may be provided as inputs to the model 820.

In some implementations, the model 820 may be trained to map states 884 of conversational experiences to responses 842 and tonalities 844 by reinforcement learning, e.g., based on the rewards 830-1 (or penalties) of responses 842 and tonalities 844 generated by the model 820 based on the state 884 of the conversational experience, thereby transitioning the conversational experience to a new state 884 represented by the update 830-2. For example, in some implementations, the model 820 may be a value-based method for reinforcement learning, such as a Q-learning technique, as well as any policy-based methods (e.g., policy gradients), model-based methods, or exploratory methods, such as one or more batch reinforcement learning techniques.

In some implementations, the state 884 may include any information or data regarding comments 832 received from the target individual 880 during conversational experiences as well as acoustic features 836 of such comments 832, along with responses 842 presented to the target individual 880 and tonalities 844 by which the responses 842 were presented, and any information or data regarding the target individual 880. For example, at an outset of a conversational experience, the state 884 may include information or data regarding the target individual 880, e.g., a profile of the target individual 880, as well as a macro goal of the conversational experience. The state 884 may be further augmented based on updates 820-2 to the state 884, which may be determined based on comments 832 and acoustic features 836 once received from the target individual 880 in reply to responses 842 in tonalities 844.

As is discussed above, where a macro goal and a target individual for a conversational experience have been identified, an initiating set of words or tonality for the conversational experience, or any micro goals, responses, or tonalities, may be selected for the conversational experience in accordance with a predetermined template or script. Thus, responses and tonalities set forth in the template or script may be identified, and data for presenting the responses in the tonalities may be transmitted to a personal device of the target individual substantially rapidly and with little to no latency. In some implementations, upon receiving a comment from a target individual during a conversational experience, the comment and any other information or data may be compared to a response, a tonality and a micro goal set forth in the template or script to determine whether the response, the tonality or the micro goal remain appropriate for the target individual in view of the comment, or whether an alternate response, an alternate tonality or an alternate micro goal should be generated instead.

Figure 9A:
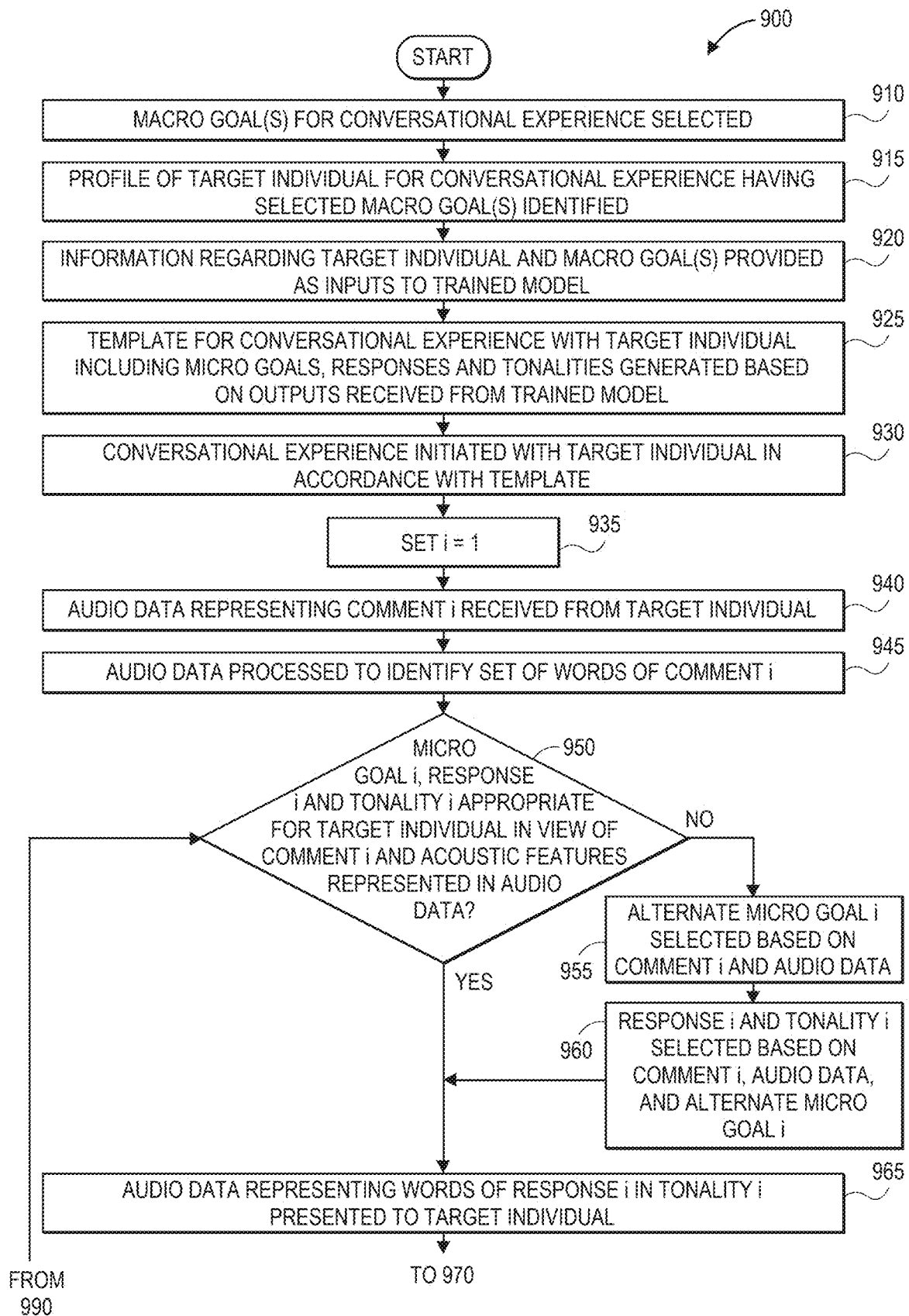
FIGS. 9A and 9B are a flow chart of one process in accordance with embodiments of the present disclosure.
Figure 9B:
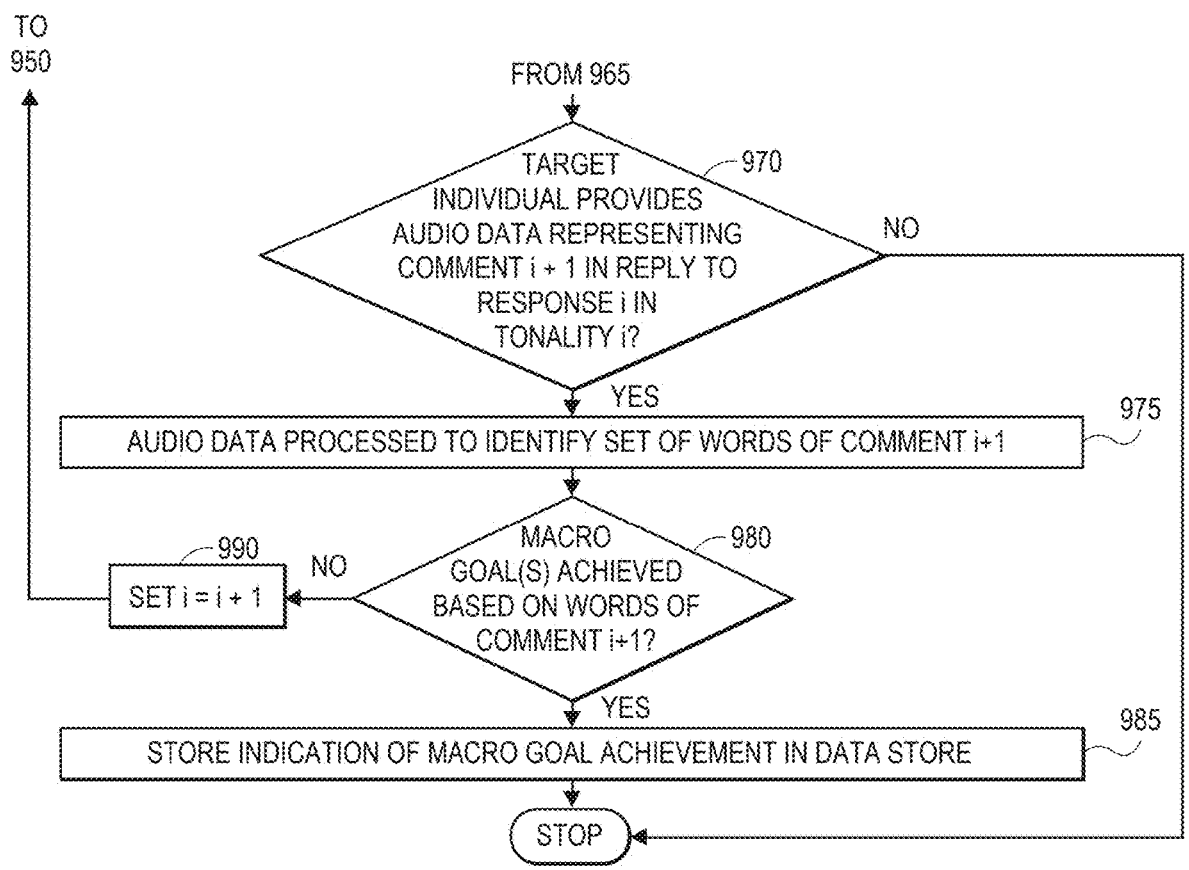

Referring to FIGS. 9A and 9B, a flow chart 900 of one process in accordance with embodiments of the present disclosure is shown. At box 910, one or more macro goals for a conversational experience are selected. The macro goals may be any ultimate objectives, intentions or measurable achievements of persuasion that are intended or desired following the completion of the conversational experience. The macro goals may include completing sales of goods or services, optimizing levels of engagement, maintaining relationships, reaching agreements, or any other goals of persuasion, and may be established in any manner. Moreover, macro goals may be automatically established or selected for a target individual at random, or a target individual may be randomly selected for one or more established or selected macro goals. A macro goal may also be established or selected for a target individual in accordance with a predetermined schedule, e.g., at a periodic interval, or at any other time.

At box 915, a profile of a target individual for a conversational experience having the macro goals selected at box 910 is identified. The profile may include any information or data regarding the target individual, e.g., a name, an age, an image, a telephone number, an electronic mail address, a social network name, a location, a preference, a financial status, or any other information or data. The profile may be maintained by a source system for initiating the conversational experience, or by any other system in any other location.

At box 920, information regarding the target individual and the one or more macro goals selected at box 910 is provided as inputs to a model. The model may be trained based on prior conversational experiences with target individuals that include any number of pairs of comments by the target individuals and responses to such comments that are presented to the target individuals in selected tonalities, in order to achieve micro goals in furtherance of a macro goal.

In some implementations, the information may relate directly to a single target individual. Alternatively, in some other implementations, the information may relate to a group, a category or a cluster of individuals including the target individual, or one or more individuals that are similar to the target individual.

At box 925, a template for the conversational experience with the target individual including micro goals to be accomplished during the conversational experience, responses to comments by the target individual that are anticipated during the conversational experience, and tonalities by which the responses are to be presented to the target individual is generated based on outputs received from the trained model. For example, the model may be trained to generate a template (or a script) of a conversational experience with a target individual including sets of micro goals to be accomplished in furtherance of a macro goal, as well as sets of words (e.g., responses) to be presented to the target individual and tonalities by which the sets of words are to be presented. The tonalities may be defined with respect to quantitative factors by which the responses are be presented to the target individual, such as tones, paces, patterns of emphases, sentiments or other factors, or may be identified by one or more qualitative labels, e.g., "caring," "uptone," such as presenting a declarative in the form of a question, "intrigue," "scarcity," "certainty," "sincerity," "reason," "hypothetical," or theoretical, "obviousness," "empathy," or others. The template may include individual micro goals and corresponding responses and tonalities that are intended to accomplish the micro goals in furtherance of the macro goal, or language patterns including two or more micro goals and two or more corresponding responses and tonalities that are intended to accomplish the micro goals.

For example, the template (or the script) may include sets of words to be presented to a target individual with the conversational experience in selected states and tonalities by which the sets of words are to be presented, and the sets of words and tonalities may be selected with a goal of achieving a desired update to a state of the conversational experience, and a desired reward. Alternatively, or additionally, the template (or the script) may include anticipated sets of words (e.g., comments) that might be or are expected to be received from the target individual prior to or in response to such sets of words in such tonalities, and anticipated acoustic features of sounds by which the target individual may utter the sounds of words.

At box 930, a conversational experience with the target individual is initiated in accordance with the template generated at box 925. The conversational experience may be initiated by a source system (e.g., a conversational system, or a communication system) with a target system (e.g., a personal device), or by a target system with a source system.

Where the conversational experience is initiated by the source system, the template may designate a first micro goal, as well as a first set of words and a first tonality by which the first set of words is to be presented to the target individual. The source system may open a connection of a two-way (or bidirectional) communication channel with the target system, and data representing the first set of words in the first tonality is transmitted to the target system over one or more networks. The target system interprets the data to cause sounds representing the first set of words in the first tonality to be played to the target individual, e.g., by one or more speakers or other acoustic emitters. Alternatively, where the conversational experience is initiated by the target system, the source system may open a connection of a two-way (or bidirectional) communication channel with the target system, for example, in response to a request from the target system.

At box 935, a value of a step variable i is set equal to one, or i=1.

At box 940, audio data representing a comment i is received from the target individual. The audio data may be of any duration and the comment i may include any number of words. The audio data may be transmitted in any manner and in any format, and in an original, uncompressed form, or following compression by the target system into one or more packets in a smaller form, and at any bitrate. In some implementations, such as where the conversational experience was initiated by the source system, the comment i may be a reply to a set of words in an initial turn of the conversational experience in accordance with the template. Alternatively, the comment i may be an initial comment or turn in the conversational experience, following a capture of sounds representing the comment i by a microphone or another acoustic sensor of the target system, and a subsequent transfer of data representing the comment i and any acoustic features of the sounds by the target system to the source system.

At box 945, the audio data received at box 940 is processed to identify a set of words of the comment i and any acoustic features i represented in the audio data. The audio data received at box 940 may be processed by the source system in a continuous manner, according to any ASR algorithms, systems or techniques, or divided into segments (or frames) and transformed into a sequence of vectors (or sets of data in other formats) that represent acoustic features of the audio data.

At box 950, whether a micro goal i, a response i and a tonality i included in the template generated at box 925 are appropriate for the target individual in view of the comment i and the acoustic features i represented in the audio data received at box 940 is determined. For example, where the comment i is consistent with an expected set of words to be received by the target individual following an initiation of the conversational experience in accordance with the template, or a predicted reply by the target individual following the presentation of a response in a tonality to the target individual, the next micro goal set forth in the template, and the next response and the next tonality set forth in the template for accomplishing the next micro goal, may likely remain appropriate. Where, however, the comment i is not consistent with an expected set of words to be received by the target individual following the initiation of the conversational experience in accordance with the template, or a predicted reply by the target individual following the presentation of a response in a tonality to the target individual, one or more of an alternate micro goal, an alternate response, or an alternate tonality may be required.

For example, where the comment i or the acoustic features i indicates that the micro goal i has not been achieved, or that a desired change in a state of the conversational experience or a reward intended by presenting the response i in the tonality i has not been realized, another micro goal, or another response to the comment i or another tonality to accomplish the micro goal, may be required.

If the micro goal i, the response i or the tonality i included in the template are not appropriate for the target individual in view of the comment i and the acoustic features represented in the audio data received at box 940, then the process advances to box 955, where an alternate micro goal i is selected based on the comment i and acoustic features i represented in the audio data received at box 940. For example, the alternate micro goal i may be to increase a level of certainty of the target individual regarding the macro goal, to increase a level of trust in the conversational experience, the macro goal, or an entity associated with the macro goal, to gather additional intelligence from the target individual, or to avoid having the target individual terminate the conversational experience.

At box 960, an alternate response i and an alternate tonality i for presenting the tonality i to the target individual are selected based on the comment i, the acoustic features i of the audio data, and the alternate micro goal i. For example, in some implementations, a set of inputs including the comment i, the acoustic features i, as well as profile data for the target individual, and identifiers of the macro goal and the alternate micro goal i may be provided to a model. Outputs received from the model based on the inputs may be processed to generate an alternate response i to the comment i and an alternate tonality i by which the alternate response i is to be presented to the target individual.

At box 965, if the micro goal i, the response i or the tonality i included in the template are appropriate for the target individual in view of the comment i and the acoustic features represented in the audio data received at box 940, or after an alternate response i and an alternate tonality i are selected at box 960, audio data representing the words of the response i in the tonality i are presented to the target individual. For example, data representing the response i and the tonality i may be transmitted to a target system and caused to be played to the target individual by one or more speakers or other acoustic emitters of the target system.

At box 970, whether the target individual provided any audio data representing a comment i+1 in reply to the response i in the tonality i is determined. If the target individual has not provided any audio data representing a comment i+1 in reply to the response i in the tonality i, then the process ends.

If the target individual has provided audio data representing a comment i+1 in reply to the response i in the tonality i, then the process advances to box 975, where the audio data is processed to identify a set of words of the comment i+1. The audio data may be processed to identify the set of words represented therein in the same manner as the audio data that was received at box 940, or in any other manner.

At box 980, whether one or more of the macro goals for the conversational experience selected at box 910 have been achieved is determined based on the words of the comment i+1. If the one or more macro goals are determined to have been achieved, then the process advances to box 985, where an indication of the achievement of the one or more macro goals is stored in one or more data stores, and the process ends.

If the macro goals are determined to have not been achieved, however, then the process advances to box 990, where a value of the step variable i is incremented by one, or set equal to i+1, before returning to box 950, where whether the micro goal i, the response i and the tonality i included in the template generated at box 925 are appropriate for the target individual in view of the comment i and the acoustic features i represented in the audio data processed at box 975 is determined. For example, where the comment i is consistent with a predicted reply by the target individual following the presentation of the response i in the tonality i at box 965, the next micro goal set forth in the template, and the next response and the next tonality set forth in the template for achieving the next micro goal, may likely remain appropriate. Where, however, the comment i is not consistent with a predicted reply by the target individual following the presentation of the response i in the tonality i at box 965, one or more of an alternate micro goal, an alternate response, or an alternate tonality may be required.

Figure 10A:
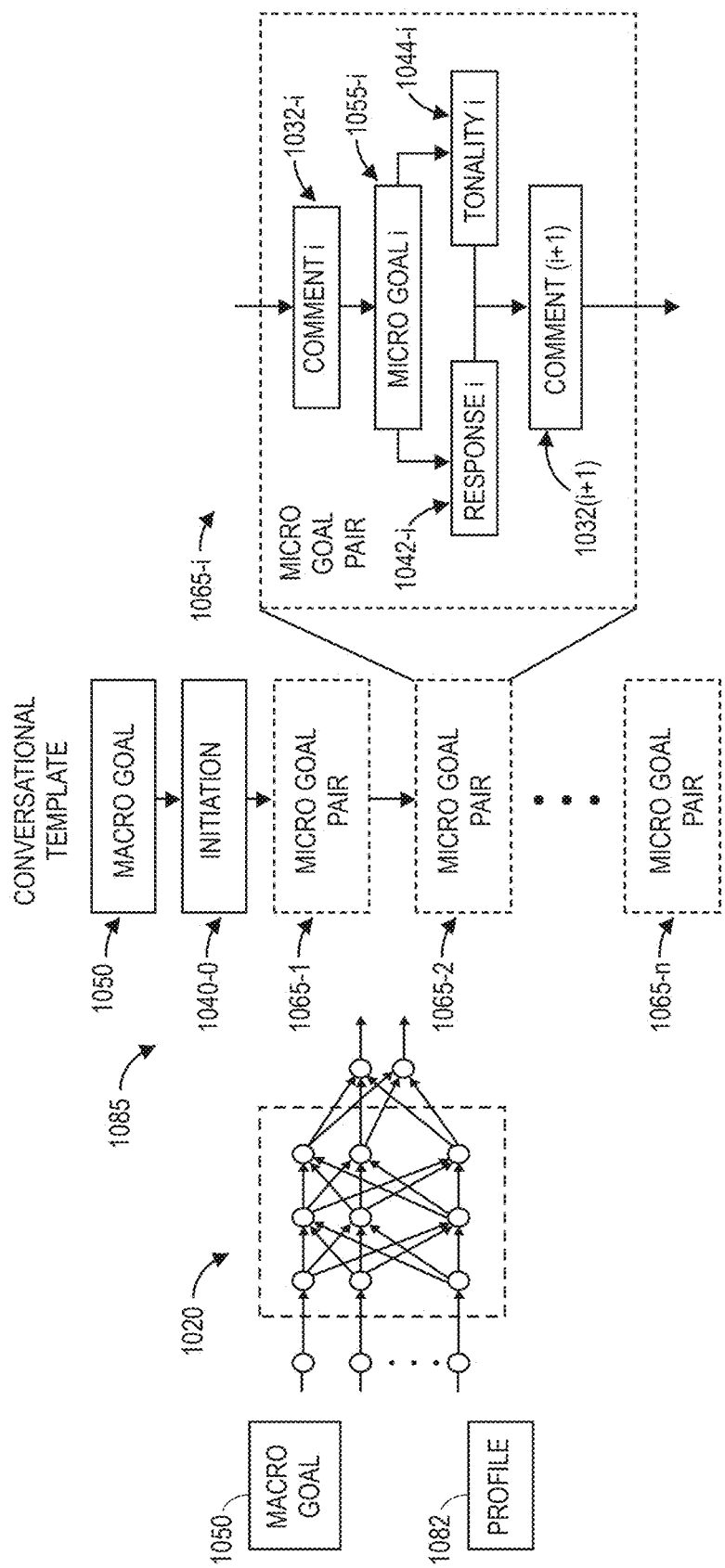
FIGS. 10A through 10C are views of aspects of one system in accordance with embodiments of the present disclosure.
Figure 10B:
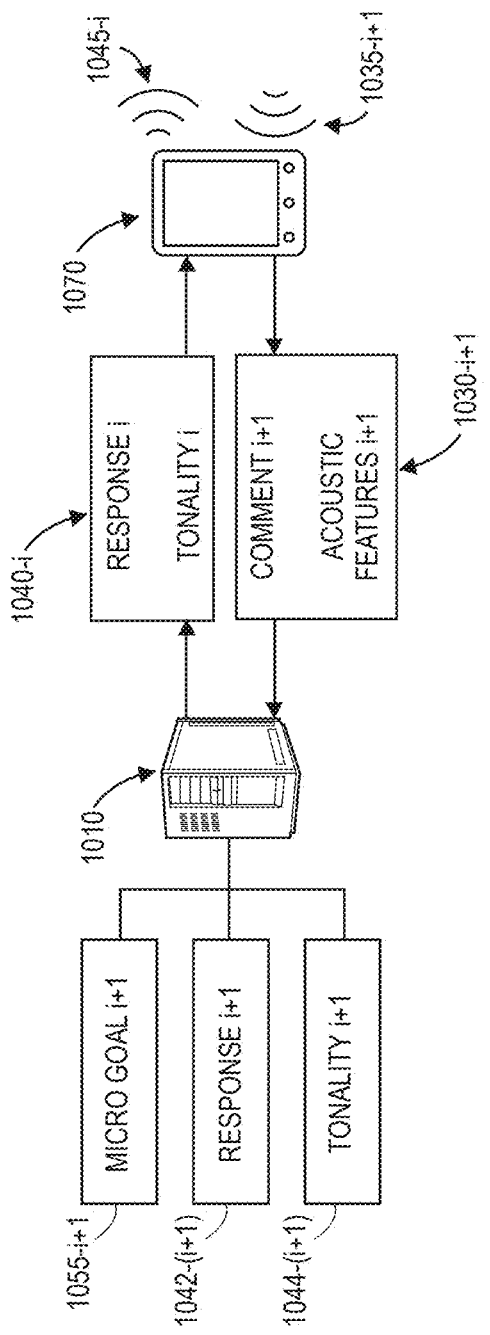
Figure 10C:
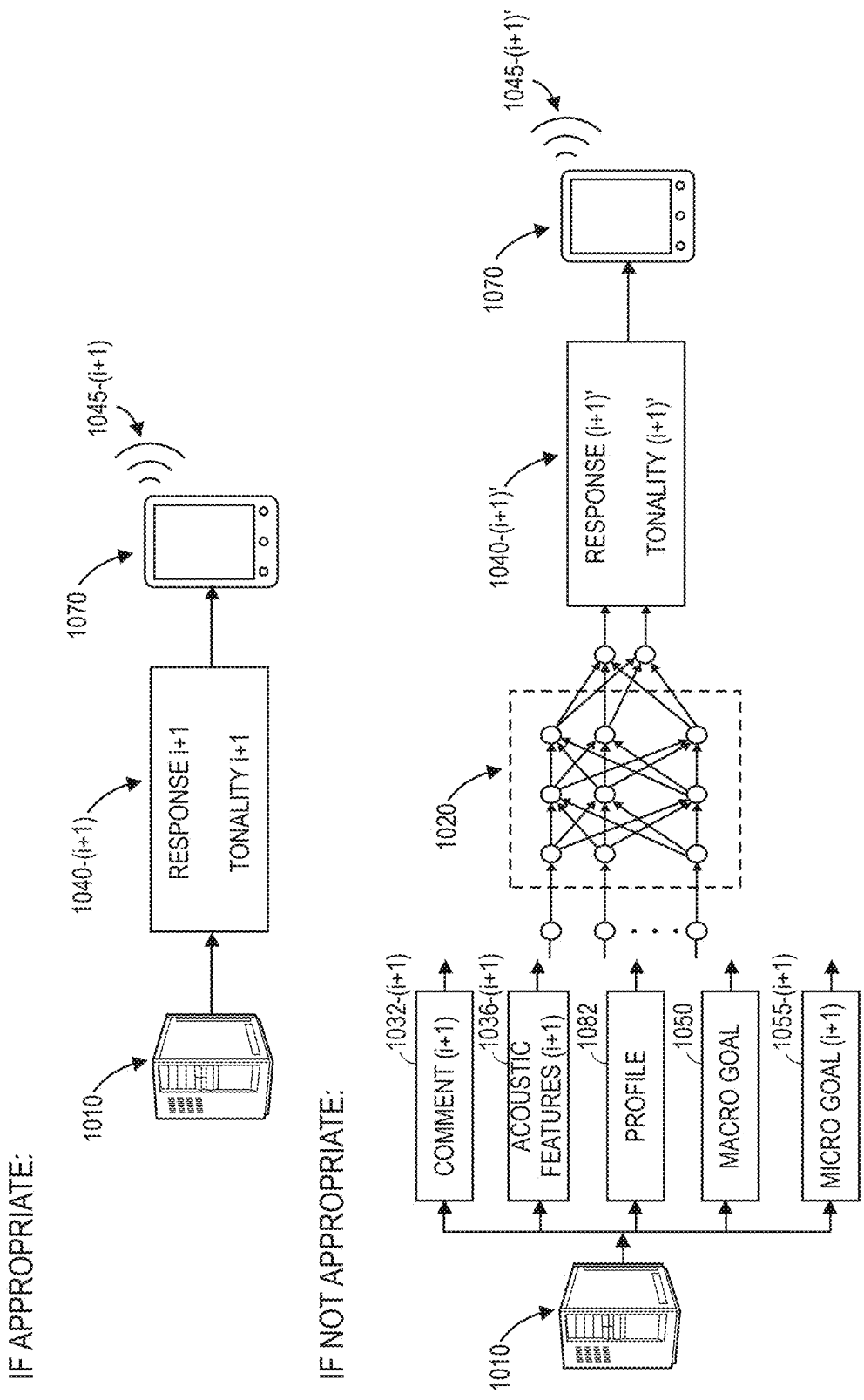

Referring to FIGS. 10A through 10C, views of aspects of one system in accordance with embodiments of the present disclosure are shown. As is shown in FIG. 10A, information or data regarding a macro goal 1050 and information or data maintained in a profile 1082 of a target individual are provided as inputs to a model 1020, and a conversational template 1085 for a conversational experience with the target individual is generated based on outputs received from the model 1020 in response to the inputs. The macro goal 1050 may be any ultimate goal of persuasion of the conversational experience and may be identified by one or more sets of words or other identifiers representative of the macro goal 1050, such as "sale of [name of good or service] to [target individual," or "set date and location for meeting with [target individual]." The profile 1082 may include any information or data regarding the target individual, e.g., a name, an age, an image, a telephone number, an electronic mail address, a social network name, a location, a preference, a financial status, or any other information or data, and may be maintained by a computer system that is programmed or configured to execute the model 1020, a computer system that is programmed or configured to initiate the conversational experience, or by any other computer system in any other location.

The model 1020 may be any type or form of machine learning model (or algorithm, system or technique) that is configured to generate the conversational template 1085 based on inputs regarding the macro goal 1050 and the profile 1082. In some implementations, the model 1020 may be an artificial neural network (e.g., a recurrent neural network), a transformer-based model (e.g., a bidirectional encoder representations from transformers model), a generative pre-trained transformer model, or others. In some implementations, the model 1020 may include two or more of such models or architectures.

The model 1020 may be trained to generate the conversational template 1085 in any manner. In some implementations, the model 1020 may be trained based on aspects of any prior conversational experiences, including but not limited to information or data regarding respective target individuals and macro goals of such experiences, as well as sets of words and tonalities that are selected to achieve a micro goal in furtherance of a macro goal, and comments received in reply to such sets of words in such tonalities, as well as indicators as to whether presenting such sets of words in such tonalites to such target individuals were successful in achieving a micro goal or a macro goal with the respective target individuals. Such indicators may be qualitative or quantitative in nature. For example, in some implementations, an indicator of success may be binary in nature, such as "successful" or "unsuccessful," or may indicate a grade or a level of success, such as "very successful," "mildly successful," "absolutely unsuccessful," or others. Alternatively, or additionally, an indicator of success may represent a percent, a score or a level of success of a response presented in a tonality to a target individual at achieving a micro goal or a macro goal.

In some implementations, the model 1020 may be trained based on one or more prior conversational experiences with target individuals in their entireties, as well as indicators as to whether such conversational experiences successfully achieved any stated macro goals with such target individuals, or whether various presenting responses in tonalities during the conversational experiences achieved one or more micro goals with such target individuals. Such indicators may likewise be qualitative or quantitative in nature.

Alternatively, in some implementations, the model 1020 may be further trained based on synthetic conversational experiences that did not previously occur with any target individuals, and were defined for purposes of training the model 1020. For example, in some implementations, profile data for a type or category of target individual may be selected, and a macro goal of a conversational experience with a target individual of the type or category may be identified. An initial set of words for initiating a synthetic conversational experience, either by a source system or a target individual, may be identified. Where the synthetic conversational experience is to be initiated by the target individual, a pair of a micro goal for the synthetic conversational experience, as well as a response to be returned to the target individual in reply to the initial set of words and in furtherance of the micro goal, and a tonality by which the response is to be presented, may be selected. A synthetic comment to be received from the target individual in reply to the response may also be selected, along with a set of acoustic features of the synthetic comment. Alternatively, where the synthetic conversational experience is to be initiated by the source system, the initial set of words may be associated with an initial macro goal, and synthetically presented in an initial tonality to a target individual having the profile data. A synthetic comment to be received from the target individual in reply to the initiation may be identified along with a set of acoustic features of the synthetic comment.

The synthetic conversational experience may be defined for purposes of training the model 1020 to include any number of pairs of micro goals, responses and tonalities to be synthetically presented by a source system, and associated comments to be synthetically received from a target individual, as well as an indicator of an outcome of the synthetic conversational experience, including indicators as to whether the macro goal or any micro goals were achieved or were not achieved. Any number of synthetic conversational experiences may be constructed in this manner and utilized to train the model 1020.

Alternatively, a synthetic conversational experience may be constructed for the purposes of training the model 1020 in part from one or more micro goals, responses and tonalities actually selected by a source system during an actual conversational experience as well as comments and acoustic features received from a target individual during the actual conversational experience, where one or more of the micro goals, responses, or tonalities, or comments or acoustic features, are altered, modified or replaced with one or more synthetic micro goals, responses or tonalities, or one or more synthetic comments or acoustic features, in order to synthetically alter outcomes or indicators of success of one or more of the responses or tonalites at achieving a micro goal or the macro goal.

As is shown in FIG. 10A, the conversational template 1085 may be defined by the macro goal 1050, and may include information or data representing an initiation 1040-0 of the conversational template 1085, as well as information or data regarding a plurality of micro goal pairs **1065-1, 1065-2 ... 1065-*n* of turns of the conversational template 1085. As is further shown in FIG. 10A, a representative micro goal pair 1065-*i* of the plurality of micro goal pairs 1065-1, 1065-2 ... 1065-*n* includes a micro goal 1055-*i* for a state i of the conversational experience, and a response 1042-*i* as well as a tonality 1044-*i* by which the response 1042-*i*** is to be presented to the target individual at the stage i of the conversational experience.

Each of the micro goals **1055-*i*, the responses 1042-*i* and the tonalities 1044-*i* may be selected based on respective stages i of the conversational experience, including but not limited to any comments 1032-*i* that were received from the target individual prior to the stage i, or acoustic features of audio data representing such comments 1032-*i*. In particular, the responses 1042-*i* and the tonalities 1044-*i* may be selected for a purpose of achieving the respective ones of the micro goals 1055-*i*, or to elicit one or more comments 1032-(*i*+1) from the target individual in reply to the responses 1042-*i* in the tonalities 1044-*i***.

Alternatively, or additionally, the conversational template 1085 may include any number of language patterns that include one or more responses **1042-*i* and tonalities 1044-*i* that are selected based on comments previously received from the target individual in order to achieve one or more micro goals 1055-*i* in furtherance of the macro goal 1050**.

During a conversational experience conducted in accordance with the conversational template 1085, a communication system may receive a comment from a target individual following the presentation of a response in a tonality in furtherance of a micro goal, and determine whether one or more of a next micro goal, a next response to the comment, or a next tonality in accordance with the conversational template 1085 are appropriate for the conversational experience, or whether a different micro goal, a different response or a different tonality are more appropriate for the conversational experience in view of the comment. As is shown in FIG. 10B, after a communication system 1010 transmits data **1040-*i* representing a response i and a tonality i to a personal device 1070 of a target individual over one or more networks, and the personal device 1070 generates sounds 1045-*i* for playing the response i in the tonality i to the target individual, the target individual emits sounds 1035-(*i*+1) including a comment i+1 captured by the personal device 1070, and data 1030-(*i*+1) representing the comment i+1 and acoustic features i+1 of the sounds 1035 are returned to the communication system 1010. Upon receiving the data 1030-(*i*+1), the communication system 1010 interprets the data 1030-(*i*+1) in real time or in near-real time to identify the comment i+1 and to process the acoustic features i+1 represented therein, with respect to a next micro goal 1055-(*i*+1), a next response 1042-(*i*+1), or a next tonality 1044-(*i*+1) that were previously generated in accordance with the conversational template 1085**.

As is shown in FIG. 10C, if the next response **1042-(*i*+1) and the next tonality 1044-(*i*+1) are appropriate for the conversational experience in view of the comment i+1 received from the target individual, then the communication system 1010 transmits data 1040-(*i*+1) representing the next response 1042-(*i*+1) and the next tonality 1044-(*i*+1) to the personal device 1070, which interprets the data and causes sounds 1045-(*i*+1) representing the next response 1042-(*i*+1) to be presented the target individual in the next tonality 1044-(*i*+1)**.

As is also shown in FIG. 10C, if the next response **1042-(*i*+1), or the next tonality 1044-(*i*+1) is not appropriate for the conversational experience in view of the comment i+1 received from the target individual, then the conversational system 1010 provides the comment 1032-(*i*+1), information or data from the profile 1082, the macro goal 1050 and the next micro goal 1055-(*i*+1) as inputs to the model 1020, and an alternate response (i+1)' and an alternate tonality (i+1)' for presenting the alternate response (i+1)' to the target individual are generated. Data 1040-(*i*+1)' representing the alternate response (i+1)' and the alternate tonality (i+1)' is transmitted to the personal device 1070, which processes the data 1040 to generate sounds 1045-(*i*+1)'** presenting the alternate response (i+1)' in the alternate tonality (i+1)' to the target individual.

Although some embodiments of the present disclosure show the use of conversational agents in one or more applications or functions, those of ordinary skill in the pertinent arts will realize that the systems and methods of the present disclosure are not so limited. Rather, the systems and methods of the present disclosure may be utilized in connection with any operations, and in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, such as the methods or processes shown in FIGS. 3A and 3B, 7 or 9A and 9B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures may indicate the same or similar items or features.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two.

A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, a storage medium can be integral to a processor, and can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A conversational system comprising:
a computer system having one or more computer processors, one or more data stores, and one or more transceivers, wherein the computer system is programmed with one or more sets of instructions that, when executed by the one or more computer processors, cause the computer system to execute operations comprising:
determining a macro goal for a conversational experience;
selecting an individual for participation in the conversational experience;
initiating the conversational experience with the individual, wherein initiating the conversational experience comprises transmitting first data comprising a first set of words to a personal device associated with the individual over one or more networks at a first time;
receiving second data from the personal device at a second time, wherein the second data represents at least a second set of words, and wherein the second time follows the first time;
processing the second data to recognize the second set of words;
establishing a first micro goal for the conversational experience based at least in part on the second set of words, at least one acoustic feature of the second data, and the macro goal, wherein the at least one acoustic feature of the second data comprises a pitch, a duration or an intensity of the second data;
selecting at least a third set of words and a tonality for presenting the third set of words to the individual based at least in part on the first micro goal and the second set of words, wherein the third set of words comprises a response to the second set of words, and wherein the tonality for presenting the third set of words comprises at least one of a tone by which the third set of words is to be presented to the individual, a pace at which the third set of words is to be presented to the individual, an emphasis pattern for presenting the third set of words to the individual, and a sentiment to be expressed when presenting the third set of words to the individual;
transmitting third data to the personal device at a third time, wherein the third data comprises the third set of words and data regarding the tonality for presenting the third set of words, and wherein the third time follows the second time;
causing at least the third set of words to be presented to the individual in accordance with the tonality for presenting the third set of words by way of the personal device;
receiving fourth data from the personal device at a fourth time, wherein the fourth data represents at least a fourth set of words, and wherein the fourth time follows the third time;
processing the fourth data to recognize the fourth set of words; and
determining that at least the first micro goal has been achieved based at least in part on the fourth set of words;
establishing a second micro goal for the conversational experience based at least in part on the fourth set of words, at least one acoustic feature of the fourth data, and the macro goal, wherein the at least one acoustic feature of the fourth data comprises a pitch, a duration or an intensity of the fourth data;
selecting at least a fifth set of words and a tonality for presenting the fifth set of words to the individual based at least in part on the second micro goal and the fourth set of words, wherein the fifth set of words comprises a response to the fourth set of words, and wherein the tonality for presenting the fifth set of words comprises at least one of a tone by which the fifth set of words is to be presented to the individual, a pace at which the fifth set of words is to be presented to the individual, an emphasis pattern for presenting the fifth set of words to the individual, and a sentiment to be expressed when presenting the fifth set of words to the individual;
transmitting fifth data to the personal device at a fifth time, wherein the fifth data comprises the fifth set of words and data regarding the tonality for presenting the fifth set of words, and wherein the fifth time follows the fourth time;

causing at least the fifth set of words to be presented to the individual in accordance with the tonality for presenting the fifth set of words by way of the personal device;

receiving sixth data from the personal device at a sixth time, wherein the sixth data represents at least a sixth set of words, and wherein the sixth time follows the fifth time;

processing the sixth data to recognize the sixth set of words; and determining that at least the macro goal has been achieved based at least in part on the sixth set of words; and in response to determining that at least the macro goal has been achieved based at least in part on the sixth set of words, storing an indication that the macro goal has been achieved in association with the individual in the one or more data stores.

2. The conversational system of claim 1, wherein the operations further comprise:

providing at least the second set of words and the first micro goal as inputs to at least one machine learning model, wherein the at least one machine learning model is trained to identify a response to a set of words and a tonality for presenting the response to the set of words based at least in part on the set of words and a goal to be achieved by the response to the set of words, and wherein the at least one machine learning model comprises:

a first model having a transformer-based architecture, wherein the first model is trained to identify the response to the set of words based at least in part on the set of words and the goal to be achieved by the response to the set of words; and a second model, wherein the second model is trained to select the tonality for presenting the response based at least in part on the response to the set of words and the goal to be achieved by the response to the set of words; and receiving outputs from the at least one machine learning model, wherein the third set of words and the tonality for presenting the third set of words are selected based at least in part on at least one of the outputs.

3. The conversational system of claim 2, wherein the operations further comprise:

prior to the first time, identifying seventh data regarding a plurality of conversational experiences, wherein the seventh data comprises, for each one of the plurality of conversational experiences:

a set of words received from an individual during the one of the plurality of conversational experiences;

a response to the set of words received from the individual during the one of the plurality of conversational experiences;

a tonality for presenting the response to the set of words received from the individual during the one of the plurality of conversational experiences;

at least one of a macro goal or a micro goal during the one of the plurality of conversational experiences; and an indication of a degree of success of the at least one of the macro goal or the micro goal during the one of the plurality of conversational experiences; and training the at least one machine learning model based at least in part on the seventh data.

4. The conversational system of claim 1, wherein the macro goal is one of:

executing a sale of at least one of a good or a service to the individual;

executing a sale of at least one of a commodity, a currency, an equity, a fixed income asset, or real estate to the individual;

maintaining a relationship with the individual;

optimizing a level of engagement with the individual; or reaching an agreement with the individual.

5. The conversational system of claim 1, wherein the first micro goal is one of:

enhancing a level of knowledge of the individual in at least one attribute of the macro goal;

identifying any standards of the individual;

increasing a level of certainty of the individual regarding the macro goal;

increasing a level of trust in at least one of the conversational experience, the macro goal, or an entity associated with the macro goal;

increasing a probability that the macro goal will be achieved during the conversational experience;

gathering intelligence from the individual;

maintaining the conversational experience with the individual; or receiving data representing at least one set of words from the personal device.

6. The conversational system of claim 1, wherein selecting a at least the third set of words and the tonality for presenting the third set of words comprises:

identifying at least one of a tone, a pace, an emphasis pattern or a sentiment based at least in part on the first micro goal and the second set of words;

selecting one of a plurality of labels based at least in part on the at least one of the tone, the pace, the emphasis pattern or the sentiment identified based at least in part on the first micro goal and the second set of words; and identifying one of a plurality of base tonalities associated with the selected one of the plurality of labels, wherein the tonality for presenting the third set of words to the individual is the identified one of the plurality of base tonalities.

7. A method comprising:

determining a macro goal for a conversational experience;

receiving first data from a personal device over one or more networks at a first time, wherein the first data represents at least a first set of words uttered by an individual during the conversational experience;

selecting a first micro goal for the conversational experience based at least in part on the first data and the macro goal;

identifying at least a second set of words, wherein the second set of words comprises a response to the first set of words;

selecting a second tonality for presenting the second set of words to the individual based at least in part on the first data and the first micro goal;

transmitting second data to the personal device at a second time, wherein the second data represents the second set of words in accordance with the second tonality, and wherein the second time follows the first time;

receiving third data from the personal device at a third time, wherein the third data represents at least a third set of words uttered by the individual during the conversational experience, and wherein the third time follows the second time;

determining that at least one of the first micro goal or the macro goal has been achieved based at least in part on the third data; and in response to determining that the at least one of the first micro goal or the macro goal has been achieved,
storing an indication that the at least one of the first micro goal or the macro goal has been achieved in at least one data store.

8. The method of claim 7, wherein the second tonality comprises at least one of:
a tone by which the second set of words is to be presented to the individual;
a pace at which the second set of words is to be presented to the individual;
an emphasis pattern for presenting the second set of words to the individual; or
a sentiment to be expressed when presenting the second set of words to the individual.

9. The method of claim 7, further comprising:
providing at least the first set of words and the first micro goal as inputs to at least one machine learning model, wherein the at least one machine learning model is trained to identify a response to a set of words and a tonality for presenting the response to the set of words based at least in part on the set of words and a goal to be achieved by the response to the set of words; and
receiving outputs from the at least one machine learning model,
wherein the second set of words and the second tonality are selected based at least in part on at least one of the outputs.

10. The method of claim 9, wherein the at least one machine learning model comprises:
a first model having a transformer-based architecture, wherein the first model is trained to identify the response to the set of words based at least in part on the set of words and the goal to be achieved by the response to the set of words; and
a second model comprising an artificial neural network, wherein the second model is trained to select the tonality for presenting the response to the set of words based at least in part on the response to the set of words and the goal to be achieved by the response to the set of words.

11. The method of claim 9, wherein selecting at least the second set of words and the second tonality comprises:
identifying at least one of a tone, a pace, an emphasis pattern or a sentiment based at least in part on at least one of the outputs;
determining a comparison of the at least one of the tone, the pace, the emphasis pattern or the sentiment to data regarding a plurality of base tonalities, wherein the data regarding the plurality of base tonalities identifies, for each one of the base tonalities, a tone, a pace, an emphasis pattern or a sentiment; and
selecting one of the plurality of base tonalities based at least in part on the comparison,
wherein the second tonality is the selected one of the plurality of base tonalities.

12. The method of claim 9, wherein selecting at least the second set of words and the second tonality comprises:
identifying at least one of a tone, a pace, an emphasis pattern or a sentiment based at least in part on the at least one of the outputs;
selecting one of a plurality of labels based at least in part on the at least one of the tone, the pace, the emphasis pattern or the sentiment; and identifying one of a plurality of base tonalities associated with the selected one of the plurality of labels,
wherein the second tonality is the identified one of the plurality of base tonalities.

13. The method of claim 9, further comprising:
training the at least one machine learning model based at least in part on the second set of a words, the second tonality, the third set of words the at least one of the first micro goal or the macro goal.

14. The method of claim 9, further comprising:
prior to the first time,
identifying fourth data regarding a plurality of conversational experiences, wherein the fourth data comprises, for each one of the plurality of conversational experiences:
a set of words received from an individual during the one of the plurality of conversational experiences;
a response to the set of words received from the individual during the one of the plurality of conversational experiences;
a tonality for presenting the response to the set of words received from the individual during the one of the plurality of conversational experiences;
at least one of a macro goal or a micro goal during the one of the plurality of conversational experiences; and
an indication that the at least one of the macro goal or the micro goal was achieved during the one of the plurality of conversational experiences; and
training the at least one machine learning model based at least in part on the fourth data.

15. The method of claim 7, wherein determining that the at least one of the first micro goal or the macro goal has been achieved based at least in part on the third data comprises:
determining that the first micro goal has been achieved based at least in part on the third data; and
in response to determining that the first micro goal has been achieved,
selecting a second micro goal for the conversational experience based at least in part on the third data and the macro goal;
identifying at least a fourth set of words, wherein the fourth set of words comprises a response to the third set of words;
selecting a fourth tonality for presenting the fourth set of words to the individual based at least in part on the third data and the second micro goal;
transmitting fourth data to the personal device at a fourth time, wherein the fourth data represents the fourth set of words in accordance with the fourth tonality, and wherein the fourth time follows the third time;
receiving fifth data from the personal device at a fifth time, wherein the fifth data represents at least a fifth set of words uttered by the individual during the conversational experience, and wherein the fifth time follows the fourth time;
determining that at least one of the second micro goal or the macro goal has been achieved based at least in part on the fifth data; and
in response to determining that the at least one of the second micro goal or the macro goal has been achieved,
storing an indication that the at least one of the second micro goal or the macro goal has been achieved in the at least one data store.

16. The method of claim 7, wherein the macro goal is one of:
- executing a sale of at least one of a good or a service to the individual;
- executing a sale of at least one of a commodity, a currency, an equity, a fixed income asset, or real estate to the individual;
- maintaining a relationship with the individual;
- optimizing a level of engagement with the individual; or
- reaching an agreement with the individual.

17. The method of claim 7, wherein the first micro goal is one of:
- enhancing a level of knowledge of the individual in at least one attribute of the macro goal;
- identifying any standards of the individual;
- increasing a level of certainty of the individual regarding the macro goal;
- increasing a level of trust in at least one of the conversational experience, the macro goal, or an entity associated with the macro goal;
- increasing a probability that the macro goal will be achieved during the conversational experience;
- gathering intelligence from the individual;
- maintaining the conversational experience with the individual; or
- receiving data representing at least one set of words from the personal device.

18. The method of claim 7, further comprising:
identifying personal information regarding the individual, wherein the personal information comprises at least one of:
- an age of the individual;
- an electronic mail address of the individual;
- a financial status of the individual,
- an image of the individual;
- a location of the individual;
- a name of the individual;
- a preference of the individual;
- a social network identifier of the individual; and
- a telephone number of the individual; and selecting the individual for at least one of the macro goal or the conversational experience based at least in part on the personal information regarding the individual.

19. A computer system comprising:
one or more computer processors;
one or more data stores; and
one or more transceivers,
wherein the computer system is programmed with one or more sets of instructions that, when executed by the one or more computer processors, cause the computer system to perform a method comprising:
receiving first data from a personal device over one or more networks at a first time, wherein the first data represents at least a first set of words uttered by an individual during a conversational experience;
selecting a micro goal for the conversational experience based at least in part on the first data and a macro goal for the conversational experience;
selecting, by a text processing engine executed by the one or more computer processors, at least a second set of words based at least in part on the first set of words and the micro goal, wherein the second set of words comprises a response to the first set of words;
selecting, by a communications processing module, a second tonality for presenting the second set of words to the individual based at least in part on the first data and the micro goal, wherein the second tonality comprises at least one acoustic feature by which the second set of words is to be presented to the individual;
generating, by an output generation module, second data representing the second set of words in the second tonality at a second time, wherein the second time follows the first time;
transmitting at least the second data to the personal device;
receiving third data from the personal device at a third time, wherein the third data represents at least a third set of words uttered by the individual during the conversational experience, and wherein the third time follows the second time;
determining that at least one of the micro goal or the macro goal has been achieved based at least in part on the third data; and
in response to determining that the at least one of the micro goal or the macro goal has been achieved,
storing an indication that the at least one of the micro goal or the macro goal has been achieved in at least one data store.

20. The computer system of claim 19, wherein the macro goal is one of:
- executing a sale of at least one of a good or a service to the individual;
- executing a sale of at least one of a commodity, a currency, an equity, a fixed income asset, or real estate to the individual;
- maintaining a relationship with the individual;
- optimizing a level of engagement with the individual; or
- reaching an agreement with the individual, and wherein the micro goal is one of:
- enhancing a level of knowledge of the individual in at least one attribute of the macro goal;
- identifying any standards of the individual;
- increasing a level of certainty of the individual regarding the macro goal;
- increasing a level of trust in at least one of the conversational experience, the macro goal, or an entity associated with the macro goal;
- increasing a probability that the macro goal will be achieved during the conversational experience;
- gathering intelligence from the individual;
- maintaining the conversational experience with the individual; or
- receiving data representing at least one set of words from the personal device.

* * * * *